(12) United States Patent
Waters

(10) Patent No.: US 8,979,295 B2
(45) Date of Patent: Mar. 17, 2015

(54) RECHARGEABLE LIGHTED GLASSES

(76) Inventor: Michael Waters, Aspen, CO (US)

( * ) Notice: Subject to any disclaimer, the term of this patent is extended or adjusted under 35 U.S.C. 154(b) by 372 days.

(21) Appl. No.: 13/337,009

(22) Filed: Dec. 23, 2011

(65) Prior Publication Data

US 2012/0155064 A1    Jun. 21, 2012

Related U.S. Application Data

(63) Continuation-in-part of application No. 11/941,558, filed on Nov. 16, 2007, now Pat. No. 8,388,164, which is a continuation-in-part of application No. PCT/US2006/018968, filed on May 17, 2006, application No. 13/337,009, filed on Dec. 23, 2011, which is a continuation-in-part of application No. 13/025,100, filed on Feb. 10, 2011, now Pat. No. 8,545,012, application No. 13/337,009, which is a continuation-in-part of application No. 12/895,456, filed on Sep. 30, 2010, now Pat. No. 8,444,266.

(60) Provisional application No. 60/681,852, filed on May 17, 2005, provisional application No. 60/746,217, filed on May 2, 2006, provisional application No. 61/303,212, filed on Feb. 10, 2010, provisional application No. 61/247,243, filed on Sep. 30, 2009.

(51) Int. Cl.
*F21V 21/08* (2006.01)
*G02C 11/04* (2006.01)
*A42B 1/24* (2006.01)

(52) U.S. Cl.
CPC .............. *G02C 11/04* (2013.01); *A42B 1/242* (2013.01)
USPC .......................................... 362/103; 351/158

(58) Field of Classification Search
CPC ....... G02C 11/04; A42B 1/242; F21V 21/084
USPC ........................... 362/105–106, 103; 351/158
See application file for complete search history.

(56) References Cited

U.S. PATENT DOCUMENTS

| | | |
|---|---|---|
| 1,255,265 A | 2/1918 | Zachara |
| 1,261,824 A | 4/1918 | La Vine |
| 1,438,586 A | 12/1922 | Eaton |
| 1,448,353 A | 3/1923 | Barany |
| 1,572,210 A | 2/1926 | Kolibas |
| 1,615,067 A | 1/1927 | Boerman |

(Continued)

FOREIGN PATENT DOCUMENTS

| | | |
|---|---|---|
| CA | 2 466 175 A1 | 5/2003 |
| CA | 2 608 746 A1 | 11/2006 |

(Continued)

OTHER PUBLICATIONS

Office Action issued in related Canadian Application No. 2,466,175 dated Sep. 22, 2010 (3 pages).

(Continued)

*Primary Examiner* — Thomas M Sember
(74) *Attorney, Agent, or Firm* — Fitch, Even, Tabin & Flannery LLP

(57) ABSTRACT

Rechargeable lighted glasses are provided having one or more light sources mounted thereto and powered by a rechargeable power source. The rechargeable power source can be recharged through a recharging interface mounted to at least one of the temple arm portions of the rechargeable lighted glasses.

24 Claims, 31 Drawing Sheets

(56) References Cited

U.S. PATENT DOCUMENTS

| | | |
|---|---|---|
| 1,663,402 A | 3/1928 | Engel |
| 1,879,512 A | 9/1932 | Rotea |
| 2,196,543 A | 4/1940 | Anderson |
| 2,461,254 A | 2/1949 | Bassett |
| 2,531,585 A | 11/1950 | Pope |
| 2,567,046 A | 9/1951 | Anderson |
| 2,591,112 A | 4/1952 | Zwierzynski |
| 2,638,532 A | 5/1953 | Brady |
| 2,904,670 A | 9/1959 | Calmes |
| 2,966,580 A | 12/1960 | Taylor |
| 3,060,308 A | 10/1962 | Fortuna |
| D207,919 S | 6/1967 | Fai |
| 3,350,552 A | 10/1967 | Lawrence |
| D215,751 S | 10/1969 | Castelliano |
| 3,602,759 A | 8/1971 | Evans et al. |
| 3,634,676 A | 1/1972 | Castellano |
| 3,647,059 A | 3/1972 | Humphreys |
| 3,683,168 A | 8/1972 | Tatje |
| 3,769,663 A | 11/1973 | Perl |
| D229,975 S | 1/1974 | Klugmann |
| 3,793,517 A | 2/1974 | Carlini |
| 4,210,952 A | 7/1980 | Ressmeyer |
| 4,254,451 A | 3/1981 | Cochran, Jr. |
| 4,283,127 A | 8/1981 | Rosenwinkel et al. |
| 4,332,007 A | 5/1982 | Gibstein et al. |
| 4,406,040 A | 9/1983 | Cannone |
| 4,462,064 A | 7/1984 | Schweitzer |
| 4,516,157 A | 5/1985 | Campbell |
| 4,541,698 A | 9/1985 | Lerner |
| 4,570,206 A | 2/1986 | Deutsch |
| 4,616,297 A | 10/1986 | Liu |
| 4,631,644 A | 12/1986 | Dannhauer |
| 4,774,643 A | 9/1988 | McGinnis et al. |
| 4,822,160 A | 4/1989 | Tsai |
| 4,822,161 A | 4/1989 | Jimmy |
| 4,902,119 A | 2/1990 | Porsche |
| 4,904,078 A | 2/1990 | Gorike |
| 4,959,760 A | 9/1990 | Wu |
| 4,963,045 A | 10/1990 | Willcox |
| 5,070,436 A | 12/1991 | Alexander et al. |
| 5,113,325 A | 5/1992 | Eisenbraun |
| 5,122,943 A | 6/1992 | Pugh |
| 5,140,220 A | 8/1992 | Hasegawa |
| 5,143,443 A | 9/1992 | Madsen |
| 5,158,356 A | 10/1992 | Guthrie |
| 5,164,749 A | 11/1992 | Shelton |
| 5,183,326 A | 2/1993 | Case |
| 5,189,512 A | 2/1993 | Cameron et al. |
| 5,218,385 A | 6/1993 | Lii |
| 5,230,558 A | 7/1993 | Jong |
| 5,245,516 A | 9/1993 | de Haas et al. |
| D343,470 S | 1/1994 | Yuen |
| 5,278,734 A | 1/1994 | Ferber |
| D349,123 S | 7/1994 | Cooley et al. |
| 5,331,333 A | 7/1994 | Tagawa et al. |
| 5,331,357 A | 7/1994 | Cooley et al. |
| 5,367,345 A | 11/1994 | da Silva |
| 5,438,698 A | 8/1995 | Burton et al. |
| 5,452,190 A | 9/1995 | Priesemuth |
| 5,460,346 A | 10/1995 | Hirsch |
| 5,485,358 A | 1/1996 | Chien |
| 5,541,767 A | 7/1996 | Murphy et al. |
| 5,541,816 A | 7/1996 | Miserendino |
| 5,546,099 A | 8/1996 | Quint et al. |
| D375,372 S | 11/1996 | Allen |
| 5,575,554 A | 11/1996 | Guritz |
| 5,606,743 A | 2/1997 | Vogt et al. |
| 5,608,808 A | 3/1997 | da Silva |
| 5,610,678 A | 3/1997 | Tsuboi et al. |
| D383,754 S | 9/1997 | Yuen |
| D383,863 S | 9/1997 | Yuen |
| 5,667,291 A | 9/1997 | Caplan et al. |
| 5,667,292 A | 9/1997 | Sabalvaro |
| D388,113 S | 12/1997 | Feinbloom |
| 5,708,449 A | 1/1998 | Heacock |
| 5,722,762 A | 3/1998 | Soll |
| 5,741,060 A | 4/1998 | Johnson |
| 5,786,665 A | 7/1998 | Ohtsuki et al. |
| 5,806,961 A | 9/1998 | Dalton et al. |
| 5,836,673 A | 11/1998 | Lo |
| D405,901 S | 2/1999 | Feinbloom et al. |
| 5,871,271 A | 2/1999 | Chien |
| 5,893,631 A | 4/1999 | Padden |
| 5,918,966 A | 7/1999 | Arnold |
| 5,946,071 A | 8/1999 | Feldman |
| 5,997,165 A | 12/1999 | Lehrer |
| 6,005,536 A | 12/1999 | Beadles et al. |
| 6,012,822 A | 1/2000 | Robinson |
| 6,012,827 A | 1/2000 | Caplan et al. |
| D420,035 S | 2/2000 | Hartman |
| 6,056,413 A | 5/2000 | Urso |
| D428,431 S | 7/2000 | Jordan |
| 6,086,214 A | 7/2000 | Ridge |
| 6,172,657 B1 | 1/2001 | Kamakura et al. |
| 6,174,075 B1 | 1/2001 | Fuwausa |
| 6,206,543 B1 | 3/2001 | Henry |
| D445,928 S | 7/2001 | Sharrah et al. |
| D446,324 S | 8/2001 | Lynch et al. |
| 6,290,368 B1 | 9/2001 | Lehrer |
| 6,299,323 B1 | 10/2001 | Yu et al. |
| 6,302,570 B1 | 10/2001 | Petell et al. |
| 6,311,837 B1 | 11/2001 | Blaustein et al. |
| 6,320,822 B1 | 11/2001 | Okeya et al. |
| 6,367,949 B1 | 4/2002 | Pederson |
| D457,670 S | 5/2002 | Allen |
| 6,386,701 B1 | 5/2002 | Khulusi |
| 6,390,640 B1 | 5/2002 | Wong et al. |
| 6,439,738 B1 | 8/2002 | Matthews et al. |
| 6,457,838 B1 | 10/2002 | Dugmore et al. |
| 6,461,025 B1 | 10/2002 | Payne |
| 6,474,830 B1 | 11/2002 | Hansen |
| D469,198 S | 1/2003 | Olson |
| 6,504,099 B2 | 1/2003 | Huang |
| 6,523,973 B2 | 2/2003 | Galli |
| 6,530,672 B2 | 3/2003 | Galli |
| D473,890 S | 4/2003 | Waters |
| 6,549,231 B1 | 4/2003 | Matsui |
| 6,554,444 B2 | 4/2003 | Shimada et al. |
| D477,432 S | 7/2003 | Parsons |
| 6,604,837 B2 | 8/2003 | Sandberg |
| 6,612,695 B2 | 9/2003 | Waters |
| 6,612,696 B2 | 9/2003 | Waters |
| D484,905 S | 1/2004 | Waters |
| 6,713,956 B2 | 3/2004 | Chen et al. |
| 6,749,166 B2 | 6/2004 | Valentine et al. |
| 6,764,194 B1 | 7/2004 | Cooper |
| 6,802,636 B1 | 10/2004 | Bailey, Jr. |
| 6,808,284 B1 | 10/2004 | Chao |
| 6,824,265 B1 | 11/2004 | Harper |
| 6,830,357 B2 | 12/2004 | Lopez |
| D501,266 S | 1/2005 | Harris, Jr. et al. |
| 6,857,739 B1 | 2/2005 | Watson |
| 6,860,628 B2 | 3/2005 | Robertson |
| 6,863,416 B2 | 3/2005 | Waters |
| D507,368 S | 7/2005 | Waters |
| D507,369 S | 7/2005 | Waters |
| 6,929,878 B2 | 8/2005 | Chen et al. |
| 6,966,668 B2 | 11/2005 | Cugini et al. |
| 6,977,776 B2 | 12/2005 | Volkenandt et al. |
| 6,993,803 B2 | 2/2006 | Chan |
| 6,997,552 B1 | 2/2006 | Hung |
| 7,003,353 B1 | 2/2006 | Parkhouse |
| 7,004,582 B2 | 2/2006 | Jannard et al. |
| 7,008,074 B1 | 3/2006 | Halm |
| 7,021,790 B2 | 4/2006 | Parsons |
| 7,094,981 B2 | 8/2006 | Sorrentino et al. |
| 7,104,670 B2 | 9/2006 | Waters |
| 7,105,939 B2 | 9/2006 | Bednyak |
| 7,111,956 B2 | 9/2006 | Brown |
| 7,118,241 B2 | 10/2006 | Sohn |
| 7,118,262 B2 | 10/2006 | Negley |
| 7,147,324 B2 | 12/2006 | Jannard et al. |
| 7,150,526 B2 | 12/2006 | Jannard et al. |
| 7,213,917 B2 | 5/2007 | Jannard et al. |

(56) References Cited

U.S. PATENT DOCUMENTS

| | | | |
|---|---|---|---|
| 7,216,973 B2 | 5/2007 | Jannard et al. |
| 7,226,180 B2 | 6/2007 | Sung |
| 7,234,831 B1 | 6/2007 | Hanley |
| 7,255,437 B2 | 8/2007 | Howell et al. |
| 7,264,350 B2 | 9/2007 | Jannard et al. |
| D553,177 S | 10/2007 | Chen |
| 7,278,734 B2 | 10/2007 | Jannard et al. |
| 7,281,826 B2 | 10/2007 | Huang |
| D568,922 S | 5/2008 | Anderl |
| 7,377,664 B2 | 5/2008 | Waters |
| 7,422,324 B2 | 9/2008 | Lee |
| 7,438,409 B2 | 10/2008 | Jordan |
| 7,562,979 B2 | 7/2009 | Waters |
| D600,738 S | 9/2009 | Su et al. |
| 7,607,775 B2 | 10/2009 | Hermanson et al. |
| 7,661,818 B2 | 2/2010 | Waters |
| D611,086 S | 3/2010 | Meng-Suen |
| 7,699,486 B1 | 4/2010 | Beiner |
| D617,826 S | 6/2010 | Waters |
| 7,806,525 B2 * | 10/2010 | Howell et al. ............... 351/158 |
| 7,862,979 B2 | 1/2011 | Morris et al. |
| 7,938,553 B1 | 5/2011 | Beiner |
| 7,942,522 B2 | 5/2011 | Sonsino |
| 7,946,705 B1 | 5/2011 | Hsu |
| 7,997,724 B1 | 8/2011 | Hsu |
| 8,007,101 B1 | 8/2011 | Wang |
| 8,109,630 B2 | 2/2012 | Sonsino |
| 8,152,330 B2 | 4/2012 | Waters |
| 8,235,524 B2 | 8/2012 | Waters |
| 2002/0131275 A1 | 9/2002 | Yamamoto et al. |
| 2002/0163800 A1 | 11/2002 | Hansen |
| 2002/0186557 A1 | 12/2002 | Lary et al. |
| 2002/0187806 A1 | 12/2002 | Jang |
| 2003/0079387 A1 | 5/2003 | Derose |
| 2003/0086053 A1 | 5/2003 | Waters |
| 2003/0086054 A1 | 5/2003 | Waters |
| 2003/0169207 A1 | 9/2003 | Beigel |
| 2003/0189824 A1 | 10/2003 | Meeder et al. |
| 2003/0206269 A1 | 11/2003 | Waters |
| 2004/0222638 A1 | 11/2004 | Bednyak |
| 2004/0240067 A1 | 12/2004 | Marusi et al. |
| 2004/0240204 A1 | 12/2004 | Russ et al. |
| 2004/0264176 A1 | 12/2004 | Vanderschuit |
| 2005/0001433 A1 | 1/2005 | Seelin |
| 2005/0072458 A1 | 4/2005 | Goldstein |
| 2005/0099799 A1 | 5/2005 | Cugini et al. |
| 2005/0204490 A1 | 9/2005 | Kemp et al. |
| 2005/0211187 A1 | 9/2005 | Harman et al. |
| 2005/0248932 A1 | 11/2005 | Waters |
| 2005/0254238 A1 | 11/2005 | Parker et al. |
| 2005/0265015 A1 | 12/2005 | Salazar |
| 2006/0012974 A1 | 1/2006 | Su |
| 2006/0012975 A1 | 1/2006 | Huttner et al. |
| 2006/0091784 A1 | 5/2006 | Conner et al. |
| 2006/0092621 A1 | 5/2006 | Lai |
| 2006/0138440 A1 | 6/2006 | Jyo |
| 2006/0158895 A1 | 7/2006 | Brands et al. |
| 2006/0197905 A1 | 9/2006 | Lu |
| 2006/0198122 A1 | 9/2006 | Senter et al. |
| 2006/0232239 A1 | 10/2006 | Maglica et al. |
| 2006/0238995 A1 | 10/2006 | Wang |
| 2006/0239018 A1 | 10/2006 | Jardin |
| 2006/0291193 A1 | 12/2006 | Hill |
| 2007/0013865 A1 | 1/2007 | Joradn |
| 2007/0030442 A1 | 2/2007 | Howell et al. |
| 2007/0053179 A1 | 3/2007 | Pang et al. |
| 2007/0058361 A1 | 3/2007 | Sevilla, II |
| 2007/0074752 A1 | 4/2007 | Shau et al. |
| 2007/0127250 A1 | 6/2007 | Waters |
| 2007/0145746 A1 | 6/2007 | Biamonte |
| 2007/0153500 A1 | 7/2007 | Waters |
| 2007/0153537 A1 | 7/2007 | Scott et al. |
| 2007/0159810 A1 | 7/2007 | Kim |
| 2007/0159823 A1 | 7/2007 | Ho et al. |
| 2007/0189003 A1 | 8/2007 | Daley |
| 2007/0206373 A1 | 9/2007 | Whiteside et al. |
| 2007/0236649 A1 | 10/2007 | Lin |
| 2007/0236915 A1 | 10/2007 | Chen |
| 2007/0236916 A1 | 10/2007 | Hsu |
| 2008/0069391 A1 | 3/2008 | Steyn et al. |
| 2008/0130272 A1 | 6/2008 | Waters |
| 2009/0190026 A1 | 7/2009 | Chen |
| 2009/0213323 A1 | 8/2009 | Mermanson et al. |
| 2010/0134761 A1 | 6/2010 | Johns et al. |
| 2010/0182563 A1 | 7/2010 | Waters |
| 2010/0302502 A1 * | 12/2010 | Ahn ............... 351/158 |
| 2011/0013135 A1 | 1/2011 | Waters |
| 2011/0075095 A1 | 3/2011 | Waters |
| 2011/0187989 A1 | 8/2011 | Waters |
| 2011/0211156 A1 | 9/2011 | Beiner |
| 2011/0228211 A1 | 9/2011 | Waters |
| 2012/0050667 A1 * | 3/2012 | Wang ............... 351/158 |
| 2012/0062830 A1 | 3/2012 | Waters |
| 2012/0176580 A1 * | 7/2012 | Sonsino ............... 351/158 |
| 2013/0215374 A1 * | 8/2013 | Blum et al. ............... 351/158 |

FOREIGN PATENT DOCUMENTS

| | | |
|---|---|---|
| CA | 2 610 073 A1 | 5/2008 |
| CN | 88203065 | 11/1988 |
| CN | 1603677 A | 4/2005 |
| CN | 2826472 Y | 10/2006 |
| CN | 201548769 U | 8/2010 |
| CN | 101950091 A | 1/2011 |
| CN | 201707513 U | 1/2011 |
| CN | 301445845 S | 1/2011 |
| CN | 201796205 U | 4/2011 |
| DE | 30 43 007 A1 | 6/1982 |
| DE | 9307209 | 11/1993 |
| DE | 94 10 886 U1 | 9/1994 |
| EP | 1451633 | 9/2004 |
| EP | 2 290 433 A1 | 3/2011 |
| EP | 2 299 311 A1 | 3/2011 |
| EP | 2 350 734 | 8/2011 |
| GB | 2272073 A | 5/1994 |
| JP | 2004-207580 A | 7/2004 |
| WO | 01/13033 A1 | 2/2001 |
| WO | 01/77575 A1 | 10/2001 |
| WO | 03/040808 A2 | 5/2003 |
| WO | 2006/124928 A1 | 11/2006 |
| WO | 2007/058706 A2 | 5/2007 |
| WO | 2011/041591 A1 | 4/2011 |
| WO | 2011/100471 A1 | 8/2011 |
| ZA | 2004/3826 A | 9/2005 |

OTHER PUBLICATIONS

Supplementary European search report issued in the related European Application No. 02 77 8755 dated Jan. 19, 2005 (2 pages).

Office Action issued in related European Application No. 02 778 755.5 dated Feb. 20, 2007 (7 pages).

Office Action issued in related European Application No. 02 778 755.5 dated Mar. 23, 2011 (6 pages).

Extended European search report issued in the related European Application No. 10 18 1592.6 dated Jan. 31, 2011 (7 pages).

Extended European search report issued in the related European Application No. 10 18 1593.4 dated Feb. 1, 2011 (8 pages).

International Search Report from the International Bureau of WIPO issued in the related International Application No. PCT/US02/35665, dated Jun. 27, 2003, 1 page.

Written Opinion of the International Searching Authority and International Search Report from the International Bureau of WIPO for International Application No. PCT/US2006/018968, dated Oct. 16, 2006, 7 pages.

Notification of Transmittal of the International Search Report and the Written Opinion of the International Searching Authority, or the Declaration from the International Bureau of WIPO for International Application No. PCT/US10/50978, dated Dec. 3, 2010, 16 pages.

Notification of Transmittal of the International Search Report and the Written Opinion of the International Searching Authority, or the Declaration from the International Bureau of WIPO for International Application No. PCT/US2011/024400, dated Apr. 29, 2011, 13 pages.

(56) References Cited

OTHER PUBLICATIONS

Notification of Transmittal of the International Search Report and the Written Opinion of the International Searching Authority, or the Declaration from the International Bureau of WIPO for International Application No. PCT/US2011/051596, dated Jan. 18, 2012, 9 pages.
Docket report of *Waters Industries, Inc. v. Mr. Christmas Incorporated, et al.*, United States District Court for the Northern District of Illinois, Case No. 1:09-cv-07577, filed Dec. 7, 2009, 5 pages.
"Complaint", *Waters Industries, Inc. v. Mr. Christmas Incorporated, et al.*, United States District Court for the Northern District of Illinois, Case No. 1:09-cv-07577, 38 pages (Docket No. 1, Dec. 7, 2009).
Docket report of *Waters Industries, Inc. v. The Gerson Company*, United States District Court for the Northern District of Illinois, Case No. 1:10-cv-01865, filed Mar. 24, 2010, 3 pages.
"Complaint", *Waters Industries, Inc. v. The Gerson Company*, United States District Court for the Northern District of Illinois, Case No. 1:10-cv-01865, 71 pages (Docket No. 1, Mar. 24, 2010).
Docket report of *Waters Industries, Inc. v. Sweet Baby, Inc. dba AJ Morgan et al.*, United States District Court for the Northern District of Illinois, Case No. 1:09-cv-07595, filed Dec. 7, 2009, 7 pages.
"Complaint", *Waters Industries, Inc. v. Sweet Baby, Inc. dba AJ Morgan et al.*, United States District Court for the Northern District of Illinois, Case No. 1:09-cv-07595, 78 pages (Docket No. 1, Dec. 7, 2009).
"Answer to Complaint, Counterclaims", filed by Sweet Baby, Inc. dba AJ Morgan, *Waters Industries, Inc. v. Sweet Baby, Inc. dba AJ Morgan et al.*, United States District Court for the Northern District of Illinois, Case No. 1:09-cv-07595, 15 pages (Docket No. 27, Feb. 4, 2010).
"Answer to Complaint, Counterclaims", filed by Lilian Vernon Corporation, *Waters Industries, Inc. v. Sweet Baby, Inc. dba AJ Morgan et al.*, United States District Court for the Northern District of Illinois, Case No. 1:09-cv-07595, 15 pages (Docket No. 28, Feb. 4, 2010).
Docket report of *Waters Industries, Inc. v. Kikkerland Design, Inc.*, United States District Court for the Northern District of Illinois, Case No. 1:10-cv-04076, filed Jun. 30, 2010, 4 pages.
"Complaint", *Waters Industries, Inc. v. Kikkerland Design, Inc.*, United States District Court for the Northern District of Illinois, Case No. 1:10-cv-04076, 21 pages (Docket No. 1, Jun. 30, 2010).
"Kikkerland Design, Inc.'s Answer to Complaint, Affirmative Defenses and Counterclaim", *Waters Industries, Inc. v. Kikkerland Design, Inc.*, United States District Court for the Northern District of Illinois, Case No. 1:10-cv-04076, 12 pages (Docket No. 17, Aug. 6, 2010).
"Complaint" with Exhibit A through D, *Waters Industries, Inc. v. JJI International, Inc., et al.*, United States District Court for the Northern District of Illinois, Case No. 1:11-cv-03791, 73 pages (Document No. 1, Jun. 3, 2011).
"Defendants' Answer and Counterclaim" and "Responses to Specific Allegations", *Waters Industries, Inc. v. JJI International, Inc. and Stein Mart, Inc.*, United States District Court for the Northern District of Illinois, Case No. 1:11-cv-03791, 16 pages (Document No. 15, Jun. 28, 2011).
"Plaintiff's Initial Infringement Contentions Under Local Patent Rule 2.2" with Appendix A through F, *Waters Industries, Inc. v. JJI International, Inc. and Stein Mart, Inc.*, United States District Court for the Northern District of Illinois, Case No. 1:11-cv-03791, 44 pages (Jul. 26, 2011).
"Defendants' Initial Non-Infringement and Invalidity Contentions" with Appendix A though G, *Waters Industries, Inc. v. JJI International, Inc. and Stein Mart, Inc.*, United States District Court for the Northern District of Illinois, Case No. 1:11-cv-03791, 78 pages (Aug. 9, 2011).
"Plaintiff's Initial Response to Invalidity Contentions Under Local Patent Rule 2.5" with Appendix A and B, *Waters Industries, Inc. v. JJI International, Inc. and Stein Mart, Inc.*, United States District Court for the Northern District of Illinois, Case No. 1:11-cv-03791, 29 pages (Aug. 23, 2011).
"Defendants' Final Invalidity Contentions" with Appendix A though D, *Waters Industries, Inc. v. JJI International, Inc. and Stein Mart, Inc.*, United States District Court for the Northern District of Illinois, Case No. 1:11-cv-03791, 33 pages (Feb. 21, 2012).
"Plaintiff's Final Infringement Contentions Under Local Patent Rule 3.1" with Appendix A though F, *Waters Industries, Inc. v. JJI International, Inc. and Stein Mart, Inc.*, United States District Court for the Northern District of Illinois, Case No. 1:11-cv-03791, 58 pages (Feb. 21, 2012).
"Plaintiff's Response to Defendants' Final Invalidity Contentions Under Local Patent Rule 3.2" with Appendix A though D-4, *Waters Industries, Inc. v. JJI International, Inc. and Stein Mart, Inc.*, United States District Court for the Northern District of Illinois, Case No. 1:11-cv-03791, 73 pages (Mar. 19, 2012).
"Complaint", *Waters Industries, Inc. v. JJI International, Inc.*, United States District Court of the Northern District of Illinois, Case No. 1:12-cv-06195, 4 pages (Aug. 7, 2012).
"Defendant's Answer, Affirmative Defenses and Counterclaim", *Waters Industries, Inc. v. JJI International, Inc.*, United States District Court of the Northern District of Illinois, Case No. 1:12-cv-06195, 9 pages (Sep. 4, 2012).
"Plaintiff's Answer to Defendant's Counterclaims", *Waters Industries, Inc. v. JJI International, Inc.*, United States District Court of the Northern District of Illinois, Case No. 1:12-cv-06195, 4 pages (Sep. 28, 2012).
"Plaintiff's Initial Infringement Contentions Under Local Patent Rule 2.2" with Appendix A through B, *Waters Industries, Inc. v. JJI International, Inc.*, United States District Court of the Northern District of Illinois, Case No. 1:12-cv-06195, 30 pages (Oct. 2, 2012).
"Defendant's Initial Non-Infringement and Invailidity Contentions" with Appendix A through B and Figure D1, *Waters Industries, Inc. v. JJI International, Inc.*, United States District Court of the Northern District of Illinois, Case No. 1:12-cv-06195, 31 pages (Oct. 16, 2012).
Notification of Transmittal of the International Search Report and the Written Opinion of the International Searching Authority, or the Declaration from the International Bureau of WIPO for International Application No. PCT/US2012/071418, dated Mar. 13, 2013, 14 pages.
Extended European Search Report from European Application No. 11742828.5 dated Sep. 1, 2014, 12 pages.

\* cited by examiner

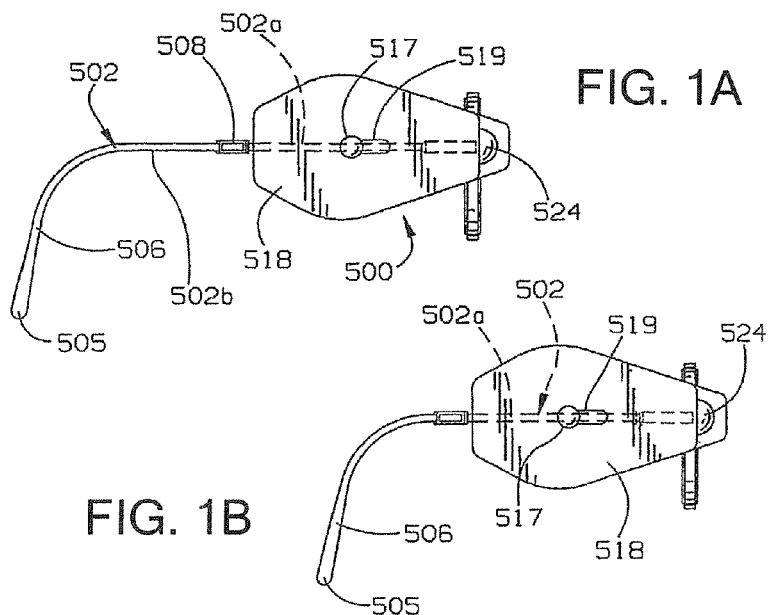
FIG. 1A
FIG. 1B
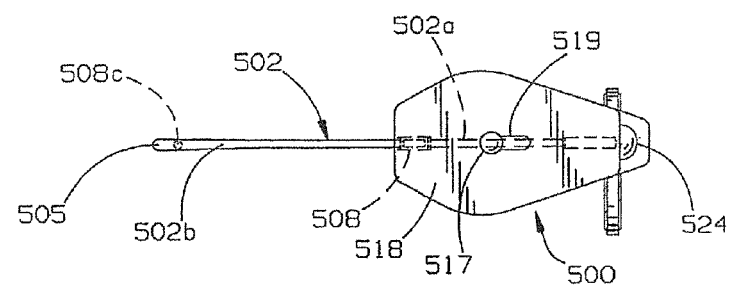
FIG. 2A
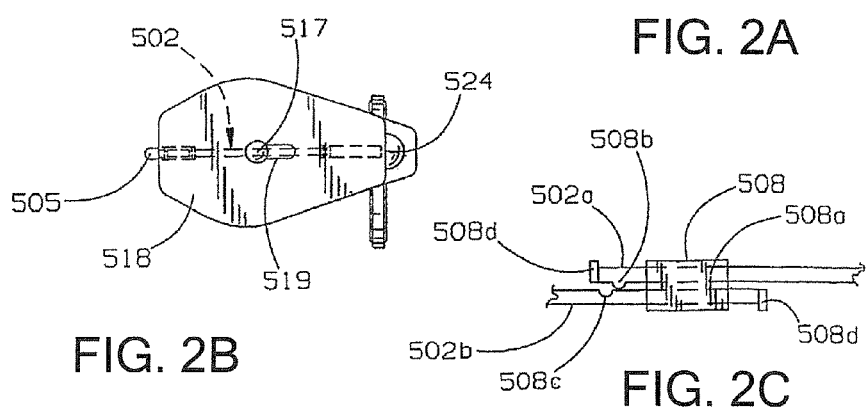
FIG. 2B
FIG. 2C

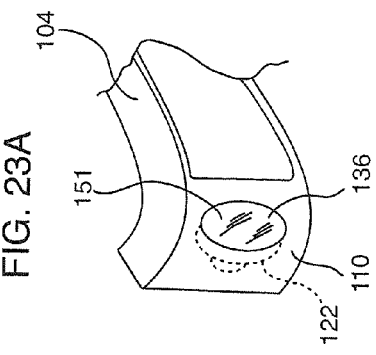
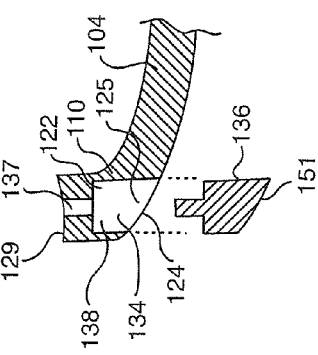
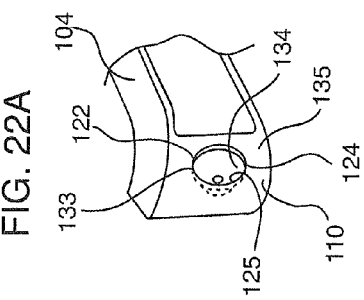
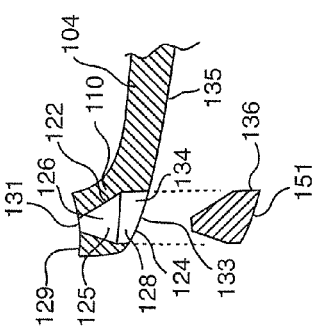
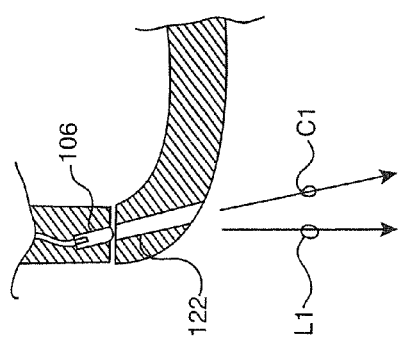
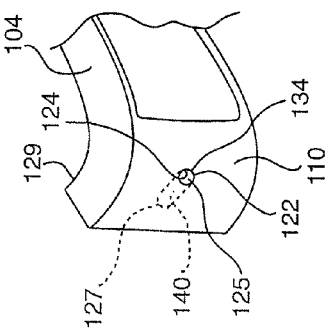

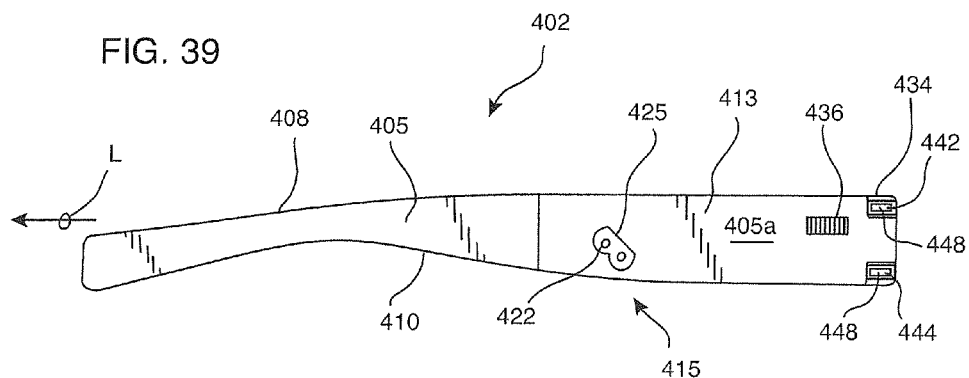
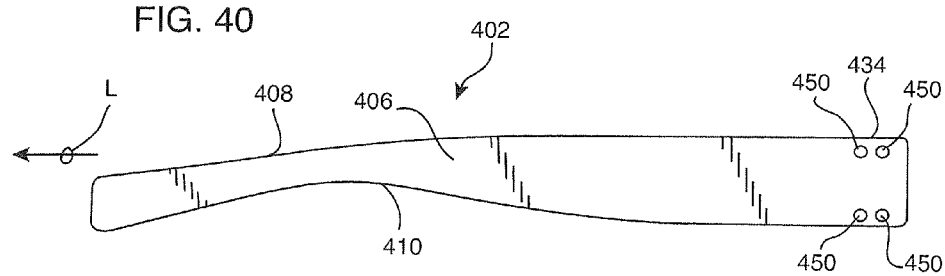
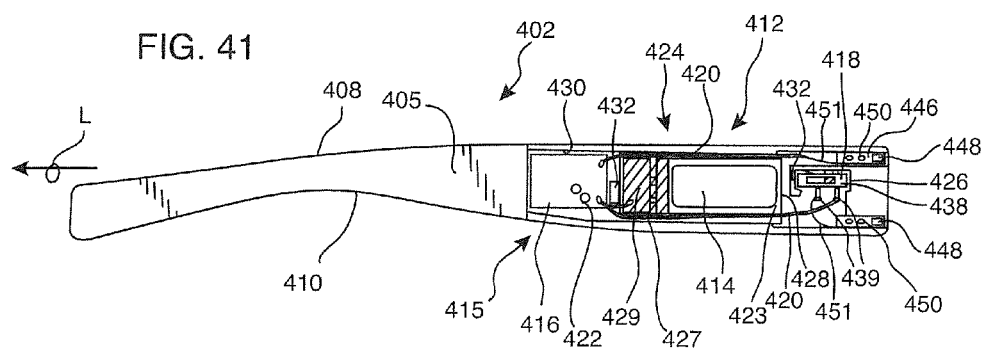

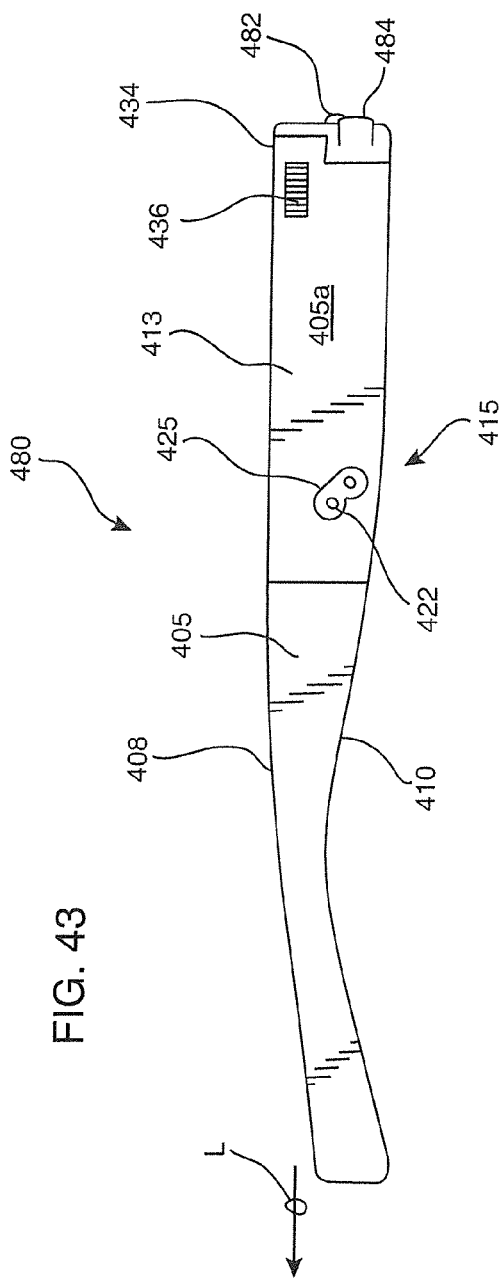
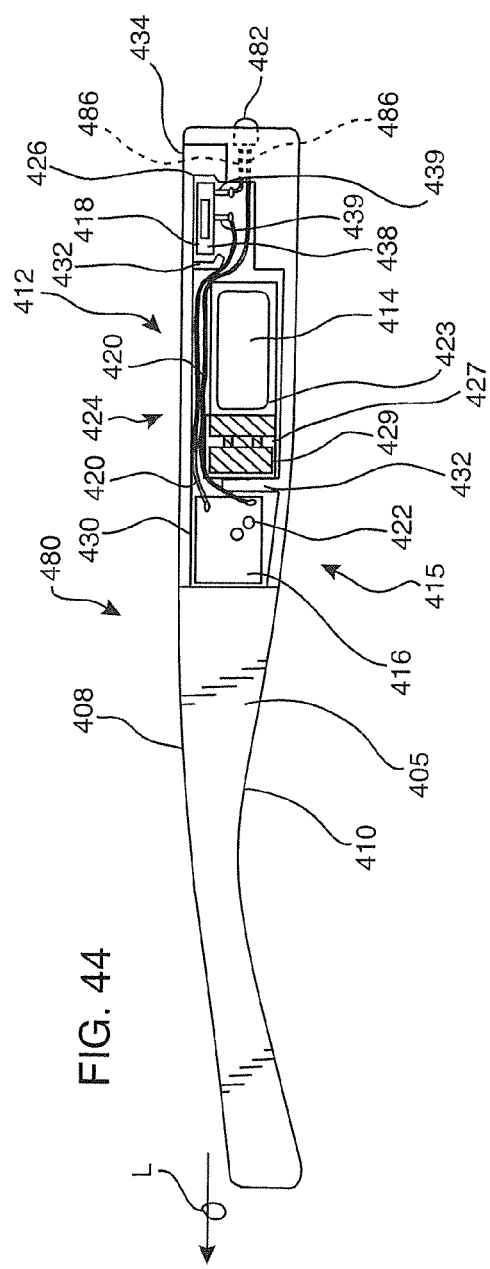
FIG. 43
FIG. 44

RECHARGEABLE LIGHTED GLASSES

CROSS-REFERENCE TO RELATED APPLICATIONS

This application is a continuation-in-part of U.S. application Ser. No. 11/941,558, filed Nov. 16, 2007, which is a continuation-in-part of prior International Appl. No. PCT/US2006/018968, filed May 17, 2006, which claims the benefit of U.S. Prov. Appl. No. 60/681,852, filed May 17, 2005, and U.S. Prov. Appl. No. 60/746,217, filed May 2, 2006, which are all hereby incorporated by reference herein in their entirety.

This application is also a continuation-in-part of U.S. application Ser. No. 13/025,100, filed Feb. 10, 2011, which claims the benefit of U.S. Prov. Appl. No. 61/303,212, filed Feb. 10, 2010, which are both hereby incorporated by reference herein in their entirety.

This application is also a continuation-in-part of U.S. application Ser. No. 12/895,456, filed Sep. 30, 2010, which claims the benefit of U.S. Prov. Appl. No. 61/247,243, filed Sep. 30, 2009, which are both hereby incorporated by reference herein in their entirety.

FIELD OF THE INVENTION

The invention relates to hands-free lighting devices and, more particularly, to illuminated eyewear.

BACKGROUND OF THE INVENTION

Often an individual desires a light source to illuminate an area while performing a task or a light source directed in a general outward direction for visibility. Holding a flashlight is an option, but such lighting devices are often cumbersome and may detract from the task being completed because the flashlight must be held. As a result, hands-free lighting is often used because the individual desiring illumination does not need to hold the light source. Common types of hand-free lighting include light sources mounted to headgear or eyeglasses.

Light sources on eyeglasses usually include mounting arrangements of the light source, which may be an LED, on either the cross-frame or temple of the eyeglass so as to provide illumination forwardly of the wearer. In such configuration, lighted eyeglasses can be used to provide directed or focused light so that an area immediately forward of the wearer, e.g., 6-24 inches from their eyes, can be illuminated for tasks such as reading typical sized print. For other activities, such as walking at night, camping or everyday use, lighting areas even further ahead of the individual may be desirable. However, prior lighted glasses configured to provide hands-free lighting for some of these various purposes have often been heavy, bulky, inconvenient, and/or have an unsightly appearance where the lighting is conspicuous on the lighted glasses.

In this regard, some prior lighted glasses have separate and bulky lighting modules fastened to the glasses such as disclosed in U.S. Pat. Nos. 5,541,767 to Murphy et al.; 4,959,760 to Wu; and 3,769,663 to Perl. These glasses are heavy and/or bulky making them inconvenient for a user to wear. In addition, these prior lighted glasses conspicuously mount the lighting modules to the glasses or incorporate electronic components for the lighting therein so that the presence of the light modules or electronic components is visually prominent when the glasses are worn, giving the glasses an unsightly appearance.

Another problem presented by prior lighted glasses is that the batteries powering the light sources need to be replaced after they have drained. Thus, a user of the lighted glasses must keep spare batteries sized for the respective lighted glasses, which can be irregular shapes and sizes. Moreover, a manufacturer of the prior lighted glasses must then also make a cover that is easy to open or remove for the battery compartment of the lighted glasses so a user can easily gain access to the drained batteries to replace them, which can complicate designs and require additional components driving up costs.

SUMMARY OF THE INVENTION

Rechargeable lighted glasses are provided that can selectively provide light forwardly thereof. In one form, the rechargeable lighted glasses include a pair of temple portions and a cross-frame member extending between the pair of temple portions. A light source is mounted to at least one temple portion so as to be configured to direct light forwardly thereof. A rechargeable power source is mounted to the one temple portion and is coupled to the light source to provide power thereto. A recharging interface is disposed along the one temple portion and is electrically coupled to the rechargeable power source to provide recharging power thereto. In this manner, the rechargeable lighted glasses do not require a user to replace batteries when the power is drained therefrom. Instead, when the battery power is low or drained, a user can recharge the rechargeable power source so that the rechargeable lighted glasses can be used for hands-free lighting.

In another form, rechargeable illuminated eyewear includes a pair of elongate temple arms each having forward and rearward end portions and inner and outer surface portions. A cross-frame includes a bridge portion and extends laterally between the forward end portions of the temple arms. The temple arms and the bridge portion are adapted to be supported on a user's ears and nose, respectively. A pivot connection is disposed between each of the forward end portions of the temple arms and the cross-frame so that the temple arms can pivot open and closed relative to the cross-frame. When closed, the temple arms extend generally laterally along the front support and, when open, the temple arms extend in a fore-and-aft longitudinal direction so that the rearward end portions thereof are distal from the cross-frame. A light source having a lens is mounted to each temple arm at the forward end portion thereof to project light forwardly thereof. A rechargeable power source mounted to each temple arm is configured to provide power to the light source and is received within a narrow power source compartment of each temple arm. The power source compartment is between the respective inner and outer surface portions thereof and has a thin lateral width between the temple arm inner and outer surface portions sized to receive the rechargeable power source therein. A recharging interface is disposed in each of the temple arms and electrically coupled to the rechargeable power source to provide power thereto. The recharging interface is exposed along the temple arm for being connected to a power source charging device for charging the rechargeable power source.

By another approach, rechargeable illuminated eyewear include a pair of elongate temple arm members, each having forward and rearward ends. A cross-frame member of the eyewear has opposite ends at which the forward ends of the temple arm members are pivotably connected. Each of the temple arm members includes an opening in the forward end thereof. An LED is received within each of the openings of the temple arm members. The LEDs each include a lens. Opposite inner and outer surface portions of each of the temple arm members are laterally spaced from each other and extend lengthwise along the respective temple arm members adjacent to the forward ends thereof. The temple arm members each include a thin rear portion and an enlarged forward portion. The enlarged forward portion is laterally thicker between the opposite inner and outer surface portions and vertically larger in a vertical direction along the opposite inner and outer surface portions than the temple arm member thin rear portion. Each temple arm member further includes a tapered portion that tapers from the vertically larger forward portion to the thin rear portion to transition therebetween. Each temple arm member also includes a battery compartment between the opposite inner and outer surface portions that is sized to receive a rechargeable battery therein for providing power to the LED. A recharging interface is mounted to each temple arm member adjacent to the power source compartment with the rechargeable power source therein and is electrically coupled to the rechargeable battery for providing recharging power thereto. Electrical contacts of the recharging interface are exposed along each temple arm member.

In another form, the rechargeable illuminated eyewear is provided in combination with a battery charger device that is operable to connect to an outlet of a power source and includes contacts configured to cooperate with the contacts of the recharging interface so that with the battery charger device electrically coupled to the recharging interface, the rechargeable battery is in electrical communication with the power source for charging the rechargeable battery.

BRIEF DESCRIPTION OF THE DRAWINGS

FIG. 1A is a side elevational view of lighted eyeglass frames showing one of the temple arms in an extended position and a light module attached to the arm;

FIG. 1B is a side elevational view of the lighted eyeglass frames of FIG. 1A showing the arm in a retracted position;

FIG. 2A is a side elevational view of alternative/lighted eyeglass frames showing one of the temple arms in an extended position and a light module attached to the arm;

FIG. 2B is a side elevational view of the lighted eyeglass frames of FIG. 2A showing the arm in a retracted position;

FIG. 2C is an enlarged, fragmentary view of the temple arms of FIGS. 1A, 1B, 2A, and 2B showing a releasable locking structure between forward and rearward segments of the arm;

FIG. 21 is an enlarged perspective view of a cross-frame member showing a pass-through feature formed at an end portion thereof;

FIG. 21A is a top cross-section view of a cross-frame member and a temple arm member in the use configuration with a light source mounted to the temple arm member and a pass-through portion of the cross-frame member having coaxial cant axes;

FIG. 22A is an enlarged perspective view of a cross-frame member showing a different pass-through feature on the end portion thereof and an associated insert;

FIG. 22B is an enlarged fragmentary plan view in section showing the cross-frame member and insert of FIG. 22A with the insert removed from the opening in the cross-frame member for the insert;

FIG. 23A is an enlarged perspective view of a cross-frame member showing another pass-through feature on the end portion thereof and an associated insert;

FIG. 23B is an enlarged fragmentary plan view in section showing the cross-frame member and insert of FIG. 23A with the insert removed from the opening in the cross-frame member for the insert;

FIG. 39 is an enlarged side view of a temple arm member of the illuminated eyewear of FIG. 38 showing the inner surface thereof including a cover covering an electronic assembly compartment;

FIG. 40 is an enlarged side view of a temple arm member of the illuminated eyewear of FIG. 38 showing the outer surface thereof;

FIG. 41 is an enlarged side view of the temple arm member of similar to FIG. 39 but with the cover removed showing an electronic assembly including a circuit board, a rechargeable power source, and a switch device received within the electronic assembly compartment and electrically coupled to upper and lower hinge portions;

FIG. 43 is an enlarged side view of a temple arm member configured to pivotably couple to any of the cross-frame members of FIGS. 15-23 showing an inner surface thereof including a cover covering an electronic assembly compartment;

FIG. 44 is an enlarged side view of the temple arm member of FIG. 43 showing the electronic assembly including a circuit board, a rechargeable power source, a switch device, and a light source received in the electronic assembly compartment;

DETAILED DESCRIPTION OF THE PREFERRED EMBODIMENTS

Figure 3:
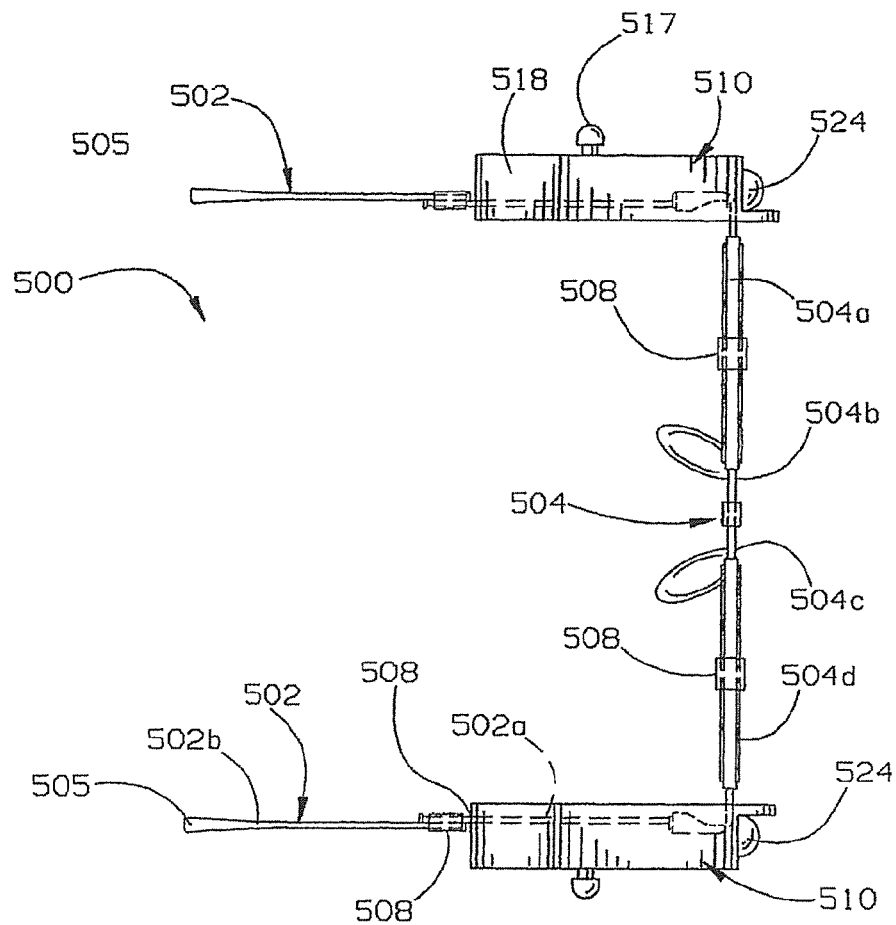
FIG. 3 is a plan view of the lighted eyeglass frames of FIG. 1 showing both of the temple arms and a cross-frame member extending between the forward ends of the arms in an extended position.

Illuminated eyewear is provided that directs light forwardly from the user when wearing the eyewear.

The illuminated eyewear herein is in the form of eyeglasses, either with or without lenses, or with a lens or lenses that can be refractive or non-refractive, that in one aspect has light sources arranged so as to optimize their performance. In another aspect, the illustrated eyewear herein has electrical components for the light sources arranged to provide enhanced aesthetics over prior lighted eyeglasses. The frame of the eyewear herein can have a single-piece construction or can have temple arm members that are pivotable with respect to a cross-frame member.

In one form, the eyewear includes a cross-frame, or cross frame member or portion with, at least in part, a bridge portion that extends generally laterally along a front lateral axis. The eyewear further includes a pair of temple arm members or temple portions, which can be integral with the cross-frame portion or pivotable about a pivot connection between each of the temple arm portions and the cross-frame portion. The cross frame portion includes outer front portions adjacent to the temple arm portions in the use configuration. A use configuration of the temple arm portions corresponds to the temple arm portions extending rearwardly from the cross-frame portion, which by one approach extends along respective fore-and-aft axes that are generally orthogonal to the cross-frame lateral axis. In the pivotable configuration, the temple arm portions further include a storage configuration with the temple arm portions pivoted about the pivot connections to generally extend laterally adjacent to the cross-frame portion generally along the lateral axis. Adjacent to each of the outer front portions is a light source, which in the preferred form is an LED.

The cross-frame portion can also include pass-through portions of the outer front portions thereof oriented forwardly of the respective light sources. Being oriented forwardly of the light source places the pass-through portion at least partially within a light projection area for the light source. The pass-through portion is configured to allow light projected from the light source to project through the cross-frame portion to an area forwardly of the cross-frame portion. The pass-through portion can be a transparent, translucent, refractive, tinted, wavelength/color filter, diffusing, or the like, portion of the cross-frame portion or member, can be an opening or cavity in the cross-frame member/portion, or throughbore through the cross-frame portion. In the throughbore example, the pass-through portion can include a cap of material fitted therein which can be transparent, translucent, refractive, tinted, a wavelength/color filter, diffusing, or the like. Preferably, a forward surface of the cap is substantially flush with a forward surface of the cross-frame portion.

Illuminated eyewear including the above-discussed pass-through portion in the cross-frame portion is configured such that, with the temple arm portions or members in the use configuration, the cross-frame portion substantially hides the light sources from view along the sides of the illuminated eyewear, which preserves an aesthetic of traditional eyeglasses. The pass-through portion, however, also allows the illuminated eyewear to project light forwardly of the eyeglasses.

Another form of illuminated eyewear includes a pair of temple arm portions, each having rear end portions configured to rest on a user's ears and opposite forward end portions. The illuminated eyewear further includes a front support portion that includes opposite end portions and an intermediate bridge portion configured to rest on a user's nose. Pivot connections are positioned between the forward end portions of the temple arm portions and the opposite end portions of the front support portion. So configured, the temple arm portions and the front support portion have a use configuration where the front support portion generally extends along a lateral axis and the temple arm portions extend along longitudinal axes that are generally orthogonal to the lateral axis. A light source is mounted adjacent to each of the pivot connections. A power source compartment is provided in each of the forward end portions of the temple arm portions. The power source compartment is sized to house a pair of batteries, such as coin cell batteries, in a side-by-side orientation or a rechargeable power source therein.

The power source compartment may further include an opening provided on a bottom surface of each temple arm portion. A movable door is mounted to each temple arm portion and can be shifted between a first position where the power source compartment is closed and a second position where the power source compartment is open.

In yet another form, the illuminated eyewear includes a pair of temple arm members, each having forward and rearward ends, and a front support including, at least in part, a bridge portion that extends laterally between the forward ends of the temple arm members. A hinge is positioned between each of the forward ends of the temple arm members and the laterally extending front support that allows each temple arm member to be shifted between an open configuration, where the temple arm members are pivoted away from the laterally extending front support to extend rearwardly therefrom, and a closed configuration, where the temple arm members are pivoted toward the laterally extending front support to extend therealong adjacent thereto. Each temple arm member includes a light source mounted thereto for projecting light therefrom, a power source for providing power to the light source, and a switch for turning the light source on and off. Each temple arm member also includes an adjustment mechanism that is configured to varying the light intensity emitted by each light source, such as in response to manipulation by a user. This form provides light intensity variations that can be utilized to provide a softer intensity or brighter intensity when desired.

In still a different form, the illuminated eyewear includes a pair of temple arm members, each having forward and rearward ends, and a front support including, at least in part, a bridge portion that extends laterally between the forward ends of the temple arm members. A hinge is positioned between each of the forward ends of the temple arm members and the laterally extending front support that allows each temple arm member to be shifted between an open configuration, where the temple arm members are pivoted away from the laterally extending front support to extend rearwardly therefrom, and a closed configuration, where the temple arm members are pivoted toward the laterally extending front support to extend therealong adjacent thereto. Each temple arm member includes a light source mounted thereto for projecting light therefrom, a power source for providing power to the light source, and a switch for turning the light source on and off.

Each light source also includes light modifying material disposed thereon, where the material is selected so as to change the normal or typical appearance of the light beam projected through a typical transparent lens of the light source, such as including a translucent or diffusing coating on the light source lens to soften an appearance of light emitted from the light source, including a refractive coating to focus or diverge the light emitted from the light source, including a tinted coating so that light emitted from the light source has a desired color, and/or including a color and/or wavelength filter coating on the light source lens.

In one form, the eyewear includes a pair of temple arm members where each temple arm member has a forward and rearward end. Each temple arm member also has inner and outer surface portions that have a flat configuration and extend lengthwise between the forward and rearward ends of the respective temple arm members. In this form, the eyewear further includes a front support including, at least in part, a bridge portion that extends between the forward ends of the temple arms members. So configured, the temple arm members and the bridge portion are adapted to be supported on a user's ears and nose. Pivot connections couple the temple arm members with the front support allowing the temple arm members to pivot relative thereto. The eyewear also includes at least one light source mounted to the front support, which is powered by a plurality of thin, compact generally flat disc-shaped batteries, such as conventional disc-shaped coin-cell batteries. Alternatively, each light source can be powered by a single, thin compact generally flat rectangular rechargeable battery or other power source, such as one or more capacitors or other electronic device capable of storing energy. Preferably, the at least one light source is received within a cut-out or opening formed in the front support, and more preferably the light source is entirely received within the cut-out in the front support so that the light source is hidden when viewed from the side. A pass-through portion of the front support is provided, such as in the form of a laminate layer or light transmissive coating, which can be painted or dipped, extending over the opening, in covering relation thereto to enclose the light source therein. The pass-through layer or coating allows at least some of the light emitted from the light source to shine forwardly of a wearer of the illuminated eyewear, while also providing protection for the light source and preserving a traditional aesthetic for the illuminated eyewear so that, for example, a front surface of the front support can have a substantially continuous, unbroken configuration and appearance.

By embedding the light source or light sources in the front support, the illuminated eyewear in this form has an appearance more similar to conventional non-illuminated eyewear, such as with the light sources hidden from view. For example, prior lighted eyeglasses commonly have light modules mounted to an outer surface of eyeglass temple arms or on an outer surface of the front frame. Configured this way, prior light modules extend outwardly from the outer surfaces, making the eyewear significantly wider and prominently displaying the module so it can be readily seen when the lighted eyeglasses are worn. This conspicuous display of lighting components in prior lighted eyeglasses detract from the aesthetics and appearance of the eyewear. The illuminated eyewear disclosed in certain forms herein, on the other hand, has all of the lighting components either mounted on an inside surface of the temple arm members or embedded within the front support. This configuration is such that it is not immediately apparent that the illumination components are present on the glasses, instead having an aesthetic substantially similar to conventional eyeglasses when being worn.

In certain forms of the illuminated eyewear, the at least one light source can include an inward and/or downward cant so that the at least one light source advantageously projects light forwardly of the wearer in a field of view that generally corresponds to where an object to be viewed will be held by the wearer. Thus, the wearer does not need to tilt or shift their head to align the light sources or orient the illumination to focus the light beams within this field of view. With lighted glasses having two or more light sources, the light sources can have different vertical and/or horizontal cant angles to illuminate two or more different areas forwardly of the lighted glasses.

Also, it should be recognized that in certain eyeglass frames the temple and cross-frame portions can be formed as a single, unitary component lacking pivot or hinge connections therebetween. In this instance, the above discussed cross-frame and temple arm members and their associated features including the lighting components will correspond to a cross-frame portion and temple arm portions that extend rearward from the cross-frame portion in a unitary frame.

Referring now to FIGS. 1A-14, another hands-free lighting embodiment is illustrated, which includes lighted eyeglass frames 500. In general, the lighted eyeglass frame 500 described herein includes a light source mounted onto a portion of the frame for directing light forwardly of the wearer together with a variety of different options to energize the light source.

In one embodiment, as shown in FIGS. 1-4, a light module 518 with a light source or LED 524 is mounted to a collapsible eyeglass frame assembly 500 to form the lighted eyeglasses. The eyeglass frame assembly 500 is configured as a typical eyeglass frame assembly having a pair of spaced temples or arms 502, and a cross-frame member 504 extending therebetween and pivotally connected to each of the temples at either end thereof. The cross-frame member 504 includes an appropriate bridge structure intermediate the ends so that the frame 500 may rest on the bridge of an individual's nose (FIG. 3). The temples 502 extend rearwardly from the spaced ends of the cross-frame member 504 and may also include a downwardly projecting ear portion 506 so that the end 505 of each temple 502 may conform to or extend around an individual's ear (FIG. 1A). Alternatively, the temples may extend generally straight back from the cross-frame member 504 without the ear portion 506 (FIG. 2A). The frame assembly 500 shown in FIGS. 1-3 includes both a retracted position and an extended position.

Figure 4A:
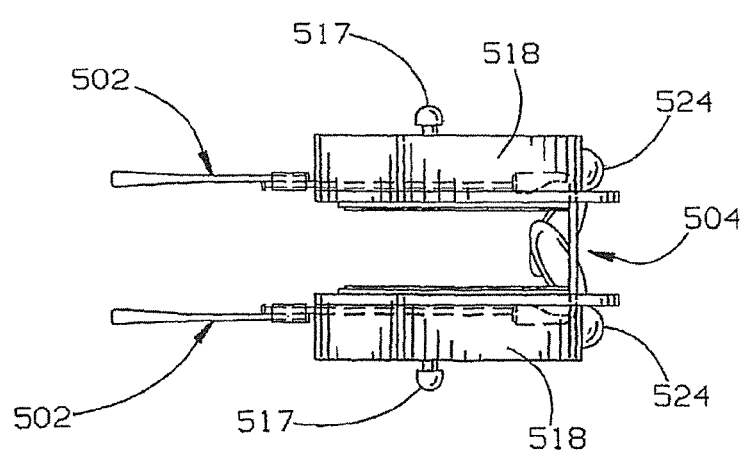
FIG. 4A is a plan view of the lighted eyeglass frames of FIGS. 1A and 1B showing both the temple arms and the cross-frame member in their retracted positions.
Figure 4B:
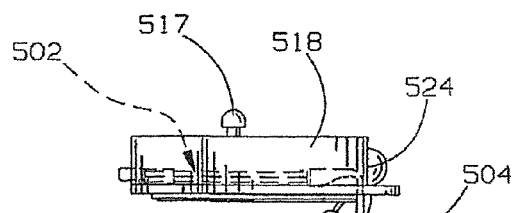
FIG. 4B is a plan view of the lighted eyeglass frames of FIGS. 2A and 2B showing both the temple arms and cross-frame member in their retracted positions.

In the retracted position or state the cross-frame member 504 and temples 502 are preferably collapsed such that the frame 500 is in a more compact form for ease of storage and protection (FIGS. 1B, 15B, 4A, and 4B). As further discussed below, the cross-frame member 504 and each temple 502 separately retract to form the compact structure. In the retracted state, the cross-frame member 504 and temples 502 are generally protected by the light module 518 because, as further described below, the cross-frame member 504 and temples 502 are partially or substantially covered by the light module 518. In other words, the arms 502 will generally not project very far if at all beyond the light modules, and only a small section of the cross-member 504 will be exposed to extend between the modules 518, as can be seen in FIGS. 4A and 4B. Furthermore, in the retracted position, the lighted frame assembly 500 is sufficiently compact to be used as a mini-flashlight. In the retracted position, the modules 524 generally form a double-module LED flashlight, as shown in FIG. 4B.

The illustrated lighted eyeglasses 500 include the light modules 518 mounted to each of the temples 502. The LEDs 524 are configured to provide illumination forwardly of the eyeglasses 500 within the field of view of a wearer. To this end, the light module 518 or the LEDs 524 may be canted inwardly and/or downwardly, such as about 5 degrees, to provide a light beam that is more focused into a wearer's field-of-view. Canting the LEDs in their respective housings can be done as described in Applicant's U.S. Pat. No. 6,612,696, which is incorporated as if reproduced in its entirety herein. Further, the light beam is provided more directly in the wearer's field of view by being angled inwardly and downwardly relative to the frame temples 502. If the light modules 518 or LEDs 524 are canted in such a manner, it should not be necessary to manually pivot or cant the light to direct the illumination.

More specifically, the light module 518 has the LED 524 protruding therefrom for emanating light therefrom. The modules 518 are mounted to each of the temples 502. The module 518 preferably houses the components needed to illuminate the LEDs 524. For instance, the module 518 has a switch that includes an actuator portion 517 that projects through an elongated slot 519. The actuator portion 517 is designed such that a user's thumb or finger can quickly and easily engage the actuator portion 517 to push or pull the switch for sliding in either one of two directions to turn the light module 518 on and off. The elongated slot 119 is sized such that the switch actuator can be moved only a preset distance, thereby enabling the on and off functions to be accomplished with a minimum of motion. When the switch is moved to the "on" position, batteries that are internally housed in the light module 518 energize the LED 524. Similarly, when the switch is moved to the "off" position, the connection between the batteries, which can be a rechargeable battery, and the LED 524 is broken and the LED 524 is turned off. In an exemplary form, the module 518 may be similar to the light modules illustrated and described in the previously incorporated '696 patent. As illustrated, the modules 518 may be integrally formed with the temples 502, but the modules 518 may also be separately mounted to the temples 502 with fasteners or the like as in the '696 patent.

As mentioned above, the eyeglass frame 500 includes both retracted and extended states. In this regard, each of the temples 502 may include interconnected segments or members 502a and 502b that can slide relative to each other so that the temple 502 may be shifted between a retracted position (FIGS. 1B and 2B) and an extended position (FIGS. 1A and 2A). Similarly, the cross-frame member 504 also preferably includes interconnected segments or members 504a, 504b, 504c, and 504d that retract and extend in a similar manner (FIGS. 3 and 4). The segments of the temples and cross frame member can also telescope to extend and retract with one of the segments having a tubular or c-shaped structure so that the connected segments can slide in and out therefrom. While the cross-frame member 504 and temple 502 are illustrated with specific number of segments, more or less segments may also be used depending on the size and strength of the frames desired.

More specifically, in the retracted condition of the temples 502, the temple segment 502b retracts or slides relative to temple segment 502a either into a temple receiving compartment in the module 518 or alongside the module 518 at an outer surface thereof so that at least a portion of each of the temple segments are superimposed over each other and overlap the module 518. As illustrated in FIG. 1B, in the retracted condition, the ear portion 506 extends beyond the module 518. However, the projecting ear portion 506 is much smaller than the fully extended temple arm 502. The extent to which the temple arm 502 projects beyond the module when the arm is retracted may vary depending on the size and angle of ear portion 506 as it is not uncommon for the configuration of the ear portion 506 to vary based on the comfort needs of the individual wearer. Alternatively, if the temples 502 do not have a specially contoured ear portion 506, but a straight temple portion, then substantially the entire temple 502 may overlap the module 518 when retracted. For example, as illustrated in FIG. 2B, if the temple portion 502 is generally straight, then the temple segments 502a and 502b may retract into a position such that each segment 502a and 502b substantially overlaps each other and the module 518 but for a small projecting end section 505 of the temple. In this configuration, substantially the entire temple 502 is protected from damage in the retracted state by the module 518 because the temple 502 is retracted into or alongside the module 518. The larger width size of the module 518 transverse to the length of the temple arm 502 protects the elongate, thin temple portion 502.

In the extended state of the temples 502, each of the segments 502a and 502b are extended outwardly from the module 518 so as to form traditional temples of common eyeglasses (FIGS. 1A, 2A, and 3). As illustrated in FIG. 2C, the temple segments 502a and 502b may include a releasable locking structure 508 therebetween such that the extended temple segments may be held in their extended and retracted positions. That is, the locking structure 508 may include, for example, a retaining sleeve member 508a through which the temple segments 502a and 502b extend, a boss or other protrusion 508b on an end of one of the temple segments and a corresponding detent or groove 508c on an adjacent end of the other temple segment that engage and register so that the protrusion 508b seats in the groove 508c upon the segments reaching a predetermined, extended position relative to each other to releasably hold the temple segments in the extended state. The locking structure 508 may also include stop members 508d on ends of each segment that interfere with the retaining member 508a to avoid having the temple arms separate from each other. In addition, the end 505 of the temple arm 502b may also include a detent 508c to engage the protrusion 508b when the temple arm 502b is retracted. Manifestly, the locations of the protrusions 508b and detent grooves 508c can be reversed, or a pair of protrusions 508b can be provided on one of the arm segments with a single groove 508c formed in the other arm segment.

Referring now to FIGS. 3, 4A, and 4B, as mentioned above, the cross-frame member 504 may also include a retracted and extended position. As illustrated in FIG. 3, the frame 500 is shown in the extended position resembling a traditional eyeglass frame. FIGS. 4A and 4B illustrate the cross-frame member 504 and temple arms 502 of the frame 500 in the retracted position with FIG. 4A showing the retracted temple arms 502 having arcuate ear portions 506 (FIG. 1B) and FIG. 4B showing the retracted, straight temple arms 502 (FIG. 2B).

To achieve the retracted position of the cross-frame member 504, a user slides the outer segments 504a and 504d of the cross-frame member 504 inwardly toward each other such that the temples 502 and the attached or integrated modules 518 are moved laterally toward each other. It can be appreciated that the cross-member frame 504 can be retracted with the temples 502 either in the retracted or in the extended positions. In order to retract and extend, the cross-frame member 504 also includes connected segments or members 504a, 504b, 504c, and 504d. A user slides the segments inwardly such that segment 504a and 504b overlap to retract one side of the frame 500 and the segments 504c and 504d overlap to retract the other side of the frame 500.

The cross-frame member 504 is extended in a reverse manner by sliding or extending the segments 504a and 504d outwardly. As with the temples 502, the cross-frame member 504 preferably includes a similar locking structure 508 so that the cross-frame member 504 can be releasably held in either the retracted or extended positions.

When both the cross-frame member 504 and each temple 502 are retracted, the frame 500 is significantly more compact than the traditional eyeglass frame as best shown in FIGS. 4A and 4B. Preferably, the fully retracted frame 500 is about as wide as the depth of two modules 518 and about as long as each module 518. As previously stated, a small section 505 of the ear portion 506 may extend beyond the modules 518 in the retracted state so that, if the temple arm is retracted into the light housing 518, the projecting section 505 allows the user to pull the temple arm out of the housing back to its extended position. In this compact state, the frame 500 is easily placed in a pocket, bag, or purse until hands-free lighting is needed. The frame 500 may be expanded to be used as hands free lighting as previously described or used in the compact condition as a compact hand-held flashlight. Moreover, in this compact state, the frame 500 is protected from damage as the frame does not have elongate members that are easily bent or broken. As previously described, when the frame 500 is in the retracted state, the cross-frame member 504 and temple arms 502 are slid either into or alongside the light module 518. Therefore, in this state, the larger module 518 protects the more narrow frame portions 502 and 504 from being damaged when in a pocket or purse, for instance.

The eyeglass frame 500 may also include lenses similar to traditional glasses. For example, the frame 500 may include reading lenses, prescription lenses, protective or safety lenses, magnifying lenses, clear or non-refractive lenses, or the like. If included, the lenses would generally depend from the cross-member frame 504 or the cross-frame member 504 could also include portions that encircle the lenses. The lenses may have a pivot connection to the frame where the cross-frame member 504 and the temple arms 502 are pivotally connected. In this manner, the edge of the lenses opposite the pivot connection (i.e., near the bridge) may pivot inwardly from the cross-frame member 504 to the temple arms 502 to facilitate the retraction of the cross-frame member 504. On the other hand, a top edge of the lenses may be pivotally mounted to the cross-frame member 504 so that when the frame is in a retracted condition, the lenses may be pivoted up to the retracted frame structure. In such configurations, the frame 500, even with optional lenses, may be retracted into a compact form. Alternatively, the eyeglass frame 500 may be devoid of such lenses so that the frame 500 is configured simply to provide a form of headgear that provides for hands-free lighting.

Figure 10:
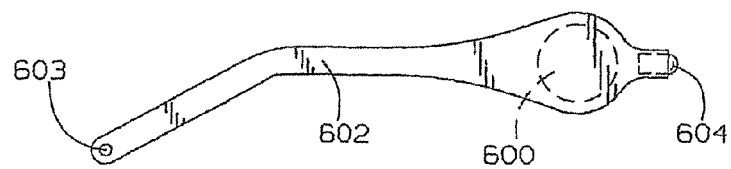
Figure 11:
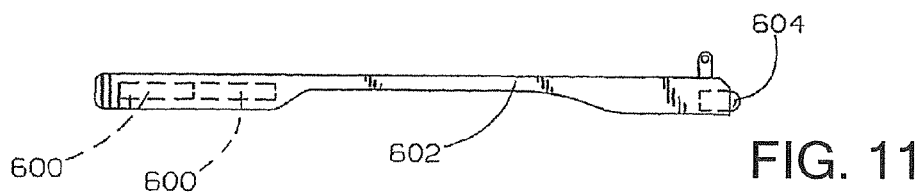
Figure 12:
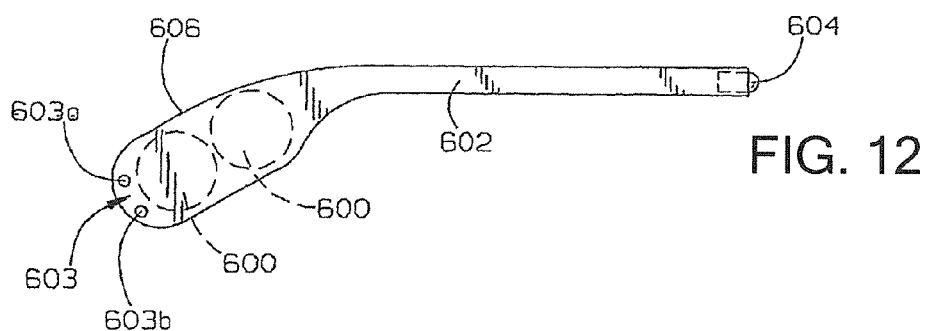

Referring to FIGS. 5-12, various alternative temple portions 602 are illustrated for the frame assembly 500. Herein, these alternative temple portions generally do not retract, but have different configurations and can include rechargeable batteries 600 and recharging contacts 603. As shown, the recharging contacts 603 include a positive contact 603a and a negative contact 603b, which may be in separate temple portions 602 (FIG. 13) or both in the same temple portion 602 (FIG. 12). The charging contacts 603 are for being electrically connected to corresponding contacts 654 of a separate battery charger.

The temple portions 602 include a light source 604, preferably an LED, housed within an opening or hollowed portion of the temple frame 610 and which protrude axially outward from the forward end 602a of the temple frame such that a light beam would be directed forwardly of the wearer, as previously described. The lights 604 may also be angled or canted inwardly or downwardly to provide a light beam more directly in the wearer's field of view. For example, the LED may tilt down about 5 degrees. The alternative temples 602 illustrated in FIGS. 5-12 generally can provide a more compact illumination device when worn than previously described with the light module 518 because the components to energize the light 604 are contained or integrated into the temple portions 602 rather than being within a separate module 518.

Figure 5:
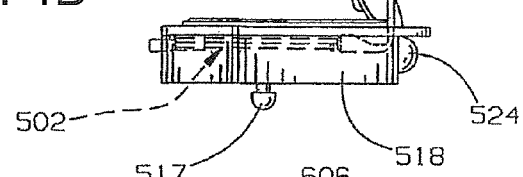
FIGS. 5-12 are plan and side elevational views of alternative temple portions for lighted eyeglass frames having integrated power sources and LEDs.
Figure 6:
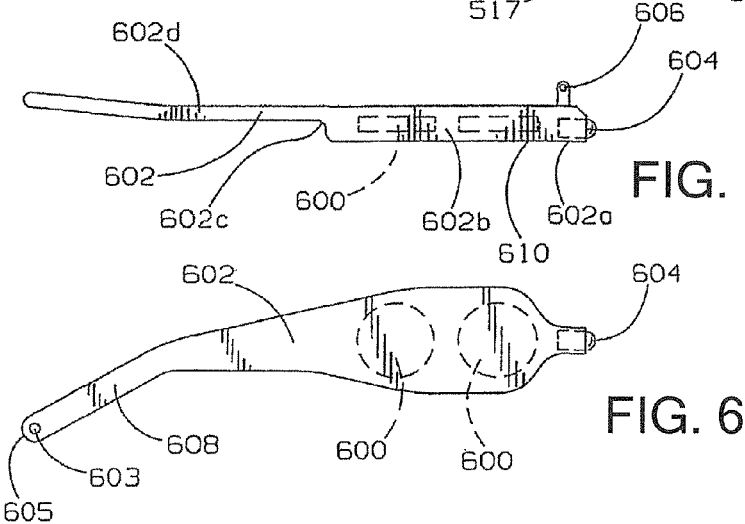
Figure 7:
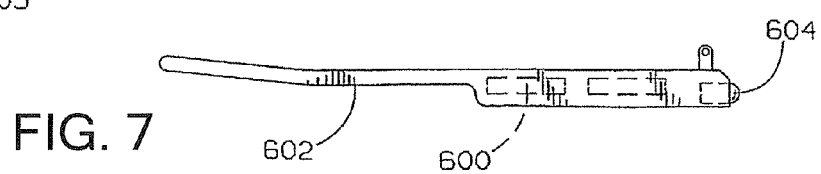
Figure 8:
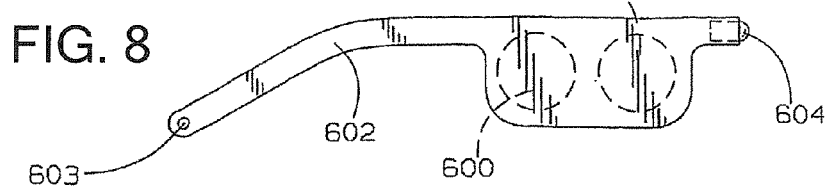

More specifically, FIGS. 5-6 illustrate two batteries 600 spaced longitudinally in the fore and aft direction that are housed internally in a forward portion 602b of the temple 602 adjacent pivot member 606. Alternatively, a single rechargeable battery 600 may be used. To contain the batteries, the forward portion 602b of the temple arm is enlarged in a direction transverse to its length and to the cross-frame member 504 with the lighted frames in their unfolded configuration for use. The forward portion 602b has a tapered configuration along its length. Also, the forward portion 602b is thicker than the narrower remainder or rear portion 602d of the temple arm with a shoulder 602c provided therebetween. The batteries 600 are in electrical communication with the recharging contact 603 at a distal end 605 of an ear portion 608 of the temple arm 602. As will be further described below, the recharging contacts 603 cooperate with contacts 654 of a separate battery charging module or unit 650. FIGS. 7 and 8 illustrate a similar battery arrangement, but show a temple 602 having a modified contour to house the longitudinally spaced batteries 600. Rather than a smooth taper, the forward portion of the arm has a rectangular configuration for receiving the batteries 600 therein.

Figure 9:
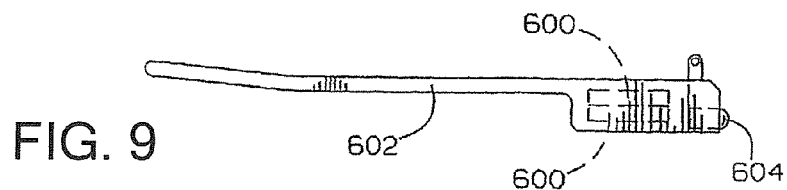

FIGS. 9 and 10 illustrate an overlapping battery configuration where the batteries 600 are stacked in a side-by-side arrangement. In this arrangement, the temple frame or housing 610 need not be as long in the longitudinal direction as with the previous temple arms, but is wider or thicker in the lateral direction transverse to the fore and aft longitudinal direction to accommodate the stacked batteries 600.

FIGS. 11 and 12 illustrate another modified temple 602 that houses the batteries 600 within the rear ear portion 606, preferably in a longitudinally spaced arrangement to keep the width or thickness of the ear portion to a minimum. In this embodiment, the batteries 600 are closely positioned to the recharging contacts 603 to keep the length of the electrical connections therebetween to a minimum. As shown, the positive charging contact 603a and negative charging contact 603b are both disposed at the distal end 605 of the same temple portion 602. Such combined configuration allows a more compact battery charger because only one temple 602 is required to connect to the battery charger.

Figure 13:
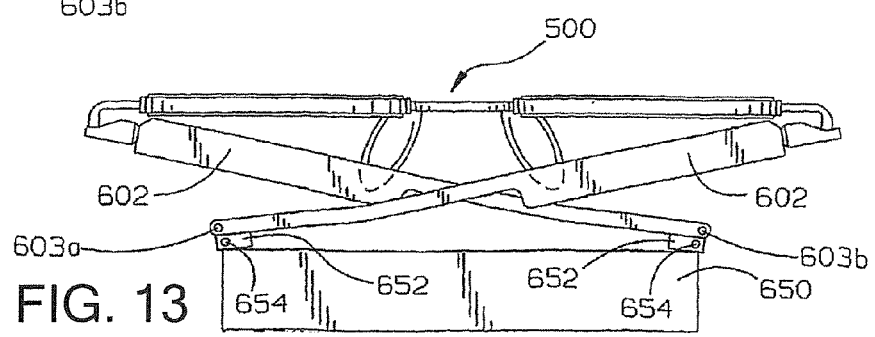
FIG. 13 is a plan view of the lighted eyeglass frames and a power source charger for recharging the integrated rechargeable power source of the temple arms.

Referring to FIG. 13, the eyeglass frame 500 is illustrated with the modified temple portions 602 being connected to a stand-alone battery charger 650 with the positive contact 603a and negative contact 603b shown in separate temple arms 602. To charge the batteries 600 in the battery charger 650, the temple arms 602 are preferably pivoted inwardly toward the cross-frame member to fold the frame 500 into a retracted condition, the distal ends 605 of each temple arm 602 are then connected to a receiving base member 652, which may be included on a stand alone charger. Alternatively, the receiving base member 652 may be integrated within an eyeglass frame case. The battery charger 650 is plugged into a 110 volt wall outlet. The base member 652 has recharging contacts 654 that correspond with the recharging contacts 603 on the eyeglass frame temples 602, but have an opposite polarity. Therefore, when inserted in the battery charger 650, the batteries 600 are in electrical communication with a power source such that the batteries 600 may be charged. Alternatively, the battery charger 650 may be configured to accept the eyeglass frame 500 with the temple arms 602 in an unfolded position, or may have a more compact configuration as previously mentioned, such as when only one temple arm 602 has both charging contacts 603a and 603b thereon.

Figure 14:
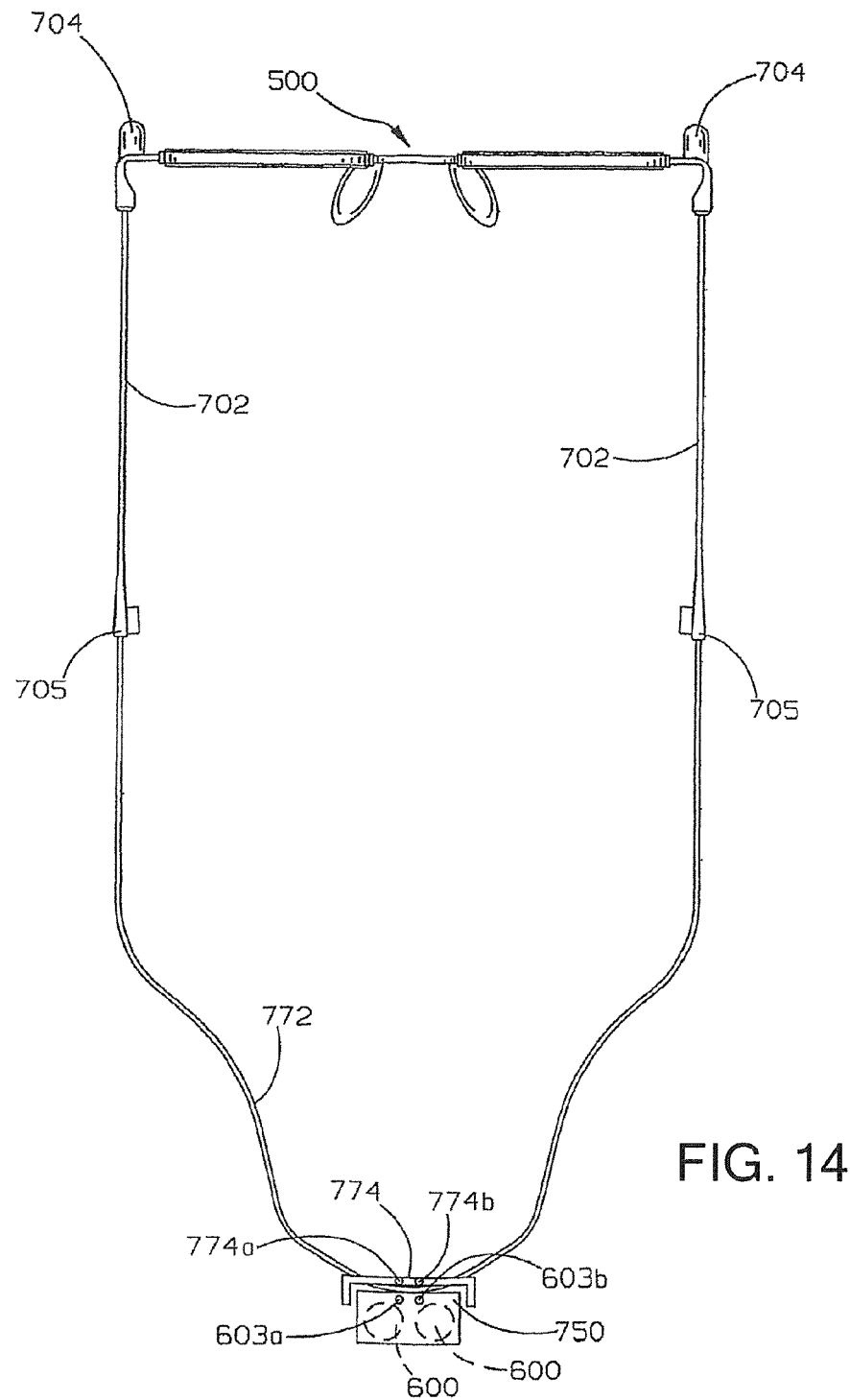
FIG. 14 is a plan view of alternative lighted eyeglass frames showing a power module carried on a lanyard for the frames.

Referring to FIG. 14, a modified placement of the rechargeable batteries 600 is illustrated on an alternative frame 500. In this embodiment, a power module or battery pack 750 is connected or attached to a lanyard 772 that is joined to the distal ends 705 of more traditional temple arms 702 (i.e., without included batteries). The lanyard 772 is a flexible member that joins each distal end 705 of the temple arms 702 and also functions a retaining member to hold the frames 500 around a wearer's neck when not in use. Generally, the lanyard 772 will be draped about the wearer's neck and upper back. The alternative frame 500 in FIG. 14 also includes lights 704, either in the frame as shown or in a separate module, that are in electrical communication with the battery pack 750 through the lanyard 772 and temple arms 702. In this regard, the temple arms 702 and lanyard 772 can have a hollow configuration to allow for electrical leads to be run through each.

The battery pack or module 750 houses the rechargeable batteries 600 and releasably mounts into a receiving port 774 attached to the lanyard 772. Generally, the port 774 may be centrally located between the ends of each temple portion 705 on the lanyard 772 because such an intermediate position along the length of the lanyard 772 provides balance to the lanyard 772 when worn. Therefore, in such central location, the pack or module 750 would comfortably rest on the back of a wearer as the lanyard 772 hangs down onto the shoulders and back during use. However, other locations on the lanyard are also acceptable. The receiving port 774 includes contacts 774a and 774b that, when the battery pack or module 750 is snugly and captively received in the port 774, are in electrical communication with the contacts 603a and 603b on the battery pack or module 750 to provided electrical power from the batteries to the lights 704.

To recharge the batteries 600, the pack or module 750 may be removed from the port 774 and plugged into a separate battery charger or power source (not shown). In this regard, the positive and negative contacts 603a and 603b mate with similar contacts in the battery charger. Alternatively, the batteries 600 of the pack or module 750 may be charged while still mounted to the port 774 such as by the provision of separate recharging contacts (not shown).

Housing the batteries 600 in the pack or module 750 that is electrically joined to the frame 500 through the lanyard 772 is advantageous in that the batteries 600 are contained in a separate member, such as the power module 750, that does not affect the contour of the temple arms 702. Accordingly, the temple arm 702 may be a more traditionally straight temple portion rather than the temple arms 602 contoured to contact the batteries 600 as shown in FIGS. 5-12 as generally only the electrical wiring is included therein.

Figure 15:
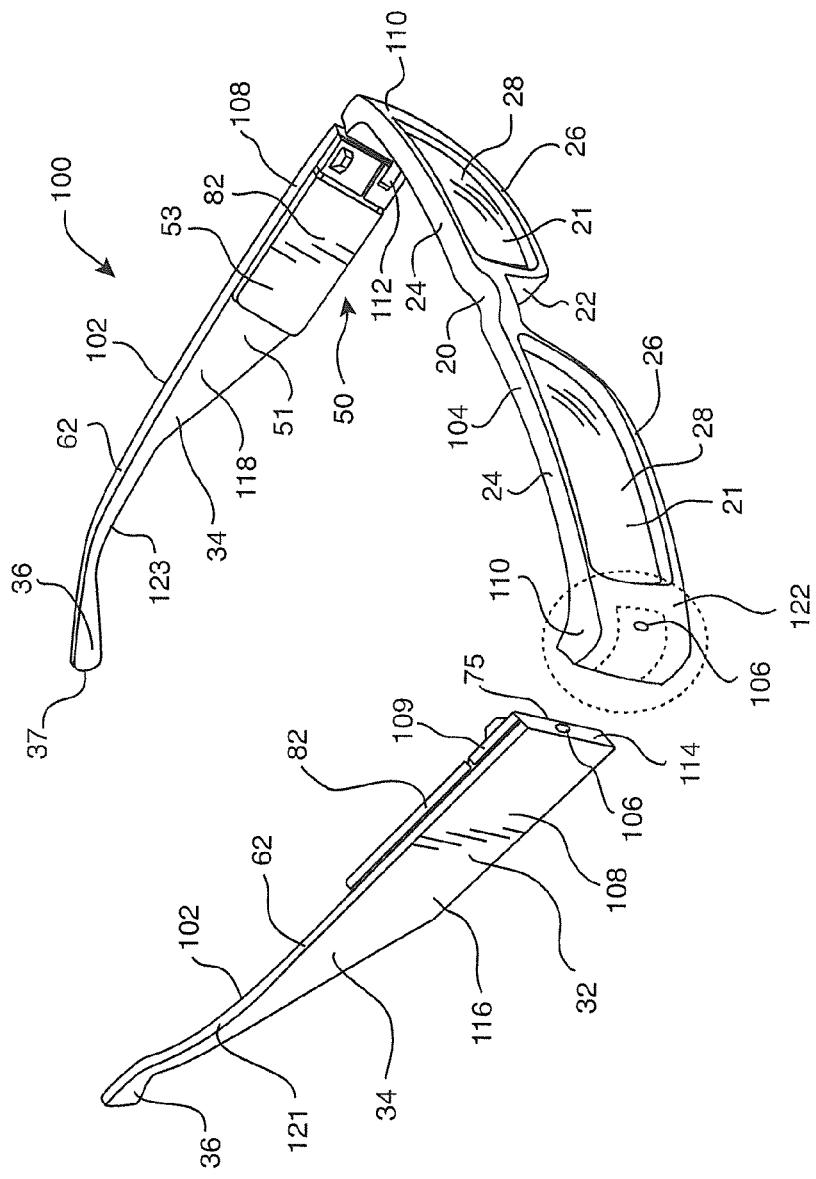
FIG. 15 is a perspective view of illuminated eyewear showing temple arm members in a pivoted open configuration relative to a cross-frame member with a LED light source on either the temple arm member or cross-frame member disposed adjacent or at respective end portions of the cross-frame member.

In general and as further described below, illuminated eyewear, which may or may not include a lens or lenses attached thereto, is provided to project light forwardly of the wearer. As generally shown in FIG. 15, the illuminated eyewear 100 can be configured to have a typical eyeglass frame or frame assembly including a plurality of generally rigid frame members including a pair of spaced temple arm portions or members 102 with a front support in the form of a cross-frame portion or member 104 extending laterally between the temple arm members 102. As illustrated, the temple arm members 102 are pivotally connected to the cross-member 104 via hinges 112 at the juncture between laterally opposite end or outer portions 110 of the cross-frame member 104 and front end portions 108 of the temple arm members 102. The temple arm members 102 can alternatively be integral with the cross-frame member 104 or otherwise securely attached thereto.

Other constructions for the cross-frame member 104 of the lighted eyewear are also contemplated including those where the cross-frame member 104 is modified to include several components or parts, or alternatives where these components are substantially eliminated so that the cross-frame only includes an intermediate bridge portion or member 20 connected to lenses 21 at either end thereof. The lenses 21 can also have outer front frame portions connected only to the laterally outward portions thereof so that the cross-frame member includes multiple parts. Alternatively, only a single lens 21 may be provided extending between and pivotally connected to the forward end portions 108 of the temple arm members 102 with the bridge portion 20 integrated into the lens 21. The lenses 21 themselves may be either refractive to provide vision correction or non-refractive to only provide a transparent shield for protection, as with safety glasses. Manifestly, the lens or lenses 21 need not be provided as the eyeglass frame could be used only to provide for hands-free lighting. Herein, the front support contemplates all these and other constructions for the single or multiple part cross-frame members with or without lenses.

The illuminated eyewear 100 further includes one or more light sources 106 mounted thereto to provide lighting forwardly of a wearer. The light sources 106 can be mounted to either the temple arms 102 and/or the front cross frame 104. The light sources 106 are preferably light emitting diodes (LEDs), but other suitable electroluminescent lamps, suitable incandescent lamps, gas discharge lamps, high-intensity discharge lamps, or any other suitable light source, such as a laser diode, can be utilized. In the illustrated form, the LED includes a lens 75 having a cylindrical base portion 77 and a dome shaped cap portion 79. A diode or illumination chip 81 within the lens 75 energizes with a supply of electrical energy and projects light forwardly of the LED.

In yet another aspect, the light sources 106 of the illuminated eyewear can be canted inwardly and/or downwardly at angles that allow the light cones of the light sources to intersect at or shine in a viewing or reading area forwardly of the wearer. By directing light automatically to this viewing area when the lighted eyeglasses 100 are worn without requiring adjustments of the lights, a wearer of the illuminated eyewear 100 has little need to turn, tilt, or otherwise maneuver the positioning of his/her head to orient the light into a viewing area. The viewing area corresponds to an area in front of the wearer, such as a working area to illuminate an object held or being worked on by the wearer, such as a tool, book, work table, etc.

Referring to FIGS. 15-21, one form of exemplary illuminated eyewear 100 is illustrated in more detail. As mentioned above, the front-support or cross-frame member 104 includes the bridge portion 20 intermediate of the end portions 110. The bridge portion 20 is configured to allow the cross-frame member 104 to rest on and be supported by the bridge of a wearer's nose. The bridge portion 20 includes downwardly and rearwardly extending side rests 22 configured to engage the sides of the wearer's nose. As illustrated, the bridge portion 20 is a one-piece structure having a truncated generally triangular shape, however, the bridge portion 20 could alternatively include other configurations, such as employing adjustable pads attached to the cross-frame member 104 configured to contact and rest upon the sides of the wearer's nose instead of the side rests 22 and frame configuration.

In the illustrated form, the cross-frame member 104 of the illuminated eyewear 100 includes an upper frame member 24 and a lower frame member 26 extending from both sides of the bridge portion 20 to the end portions 110 thereof. However, the front support 104 may also include a partial-frame construction with only either the upper frame 24 or the lower frame 26. In a frameless approach, the front support 104 consists of the bridge portion 20 attached directly to lenses, which then can attach directly to the temple arm members 102 or can have an intermediate part to couple the lenses to the temple arm members 102. Other configurations for the front support could also be employed, as has been previously discussed.

The end portions 110 extend rearwardly and pivotably connect to the temple arm members 102. As illustrated, the upper frame member 24 and the lower frame member 26 form lens areas 28 housing the lenses 21. The lens areas 28 are configured to support a variety of eyeglass lens types. For example, the lens areas 28 may be used to support lenses used for safety glasses, sunglasses, prescription glasses, other protective eyewear, or any suitable combination thereof. Alternatively, the lens areas 28 can be left empty and/or the cross-frame member 104 can be formed without the upper frame member 24 or the lower frame member 26, as discussed above.

By one approach, the temple arm members 102 connect to the end portions 110 of the front support 104 by the hinges 112 to allow the temple arm members 102 to pivot relative thereto. As discussed above, however, the temple arm members 102 can also be integral with the front support 104 or rigidly attached thereto. FIG. 15 shows an open or use configuration where the temple arm members 102 extend rearwardly from the front support 102, and preferably generally perpendicular to the cross-frame member 104 along fore-and-aft axes L1 that are generally orthogonal to a lateral axis L2 along which the cross-frame member 104 generally extends. It will be understood, however, that the temple arm members 102 and the front support 102 can each have a curvature to more closely conform to a wearer's head. Additionally, the temple arm members can be angled with respect to the front support and be resilient. So configured, a wearer of the glasses can pull the temple arm members apart and place the glasses on his/her head and the temple arm members will then resiliently grip the wearer's head for a more secure wearing configuration.

The temple arm members 102 can also be configured to pivot or shift to a collapsed, closed, or storage configuration where each temple arm member 102 extends generally laterally along the L2 axis adjacent to the cross-frame member 104. In another form, the frame of the illuminated eyewear 100 can be formed as a single, unitary component lacking pivot or hinge connections between the temple arm members 102 and the cross-frame member 104. In this form, the temple arm members or portions 102 permanently extend rearwardly from the cross-frame member or portion 104 along the fore-and-aft axes L1. Lighting components discussed herein with reference to the temple arm members 102 and/or the cross-frame member 104 are incorporated into the corresponding structure of this unitary frame.

As previously discussed, the temple arm members 102 are pivotally connected to the cross-member 104 via the hinges 112 at the juncture between the end portions 110 of the cross-frame member 104 and the front end portions 108 of the temple arm members 102. In the illustrated form, each temple arm member 102 includes an enlarged portion 32 adjacent the forward end 108 of the temple arm member 12. The temple arm members 102 transition rearwardly from the enlarged portion 32 to an intermediate portion 34 having a narrow section 35 configured to rest on and be supported by the ears of the wearer. The temple arm members 102 terminate at an inwardly and downwardly directed distal portion 36, positioned rearwardly from the intermediate portion 34 and adjacent a rearward end 37 of the temple arm members 102. So configured, the temple arm members 102 generally follow the contour of the wearer's head from adjacent the eyes to a position behind the ears. As illustrated, the enlarged portion 32, the intermediate portion 34, and the distal portion 36 have a generally flat configuration. Of course, other configurations may also be used.

Figure 16:
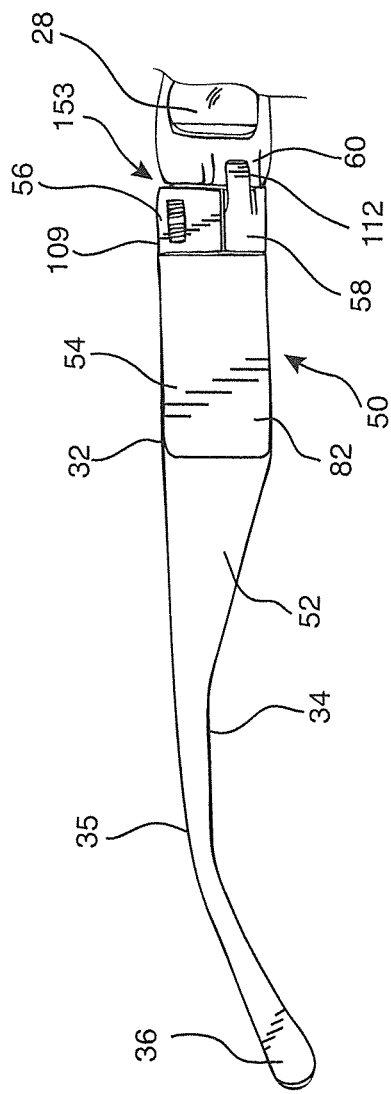
FIG. 16 is an elevated view of one of the temple arm members showing a power source compartment cover and a light switch actuator.
Figure 17:
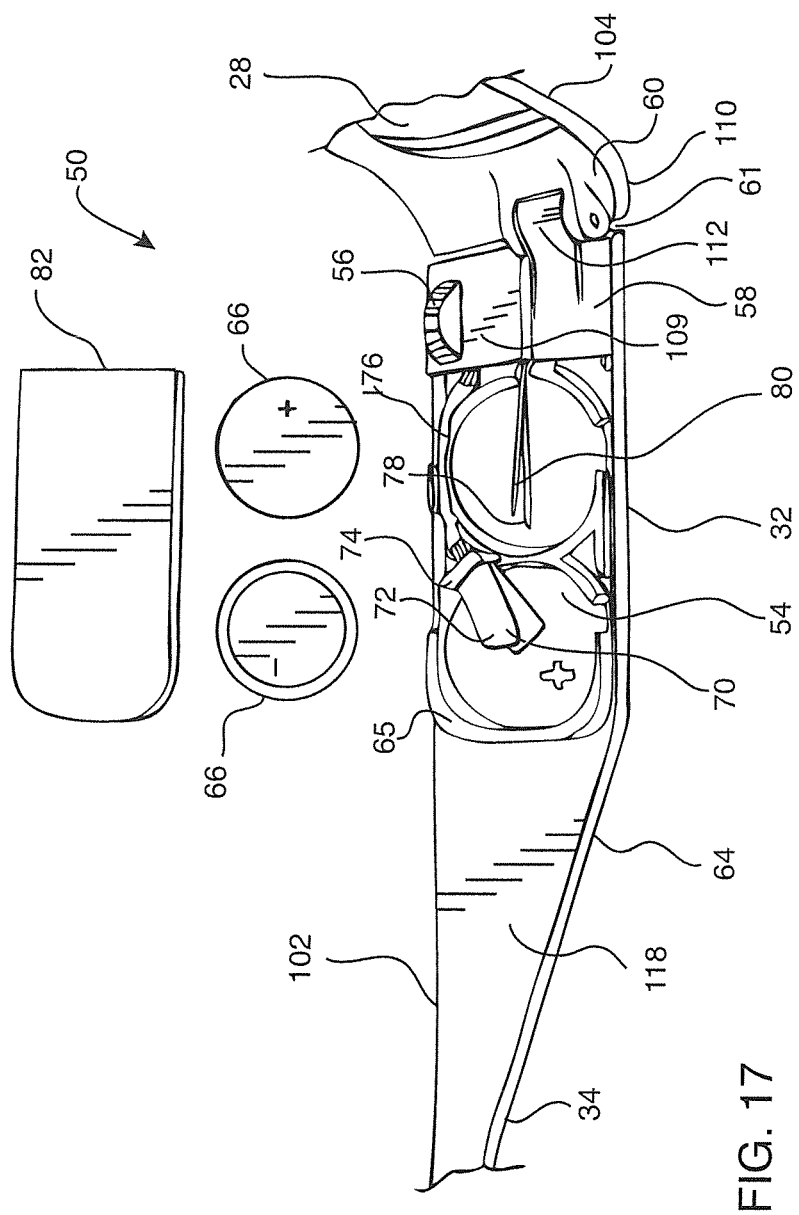
FIG. 17 is an enlarged, exploded view of a portion of the temple arm member of FIG. 26 showing a power source compartment formed along an inner surface of the temple arm member.
Figure 18:
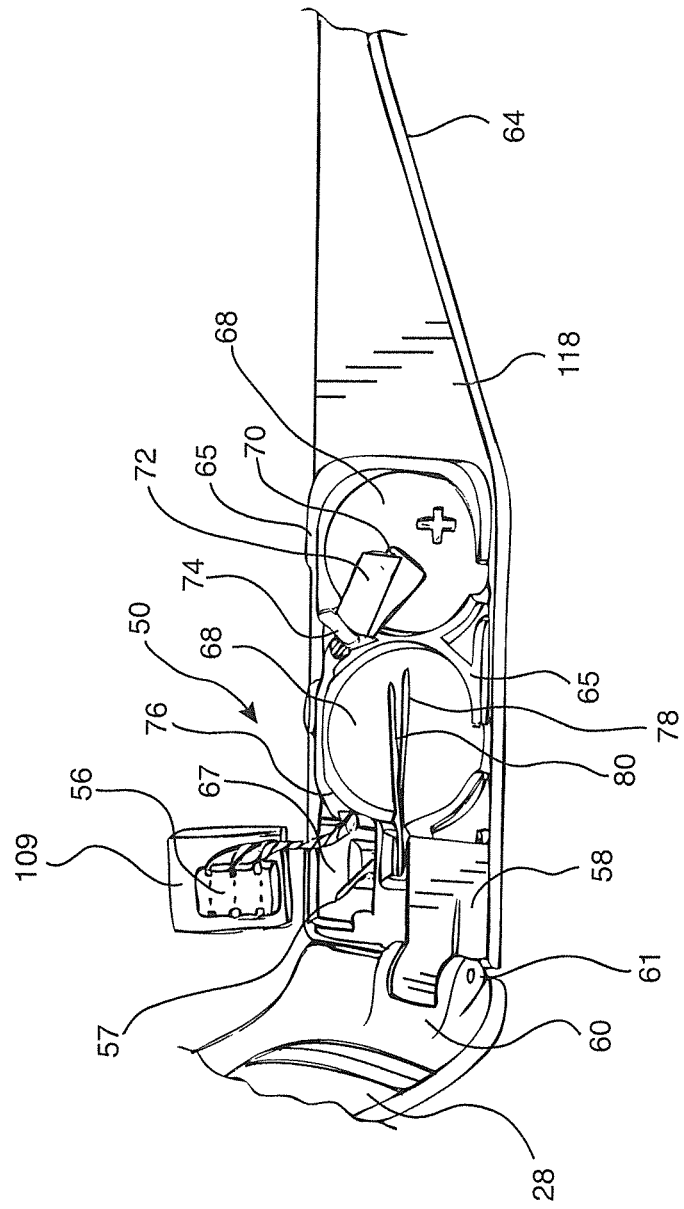
FIG. 18 is an enlarged view of the other temple arm member showing a switch component adjacent the power source compartment.

Referring now to FIGS. 16-18, the light sources 106 require an electronic assembly 50 to provide a power supply. In order to preserve the outwardly visible aesthetics of the illuminated eyewear 100, as described above, the electronic assembly 50 is positioned on and accessible through an inner surface portion 118 of each temple arm member 102. Positioning the electronic assembly 50 on the inner surface portion 118 effectively hides the electronic assembly 50 from view while the illuminated eyewear 100 is worn. The inner surface portion 118 can have a substantially flat configuration and can be positioned so that the inner surface portions 118 of each temple arm member 102 face each other when the temple arm members 102 are shifted to the open configuration. In the illustrated form, the inner surface portion 118 includes both a lower portion 51 and a slightly raised portion 53. The slightly raised portion 53 is preferably adjacent the front frame 104, but can also be positioned in the intermediate portion 34 or the distal portion 36 of the temple arm member 102. More specifically, the electronic assembly 50 can be disposed between the inner surface portion 118 and an outer surface portion 116 of the enlarged portion 32 of the temple member 102. So configured, no components of the electronic assembly 50 are visible on the outer surface portion 116 of the temple arm members 102.

In one approach, the inner surface 118 of the temple arm member 102, and preferably both temple arm members 102, includes a power source compartment 54 recessed therein, which can house the electronic assembly 50. The electronic assembly 50 can include a switch 56, a power source 66, and various electrical connections thereof. As illustrated, the switch 56 is a slide switch; however, other types of switches can be utilized, such as a toggle, a pushbutton, or a touch switch. As shown in FIG. 18, the switch 56 is electrically connected to one of the light source contacts 57 and also to the power source 66.

Preferably, the switch 56 is mounted to the temple inner surface portion 118 adjacent to the hinge 112. A switch cover 109 mounts to the temple arm member 102 by any suitable mechanism, including adhesive, fasteners, or the like, to cover switch electronic components 61 and retain the switch electronic components 61 in the compartment 54. Preferably, an inwardly facing surface of the switch cover 109 is substantially flush with the raised portion 53 of the temple arm inner surface 188 so that the raised portion 53 has a substantially flat configuration. The switch cover 109 includes an opening 69 therein for an actuator portion 59 of the switch 56 to project therethrough to be accessible by a wearer of the glasses 100. The opening can be configured to be operable for any suitable switch including, for example, an elongate opening for a slide switch, a rounded opening for a rotary switch, and the like. In particular, the hinge 112 pivotably connects a front temple part 58 to an outer or edge cross-frame member part 60 with a pin or screw fastener 61. In order to preserve space and minimize the length of the electronic assembly 50, the switch 56 can be placed in a vertical relation with the temple part 58 of the hinge 112. In the illustrated form in FIGS. 16-18, the switch 56 is positioned above the hinge 112 adjacent a forward end surface 114 of the temple arm member 102 and adjacent an upper surface 62 of the temple arm member 102. Accordingly, the temple part 58 of the hinge 112 is adjacent a lower surface 64 of the temple arm member 102. So configured, the switch 56 is positioned to be manipulated by an index finger of the wearer to control power to the light sources 106. Alternatively, the switch 56 can be positioned adjacent the lower surface 64 of the temple arm member 102 and the temple part 58 of the hinge 112 can be positioned above the switch 56 and adjacent the upper surface 62 of the temple arm member 102.

Figure 20:
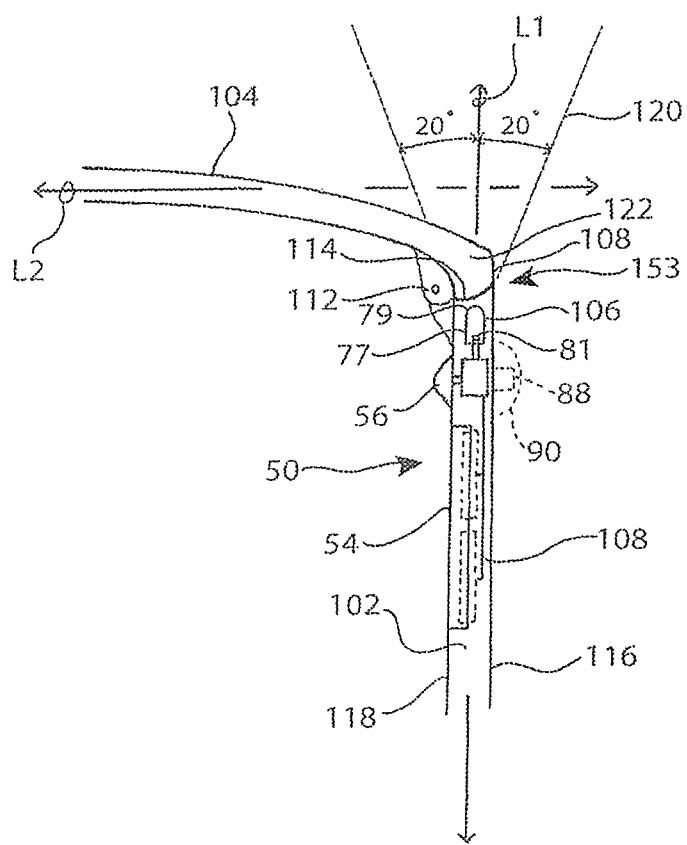
FIG. 20 is an enlarged fragmentary plan view showing a different position of a LED relative to the eyeglass frame members with a light cone projecting therefrom.

FIG. 20 illustrates an alternative location for a switch 88 to control power to the light sources 106. As illustrated, the switch 88 is mounted to the outer surface 116 of the temple arm member 102, such as mounted on or adjacent the forward end portions 114 of the temple arm member 102. This advantageously positions the switch 88 adjacent the power source compartment 54 and the light source 106. The switch 88 may be a pushbutton switch, a slide switch, a rotary switch, or the like. Preferably, the switch 88 includes a protective cover 90, such as composed of a plastic material, a metal material, or a combination thereof. In one form, the protective cover 90 operatively couples to the switch 88 to act as an actuator or couple to an actuator, so that the protective cover 90 can be manipulated to operate the switch 88. This can be achieved by the protective cover 90 being in a sliding relation to the outer surface 116 of the temple arm member 102 for a slide switch, having a depressible or flexible region for a pushbutton switch, or being in a rotating relation to the outer surface 116 of the temple arm member 102 for a rotary switch. The protective cover 90 can also provide protection for components of the switch 88, which can result from regular wear and tear or dropping the illuminated eyewear 100. Advantageously, the protective cover 90 can also be configured to partially or fully conceal the presence of the switch 88, so that the illuminated eyewear 100 retains the appearance or aesthetic of traditional eyeglasses.

In one form, the protective cover 90 can also be utilized to display alphanumeric or graphical content, such as a company logo, slogan, trademark, or the like. The positioning of the protective cover 90 on the outer surface 116 of the temple arm member 102 prominently displays such content outwardly when the illuminated eyewear is in the open or use configuration, which can provide advertising or promote brand recognition. In another form, the protective cover 90 can be positioned on the outer surface 116 of the temple arm member 102, such as in a position generally opposite the switch 56, to provide outside protection for the switch 56 and/or other components of the electronic assembly 50.

By one approach, the power source compartment 54 has a narrow width relative to the thickness of the temple arm 102 and is positioned between the inner surface portion 118 and the outer surface portion 116. This narrow width compartment 54 enables the temple arm members 102 to maintain a relatively thin shape, which can provide a more comfortable fit on a wearer's head than thicker temple arm members. The power source compartment 54 is further positioned adjacent to the temple part 58 of the hinge 112 and can be partially recessed into the temple arm member 102. In the illustrated form, the compartment 54 includes an outwardly extending rim 65, which spaces the raised portion 53 above the lower flat portion 51 of the temple arm inner surface portion 118. The depth of the compartment 54 is configured to house a pair of batteries 66 to power the light sources 106, such as a pair of disc-shaped coin cell batteries, in a longitudinal and non-overlapping, side-by-side relation, so that main surfaces of the batteries 66 face the inner surface portion 118 and the outer surface portion 116 of the temple arm members 102. By another approach, the compartment 54 can be configured to receive a rechargeable battery or other power source, such as one or more capacitors or other electronic devices capable of storing electrical energy therein, such as a battery with a generally rectangular configuration. The compartment 54 can also include a recess 67 to partially receive the switch 56, such as electrical contacts and/or connecting wires of the switch 56 that are electrically coupled to the batteries 66 and the light source 106. So configured, the power source compartment 54 substantially hides the battery or batteries 66 and the switch 56 from view when the illuminated eyewear 100 is worn.

Alternatively, the enlarged portion 108 of the temple arm member can extend, with respect to the intermediate and rear portions 34, 36 of the temple arm members 102, in at least two directions orthogonal to each other and orthogonal to the longitudinal axis L1 of the temple arm members 102, such as in a lateral direction generally transverse to the inner and outer surface portion 118, 116 and in a vertical direction generally transverse to the upper and lower surface portions 121, 123. In this alternative arrangement, the compartment 54 may be thicker and taller than the remainder of the temple arm extending rearward therefrom, and could therefore support the pair of batteries 66 in a stacked or overlapping relation or a thicker rechargeable battery therein. Also, only one battery 66 could be utilized.

When the batteries 66 are in the longitudinal side-by-side relation shown in FIGS. 17 and 18, the compartment 54 is divided into two bays 68, each preferably having the rim 65 extending at least partially thereabout and configured to support and laterally enclose a single battery 66. The far bay 68 includes a recess 70 in a bottom surface thereof configured to support a contact 72, such as a blade connector, coupled to the switch 56. The contact 72 can be secured in position, such as by a friction fit, by inserting a vertical contact wall portion 74 into a groove or grooves formed in the rim 65. The contact 72 is electrically connected to the switch 56, which as stated above, is attached to the contact 57 of the light source 106. Specifically, a wire 76 extends from the contact 72 to the switch 56 by being secured within a space provided within the compartment 54 above or below the other bay 68, preferably depending on the positioning of the switch 56. The wire 76 can be at least partially covered by an insulating material or jacket along at least a portion of its length. As illustrated, the contact 72 is configured to contact the cathode of the battery 66. The other bay 68 may be positioned adjacent to the switch 56 and include a recess 78 in a bottom surface thereof configured to support a second contact 80 of the light source 106. As illustrated, the contact 80 is one of the elongate leads stemming from the light source 106 and is received in an elongate recess 78 to be configured to contact the anode of the other battery 66. So configured, the cathode of one battery 66 is coupled to the switch 56, which is coupled to the light source 106, and the anode of the other battery 66 is coupled directly to the light source 106. This configuration allows the switch 56 to control power to the light source 106 to turn it on and off. While one specific configuration of the contacts 72, 80 and batteries 66 are illustrated, the components may also be reversed if so desired.

By one approach, the raised portion 53 of the inner surface portion 118 includes a removable cover 82, as shown in FIGS. 16 and 17, configured to securely fit over the compartment 54 to secure the batteries 66 within. The cover 82 may optionally include biasing members such as springs on an inner surface thereof to apply outward pressure on the batteries 66, so the batteries 66 are tightly held against the contacts 72, 80. The cover 82 is secured to the compartment 54 by a tongue and groove mechanism including portions or projections of depending sides and the distal end of the cover 82 that cooperate with edges or slots provided on or in the rim 65. Other suitable securing mechanisms can also be utilized. In the illustrated form, the cover 82 is formed from metal (as opposed to the preferred plastic of the eyeglasses and temple portions thereof) in order to limit the thickness of the temple arm member 12. A plastic cover could have an increased thickness, which could detract from the thin configuration of the temple arm members 102, but could be used if sufficiently thin and strong.

Figure 36:
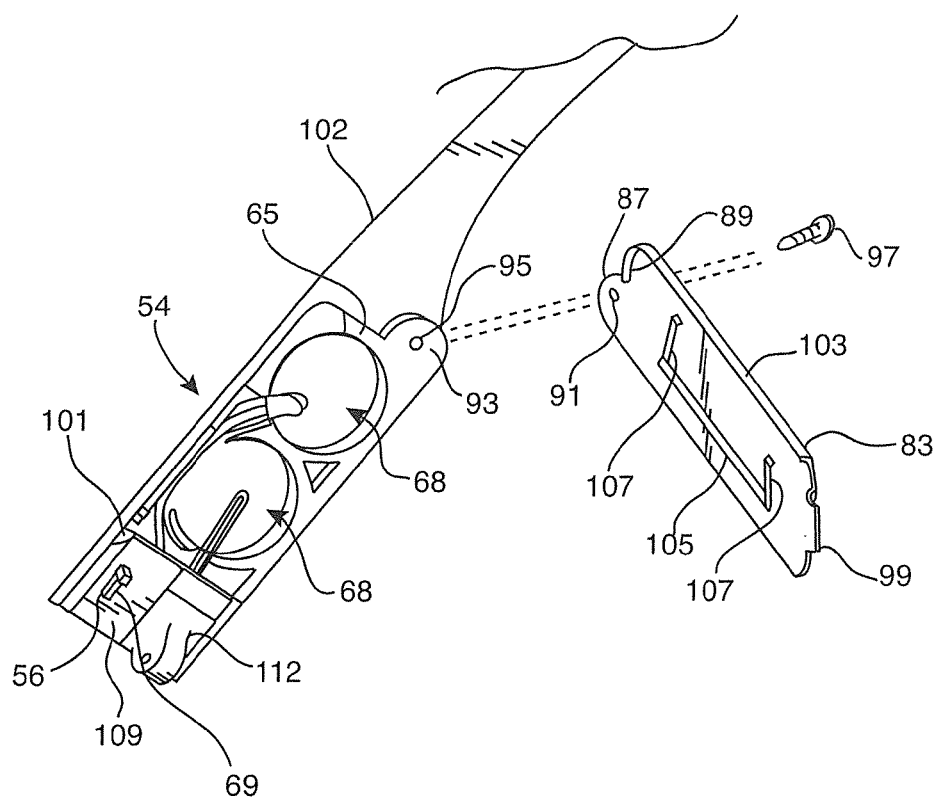
FIG. 36 is an enlarged exploded view of a temple arm member showing a power source compartment in the temple arm member and a power source compartment cover to be pivotably mounted to the temple arm member.

An alternative cover 83 is shown in FIG. 36 in combination with the temple arm member 102. The temple arm member 102 illustrated in FIG. 36 is substantially similar to the temple arm member 102 as described above with respect to the compartment 54, with differences described below. As shown, the cover 83 includes a tab or projection 87 that projects rearwardly from a rear end 89 of the cover 83 at the lower portion thereof. The tab 87 includes a rounded perimeter edge, but can take other shapes as desired. An attachment opening 91 extends through the tab 87 so that the cover 83 can be attached to the temple arm member 102. The temple arm member 102 includes a corresponding mounting tab or protuberance 93 with a corresponding threaded opening or bore 95 therein that is configured to align with the opening 91 in the cover tab 87 when the cover 83 is mounted to the temple arm member 102 with a suitable attachment device, such as a screw fastener 97, pin, or the like. The opening 91 is oversized relative to the screw fastener 97 so that the screw fastener 97 extends therethrough, but is only threaded into the threaded bore 95. So configured, the cover 83 can be pivotably attached to the temple arm member 102, and as such can be pivoted between a closed position covering the bays 68 of the power source compartment 54 and holding the batteries 66 therein, and an open position exposing the bays 68 sufficiently to allow the batteries 66 to be removed and replaced.

To hold or retain the cover 83 in the closed position, the cover 83 includes a thin latch member 99 bent and extending from the forward end of the cover 83 to be offset therefrom, and the temple arm member 102 includes a corresponding recessed slot 101 sized to receive the cover latch 99 therein when the cover 83 is pivoted to the closed position. In the illustrated form, the slot 101 is provided between the temple arm member 102 and a rear edge portion of the switch cover 109 mounted to the temple arm member 102.

In order to minimize the thickness of the temple arm member 102, the cover 83 preferably has a thin, substantially flat configuration, which by one approach is enabled by using a strong material, such as a metal to construct the cover 83. The cover 83 can further include a thin lip 103 that projects inwardly toward the temple arm member 102 to overlap the compartment rim 65 along a top and partially along the side of the compartment 54 to a positioned adjacent to the lower cover tab 87. Advantageously, the lip 103 also acts as a stop surface when the cover 83 is fully rotated to the closed position because the lip 103 of the cover 83 abuts and rests against an upper surface of the rim 65 when the cover 83 is fully pivoted to cover the compartment 54. As shown, the cover 83 can further include a contact 105 mounted to the interior surface 111 thereof so as to form an interior surface of the power source compartment 54 facing the batteries 66 with the contact 105 having two inwardly projecting arms 107. The contact arms 107 are positioned to contact, and therefore electrically couple, the exposed main faces of the batteries 66 in the bays 68 when the cover 83 is in the closed position. Preferably, the contact arms 107 are biased to project inwardly to ensure secure contact with the battery main faces and also to urge the cover 83 outwardly due to abutment with the battery main faces. The outward force causes the latch 99 to tightly frictionally engage against the switch cover portion 109 along the slot 101 to resist the cover 83 from pivoting to the open position.

Figure 34:
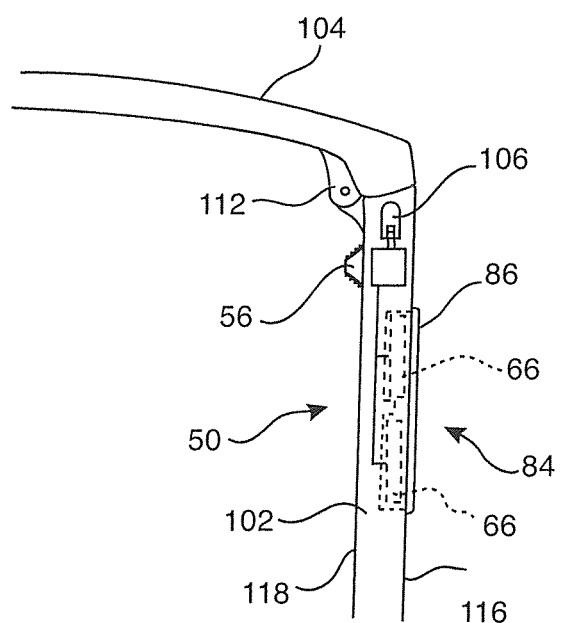
FIG. 34 is a fragmentary top plan view of illuminated eyewear showing a cross-frame member and a temple arm extending rearwardly therefrom and having a power source compartment recessed in an outer surface thereof.

An alternative power source compartment 84 is illustrated in FIG. 34. The alternative power source compartment 84 in this form is disposed between the inner and outer surfaces 118, 116 of the temple arm member 102 with an opening 85 at the outer surface 116 so that the compartment 54 is recessed in the outer surface 116 allowing the batteries to be easily accessed while wearing the glasses 100 or while the temple arm members 102 are pivoted to the stored configuration. The alternative power source compartment 84 includes structure similar to the power source compartment 54 discussed above, such as the structure to house the power source 66, such as a pair of batteries in longitudinal side-by-side orientation or a rechargeable battery or other electronic devices capable of storing electrical energy, such as one or more capacitors, and the components necessary to supply power from the batteries to the light source 106 including wires, contacts, and the like. Other components of the electronic assembly 50, such as the switch 56 can be mounted to the inner surface 118 as discussed above, or alternatively can be mounted to the outer surface 116 in a position adjacent the alternative power source compartment 84. The alternative power source compartment 84 preferably includes a removable cover 86. The removable cover 86 may be structured similarly to the cover 82 or 83 as discussed above, such as secured to the temple arm member 102 through a tongue-and-groove construction.

The cover 86 can alternatively include pivotable or rotatable structure, such as hinges or the like, along one of the edges of the compartment 54 so that the cover 86 can be pivoted about the hinge to selectively expose and close the compartment 54. For example, a hinge can be longitudinally disposed along the upper or lower edge of the compartment and the cover 86 can be pivoted upward or downward respectively above the hinge. In another example, the hinge can be disposed generally orthogonal to the temple arm axis L2 on the forward or rearward edge of the compartment and the cover 86 can be pivoted forwardly or rearwardly respectively about the hinge. The cover 86 may further include a biasing member, such as a spring, so that the cover 86 is biased to the closed position.

In the form illustrated in FIG. 15, each temple arm member 102 houses at least one light source 106 at an enlarged forward portion 108 thereof. Alternatively, the illuminated eyewear 100 could utilize one, or more than two light sources 106. The light sources 106, as discussed above, are preferably LEDs. In one aspect as discussed in more detail hereinafter, the light sources 106 can be canted inwardly and/or downwardly at angles that allow the light cones of the light sources 106 to intersect at a viewing or reading area forwardly of the wearer. By directing light automatically to this viewing area when the lighted eyeglasses 100 are worn without requiring adjustments of the lights, a wearer of the illuminated eyewear 100 has little need to turn, tilt, or otherwise maneuver the positioning of his/her head to orient the light into a viewing area.

In the illustrated form, the cross-frame member 104 of the illuminated eyewear 100 includes end or outer portions 110 at either side of the intermediate bridge portion 20. Other configurations for the front support 104 could also be employed, however, as has been previously discussed. The end portions 110 pivotably connect to the temple arm members 102 by hinges 112. When pivoted to an open or use configuration as shown in FIG. 15, the temple arm members 102 extend rearwardly from the front support 104 and preferably generally perpendicular to the cross-frame member 104 along fore-and-aft axes L1 that are generally orthogonal to a lateral axis L2 along which the cross-frame member 104 generally extends (see, for example, FIG. 19). The temple arm members 102 are also configured to pivot or shift to a collapsed, closed, or storage configuration where each temple arm member 102 extends laterally along the L2 axis adjacent to the cross-frame member 104.

The light sources 106 can be canted with respect to the temple arm axis L1 and the cross-frame axis L2 so that the light sources 106 direct light to a desired viewing area forwardly of the light glasses 100 without requiring a wearer to tilt or shift their heads. For example, the light sources 106 can be canted downwardly with respect to the temple arm axis L1 to illuminate in area forwardly and below the glasses 100, and can be canted inwardly with respect to the temple arm axis L1 so that the light cones of the light sources 106 converge on a generally common viewing area before they normally would (i.e., closer to the wearer such as at reading distances of approximately 10 inches to approximately 18 inches if the axes of the light cones were coaxial with the respective temple arm axes L1. Additional disclosure directed to canting light sources for lighted eyewear is described in U.S. application Ser. No. 12/895,456, U.S. Patent Publication Number US 2011-0075095, previously incorporated herein. By another approach, the light sources 106 can be canted at different angles to illuminate two or more different viewing areas. For example, one light source can be canted inwardly and downwardly with respect to the temple arm axis L1 to illuminate the viewing area and another light source 106 can be uncanted or include less of an inward cant with respect to the temple arm axis L1 to illuminate an area forwardly of the glasses and at a farther distance relative thereto.

As illustrated, each temple arm member 102 includes the enlarged portion 108 adjacent a forward end surface or portion 114 of each temple arm member 102, where the structure rearward of the enlarged portion 108 can be configured as discussed above with the glasses 10. In this embodiment, the temple arm members 102 include an outer surface portion 116 and an inner surface portion 118. The outer and inner surface portions 116, 118 are illustrated as having a generally flat configuration. Preferably, and as shown in FIG. 15, the flat configuration of the outer surface portion 116 is entirely unbroken, preserving a traditional eyeglass appearance. Alternatively, however, the outer surface portion 116 can have projections therefrom, such as a member at least partially enclosing the light source 106, or other mechanical, electrical, or aesthetic features.

Figure 19:
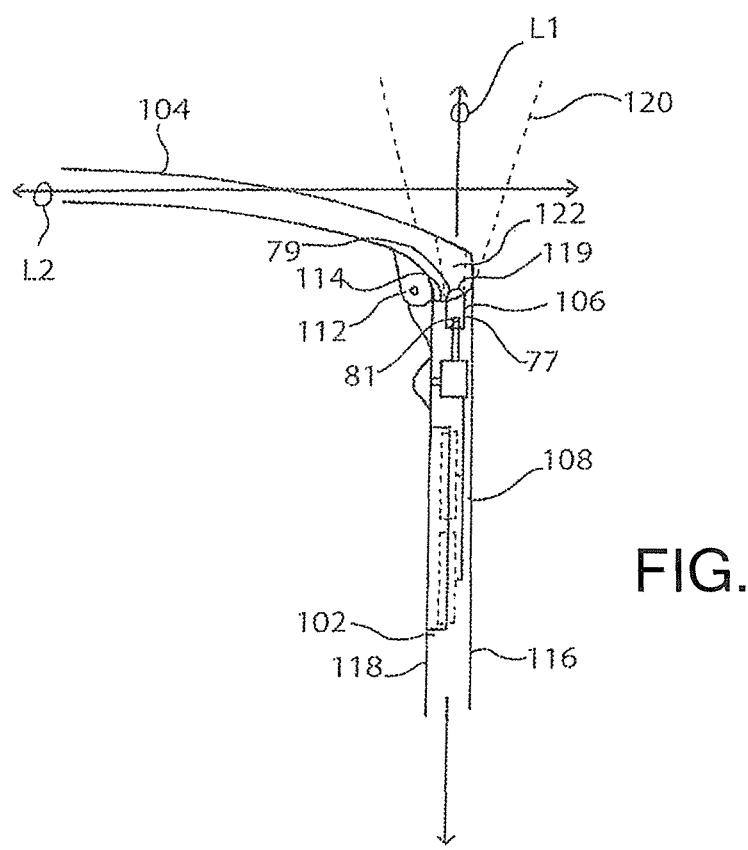
FIG. 19 is an enlarged fragmentary plan view showing positioning of a LED relative to the eyeglass frame members with a light cone projecting therefrom.

In this form, the light sources 106 are preferably mounted at least partially within the enlarged portions 108 of the temple arm members 102 recessed in the forward surfaces 114 thereof. By one approach, each light source 106 is mounted between the outer and inner surface portions 116, 118, such as mounted in a manner to not disturb the flat configuration of the outer and inner surface portions 116, 118. As illustrated in FIGS. 19 and 20, the light sources 106 are recessed in relation to the lens areas 21 so that the light sources 106 are mounted rearwardly with respect to the lens areas 21 along the temple arm axis L1. With this configuration, when the lighted glasses 100 are worn, the light sources 106 lie laterally adjacent to a wearer's eyes rather than forwardly of the wearer's eyes like the lens areas 21. Due to this, the inner surface portions 118 of the temple arm members 102 preferably are opaque or light blocking adjacent the light sources 106 so that unwanted stray light or glare is substantially prevented from passing through the inner surface portion 118 of the temple arm members 102 and into the eyes of a wearer and/or into the lenses 28 of the illuminated eyewear 100. Alternatively, the light sources 106 could be mounted, as discussed above, at least partially within a projection or tubular member extending slightly outwardly from the outer surface portion 116 of each temple arm member 102. As shown, each light source 106 is mounted generally centered vertically within the temple arm member 102 where it is generally intermediate upper and lower surfaces 121, 123 between the outer and inner temple side surfaces 116 and 118, however, the light source 106 can be mounted above or below the illustrated position as required or desired.

In one form, as illustrated in FIG. 19, a forward lens portion 119 of the light source 106 extends beyond the forward end surface 114 of the temple arm member 102. In a slightly different form, the light sources 106 may be received entirely within the temple arm members 102, as illustrated in FIG. 20. In either configuration, the light sources 106 are housed to be fixed at least partially in the temple arm members 102 to pivot therewith. As the temple arm members 102 are pivoted to the use configuration, the light sources 106 are oriented to project light to a position generally forward of the illuminated eyewear 100. When in the use configuration, the end portions 110 of the cross-frame member 104 are located at least partially within the light cones of the light sources 106 as can be seen in FIGS. 19 and 20, and is configured so that the illumination projects through the cross-frame member 104, and in particular, through a pass-through portion 122 of the cross-frame end portions 110. In these forms, the pass-through portion 122 is an opening or bore (FIG. 19), or is constructed of a material, such as acrylic, polycarbonate, or the like, that allows the light sources 106 to project light forwardly of the illuminated eyewear 100 through the cross-frame member 104 (FIG. 20), while at the same time also allowing the light sources 106 to be at least partially hidden from view from a casual observer. In one approach, the pass-through portion 122 is not refractive, so that a projection path of light emitted by the light sources 106 stays substantially constant as the light passes through the pass-through portion 122 to shine forwardly of the illuminate eyewear 100.

In the form illustrated in FIG. 20, the light source 106 is received within the temple arm member 102 as discussed above. To this end, the pass-through portion 122 may also include the end portions 108 including the forward end surfaces 114 of the temple arms 102. Accordingly, in order to allow light projected from the light source 106 to exit from within the temple arm member 102, the forward end 108 of the temple arm member 102 located forwardly of the light source 106 can be transparent or translucent, can include a bore or other opening that opens to the forward end surface 114, or the like. So configured, the light source 106 can be received and hidden entirely within the temple arm member 102 to be recessed back from the forward end surface 114 of the temple arm member 102, while still projecting light forwardly out from the temple arm member 102 through the pass-through portion 122 discussed in more detail below.

The illuminated eyewear 100 as configured in FIGS. 15, 19, 20, and 35 orient the cross-frame member 104, and specifically the end portions 110 thereof, forwardly or in front of the light sources 106 mounted to the temple arm members 102 when in their open, use configuration so the end portions 110, if unbroken and opaque, would substantially block the light cone 120 of the light sources 106. Accordingly, the pass-through portion 122 of the cross-frame member 104 of each of the end portions 110 allows at least a portion of the light cone 120 to shine through the cross-frame member 104 forwardly of the illuminated eyewear 100.

Example pass-through portions 122 are illustrated in FIGS. 21-23B. A first form of the pass-through portion 122 can be provided by using a translucent or transparent material portion for some or all of the cross-frame member 104. This would allow the light sources 106 to shine light through the portion of the cross-frame portion 104 that intersects the light cone of the LED light source 106. Alternatively, in a second form, illustrated in FIG. 21, a light receiver portion 124 is included at the end portions 110 of the cross-frame member 104. The receiver portion 124 can be formed by any suitable means, such as drilling to remove material from the cross-frame member 104 to form a cavity 125 in the end portions 110, molding the cross-frame member 104 to include the cavity 125, or the like. As illustrated, the receiver portion 124 is in the form of a bore, tunnel, or pipe. In the simplest form, the receiver portion 124 can be left without additional features, providing a conduit through which light emitted from the light sources 106 can shine forwardly of the illuminated eyewear 100. As such, the cavity 125 includes a rear aperture 127 in the rear surface 129 of the cross-frame member 104. In the form where the temple arm members pivot with respect to the cross-frame member, the rear aperture 127 and at least a rear portion of the cavity 125 can be oversized relative to the diameter of the light source LED 106 and specifically the cylindrical and dome cap portions 77, 79 portions thereof so that the light source LED 106 can be pivoted partially into the cavity 125 when the temple arm members 102 are pivoted to the use position without abutting or contacting the cross-frame member 104.

All pass-through portions 122 described herein can also be positioned to accommodate canting of the light sources as discussed above. Specifically, the pass through portion accommodates the canting of the light sources 106 by also canting in a similar manner as the light sources described above. For example, the pass-through portion 122 can be canted inwardly with respect to the temple axis L1 and/or downwardly with respect to both the temple arm axis L1 and the cross-frame axis L2, which is generally transverse to the temple axis L1 when the temple arm members 102 are pivoted to the open or use configuration. The cant of the pass-through portion 122 can be utilized to generally conform to a cant of the light sources 106, so that the pass-through portion 122 can be axially centered with the respective light source 106. In other words, central axes C1 of both the LED light sources 106 and the corresponding pass-through portion 122, respectively, can be the same. The pass-through portions 122 can then be shaped to be larger or smaller than the light cone projected from the light source or include coatings or layers therein to focus or frame light projecting from the light sources 106 to the viewing area as discussed above.

Optionally, an inner surface 134 extending about the receiver portion 124 can include a material or coating on at least a portion thereof to optimize the light output from the light sources 106 and minimize wasted light. The material or coating can be any suitable reflective material or have a suitable reflective surface, such as a silver coating, a nickel coating, a lithium silver plating, nickel lithium planting, or the like. In another form, if the cross-frame member 104 is composed of an at least partially light transmissive material, the inner surface 134 extending about the receiver portion 124 may alternatively, or in addition to the above, include a light blocking layer or coating configured to reduce the amount of unwanted stray light projecting from the light sources 106 through the cross-frame member 104 into the eyes of the wearer or causing glare on the lenses 28.

Alternatively, the receiver portion 124 can include a light pipe, fiber optics, or other light transmissive material 140 mounted in the receiver portion 124 operable to direct light through the cross-frame member 104 or allow light to be directed therethrough. These features allow the light emitted by the light sources 106 to pass-through the cross-frame member 104 while also minimizing the loss of light.

As illustrated in FIGS. 22A and 22B, in a third form, the receiver portion 124 includes a rearwardly extending frusto-conical cut-out portion 126 where a base cut-out frustum portion substantially axially aligns with a forwardly positioned generally cylindrical cut-out portion 128. The frusto-conical portion 126 extends and opens to the rear surface portion 129 of the cross-frame member 104 to create a rear aperture 131 oriented to generally align or overlap coaxially with the light source 106 mounted at least partially within the temple arm member 102 when the temple arm member 102 is in the open or use configuration. The front cylindrical portion 128 is preferably generally centered along the light source 106 axis C1 and opens at the front surface 135 of the cross-frame member 104 to create a forward aperture or opening 133 therein. Preferably, the diameter of the rear aperture 131 is sized to substantially match or be slightly larger than the diameter of the lens 75 of the light source 106. This configuration minimizes wasted light because a majority of light projected from the light source 106 is received within the light reception portion 124. Additionally, especially in the form shown in FIG. 19, the rear aperture 131 can partially receive the light source 106 therethrough. For example, the diameter of the light source lens 75 can be approximately 3 mm and the diameter of the aperture 131 of the frusto-conical portion 126 can be approximately 3 mm or larger. The frusto-conical portion 126 can then taper out to a diameter of 5 mm or larger where the frusto-conical portion 126 meets the cylindrical cut-out portion 128. The cylindrical portion 128 would then substantially maintain this diameter to the front surface 135 of the cross-frame member 104. A frustum and cylinder combination has been discussed for the cut-out 126, but other suitable configurations can be utilized, such as a frustum, cylinder, pyramid, prism, cuboid, sphere, prolate ellipsoid, a combination of one or more of the shapes, a combination of differently sized shapes, portions of the shapes, or the like.

In addition to the above, the cross-frame member 104 can optionally include an insert 136 configured to mate and fit within the receiver portion 124 so that the front surface 135 of the cross-frame member 104 appears substantially unbroken (see FIGS. 22B, 23A, and 23B). The insert 136 can be substantially the same shape and size of the receiver portion 124, or can be configured to fit within a smaller portion, such as a front or rear region of the receiver portion 124. Preferably, the insert 136 is sized and configured so that when fit in the receiver portion cavity 124 its forward surface 151 is flush with the cross-frame front surface 135. The insert 136 can be secured within the receiver portion 124 by any suitable mechanism, such as adhesive, press fit, threads, fasteners, heat seals, or the like. In this form, the insert 136 is configured so that light from the light source 106 is projected through the insert 136 forwardly of the illuminated eyewear 100. Accordingly, the insert 136 can be formed from any suitable translucent or transparent material such that at least some of the light from the light source 106 filters or is projected through the insert 136. At the same time, the insert 136 can be constructed of a material that blends in with the material of the cross-frame member to maintain the general appearance of eyeglass frames. The insert 136 can also be refractive to focus or spread the light cone emitted by the LED as desired, diffusing to soften the light, and/or can be colored to project a colored light forwardly of the glasses 100.

Figure 35:
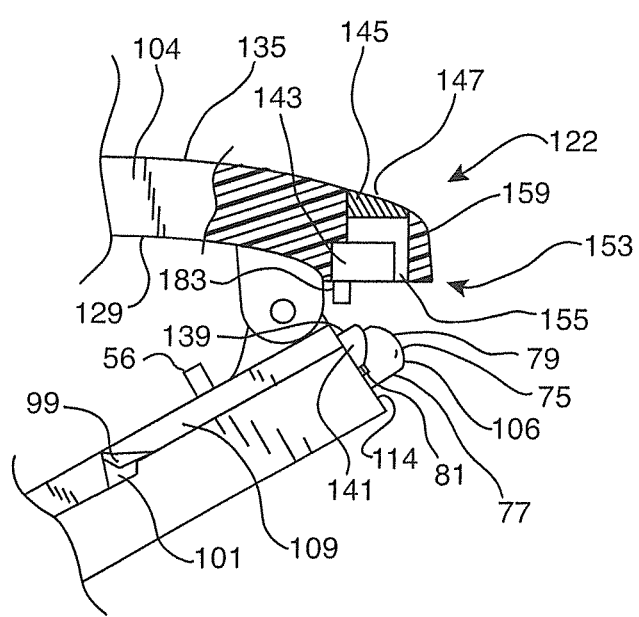
FIG. 35 is an enlarged fragmentary plan view partially in section of illuminated eyewear showing a cross-frame member with a pass-through portion and a temple arm member pivotably attached to the cross-frame member having a light source mounted to project beyond a forward end thereof.

In yet another form as illustrated in FIG. 35, the pass through portion 122 is formed as a through-bore that has a generally cylindrical configuration and extends through the cross-frame portion 104 to open at the rear surface 129 and the front surface 135 thereof. The pass through portion 122 is oriented so that the forward portion of the lens 75 of the LED light source 106 that projects forwardly beyond the front end surface 114 of the temple arm member 102 extends at least partially into the pass-through portion 122 when the temple arm member 102 is in the use position. As illustrated, this includes a forward section of the cylindrical base portion 77 and the dome shaped cap portion 79 of the lens 75. As discussed above, at least a rear portion of the pass-through portion 122 can be oversized relative to the diameter of the LED 106, and specifically the cylindrical base portion 77 thereof, so that the LED 106 can be pivoted partially into the pass-through portion 122 to avoid interference with the cross-frame member 104 when the temple arm members 102 are pivoted to the use position.

Figure 37:
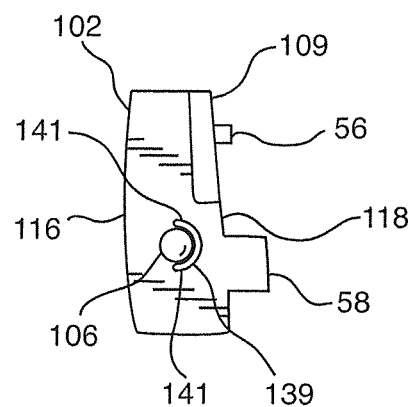
FIG. 37 is an enlarged top plan view of a temple arm member showing a light source mounted to a forward surface thereof and a light block extension extending partially around the light source.

By one approach, the temple arm member 102 can include a light blocking extension 139 that extends forwardly away from the front end surface 114 to extend alongside of the forwardly projecting lens 75 of the LED 106. More specifically, the light blocking extension 139 is in the form of a wall formed to be laterally inwardly of the light source 106 so that it is at least partially between the light source 106 and the inner surface 118 of the temple arm member 102. Preferably, the light blocking extension 139 extends away from the temple front end surface 114 a sufficient distance so as to extend axially beyond the diode 81 of the LED 106. The light blocking extension wall 139 can further include tapering sidewall portions 141 that extend around the lens base portion 77 so that the light blocking extension wall 139 has an arcuate configuration, as shown in FIG. 37. In the illustrated form, the light block extension wraps around at least the inwardly facing half of the lens base portion 77 of the LED 106. Manifestly, the extension 135 is of light blocking material, such as of an opaque material. So configured, the extension 139 blocks incident light from projecting laterally inwardly through the gap 153 between the cross-frame portion 104 and the temple front end surface 114 when the temple arm member is pivoted to the use configuration to prevent the incident light from shining into the eyes of a wearer of the glasses 100 and/or into the lenses 21 of the glasses 100.

In this approach, the pass through portion bore 122 can include a rear light blocking extension reception portion or recess 143. The reception portion 143 expands the width of the pass-through portion bore 122, in particular the rear portion 155 thereof, to accommodate the extension 139. By a further approach, a translucent or transparent cap 145 can be fit in a forward portion 159 of the pass through portion bore 122. Preferably, the cap 145 has a forward surface 147 that is substantially flush with the front surface 135 of the cross-frame member 104. The cap can be translucent, diffusing, refractive, and/or have a colored tint, as discussed above.

The light blocking extension 139 can alternatively extend rearwardly away from the temple arm end portion 110 to extend alongside of the forwardly projecting lens 75 of the LED 106 mounted to the temple arm member 102. In this form, the extension 139 is in the form of a wall or protrusion. The extension 139 can be configured to abut or be closely adjacent to the forward surface 114 of the temple arm member 102 when the temple arm member 102 is pivoted to the use configuration to block incident light from projecting laterally inwardly through the gap 153 between the cross-frame member 104 and the temple front end surface 114. In a preferred form, the temple arm member 102 can include a pocket or recess in the forward surface 114 thereof and the extension 139 can extend rearwardly from the cross-frame end portion 110 to be received within the pocket when the temple arm members 102 are pivoted to the use configuration. The wall can be arcuate, as discussed above, or can extend generally orthogonal to the temple arm axis L2.

A differently shaped example receiver portion 124 and insert 136 is illustrated in FIGS. 23A-23B. In this example, the receiver portion 124 has differently configured cylindrical portions including a rearward cylindrical portion 137, which can have a circular cross-sectional configuration, and a forward cylindrical portion 138, which can have a generally oval cross-section as illustrated. As discussed above, if desired, the associated insert 136 is configured to fit within the receiver portion 124 and have a matching contour of profile.

Figure 24:
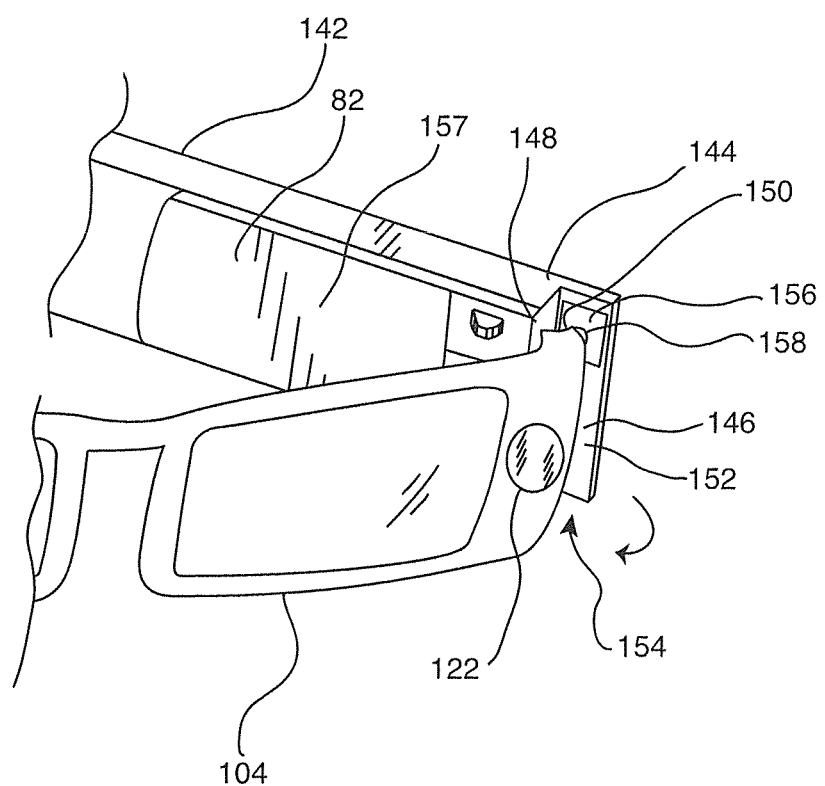
FIG. 24 is a fragmentary perspective view of illuminated eyewear showing a temple arm member in a partially pivoted position and a switch located adjacent a forward inner end of the temple arm member.
Figure 25:
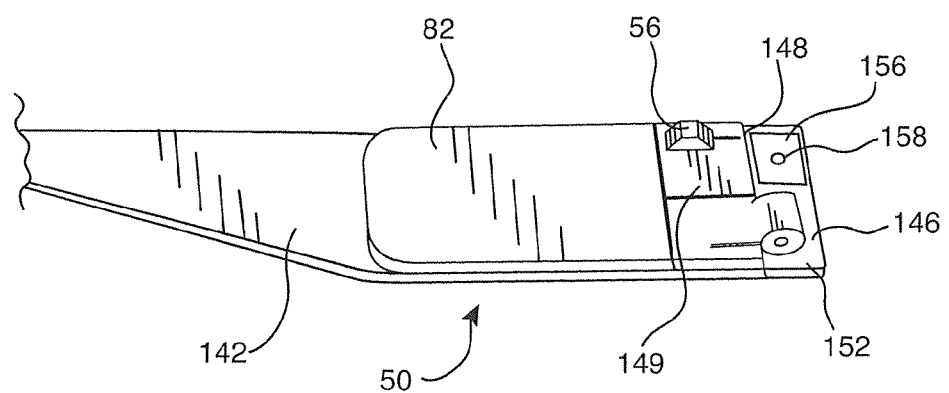
FIG. 25 is a perspective view of the temple arm member of FIG. 24 showing the switch located adjacent the forward inner end of the temple arm member.

Another optional feature for the illuminated eyewear 100 is shown in FIGS. 24 and 25, which depicts an example temple arm member 142. The temple arm member 142, is substantially similar to the temple arm member 102 described above with respect to the illuminated eyewear 100. For example, the temple arm member 142 is configured to pivotably connect to the cross-frame member 104. Accordingly, the differences will be emphasized hereinafter.

The temple arm members 142 can include additional features at the forward ends 144 thereof. As shown in FIG. 24, an extension portion 146 projects forwardly beyond a forward shoulder surface 148 of the temple arm member 142 and extends the outer surface 116 of the temple arm member 102. The forward shoulder surface 148 extends transversely between an inner surface 152 of the extension portion 146 and the inner surface 118 of the temple arm member 102. The forward shoulder surface 148 is formed so as to be closely adjacent to or abut a rearwardly facing surface 150 of the end portions 110 of the cross-frame member 104 when the temple arm members 142 are in the open or use configuration extending generally rearwardly from the cross-frame member 104. The extension portion 146 rotates with the temple arm as the temple arm member 142 is pivoted to the use configuration and is configured to be in interference with the end portions 110 of the cross-frame member 104. Specifically, an interior surface 152 of the extension portion 146 is positioned to be closely adjacent to or contact a side surface 154 of the end portions 110 of the cross-frame member 104. This configuration can advantageously control against over rotation of the temple arm members 142 because the extension portions 146 can provide restricting contact area in addition to the forward shoulder surface 148, which both have interference positioning with the cross-frame member 104 when the temple arm members 142 are fully opened.

This configuration can also advantageously be utilized to provide an additional switch 156 to control power provided from a power source compartment 157 containing a power source therein, such as that described above, to control operation of the light sources 106. As illustrated in FIGS. 24-25, the switch 156 includes a pushbutton actuator 158 and is provided on the interior surface 152 of the extension portion 146. So configured, the pushbutton 158 is arranged and configured to be depressed when the temple arm members 142 are pivoted to the open or use configuration and the side surface 154 of the cross-frame portion 104 engages the extension interior surface 152 and the pushbutton 158 thereon. This advantageously provides a hinge switch without electrical connections spanning between the temple arm members 142 and the cross-frame member 104. Alternatively, the switch 156 may be positioned on other surfaces of the temple arm member 142 that are rotated to contact the cross-frame member 104 when in the use configuration, such as the front surface 148. Advantageously, the switch 156 can be utilized alone or in conjunction with the switch 56 discussed above where the switch 56 on the inner or outer surface 118, 116 of the temple arm member 102 provides a master power switch and the switch 156 on the extension 146 provides a momentary switch that energizes the light source 106 when the temple arm members 102 are pivoted to the open or use configuration whenever the master switch is switched on. Utilizing two switches allows the eyeglasses 100 to be utilized without turning the light sources 106 on, in the configuration of only having a hinge switch, and also protects against the switch 56 inadvertently being switched to an on position and wasting power source life when the eyeglasses are not in the use configuration.

Figure 26:
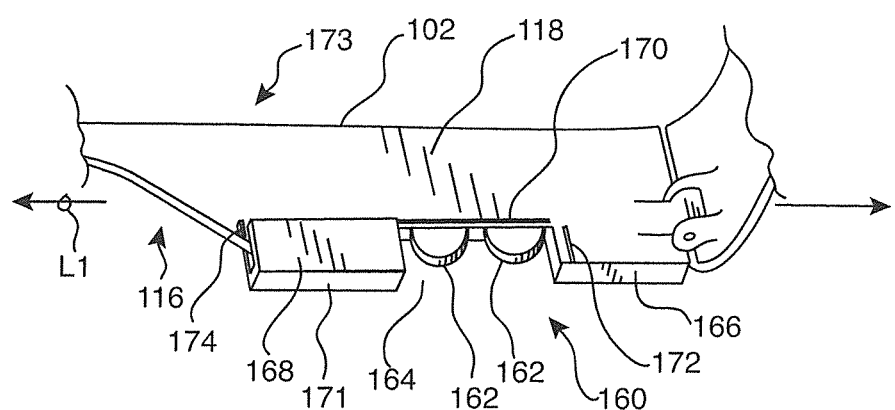
FIG. 26 is a fragmentary perspective view of illuminated eyewear showing a temple arm member including a power source compartment with a movable door.

An alternative configuration for a power source compartment 160 in the temple arm member 102 is shown in FIG. 26. Additional details of the temple arm member 102 have been omitted in the drawing to more clearly display the power source compartment 160, however, it will be understood that the temple arm member 102 can be configured as discussed throughout the specification. As illustrated, the power source compartment 160 of this form includes a space or cavity for a power source 162, such as two coin cell batteries in a side-by-side arrangement or a rechargeable battery or other electronic device capable of storing electrical energy, such as one or more capacitors. Alternatively, the power source compartment 160 could be sized to support batteries in an overlapping arrangement. An opening 164 to provide access to the power source compartment 160 is located at least partially in a bottom surface 166 of the temple arm member 102. As shown, the opening 164 can be covered by a movable or slideably shifting door or cover 168. By one approach, the door 168 is configured to be movable longitudinally along the axis L1 of the temple arm member 102, such as guided longitudinally by channels or guide tracks 170 in which the door 168 has projections or extensions that would at least partially extend into the guide channel 170, which act to hold the door 168 to the temple arm member 102. In the illustrated form, the opening 164 is a cut-out from the temple arm 102 that extends from the temple arm bottom surface onto the outer and inner temple arm sides 116 and 118. This advantageously allows a bottom surface 171 of the door 168 to be generally flush with the bottom surface 166 of the temple arm member 102 when the door 168 is shifted to the closed position, which preserves the aesthetics of the illuminated eyewear 100 to look like traditional eyeglasses. The opening 164 as described includes portions of the inner and outer surface portions 116, 118 of the temple arm members 102. In an alternative form, however, the opening 164 could also be provided solely on the bottom surface 166 of the temple arm 102 in the form of a slot where the inner and outer surface portions 116, 118 are substantially unbroken by the opening 164. The power source compartment 160 could also be provided to open adjacent or at a top surface 173 of the temple arm member 102 in a similar configuration as describe with respect to the bottom surface 166.

Figure 31:
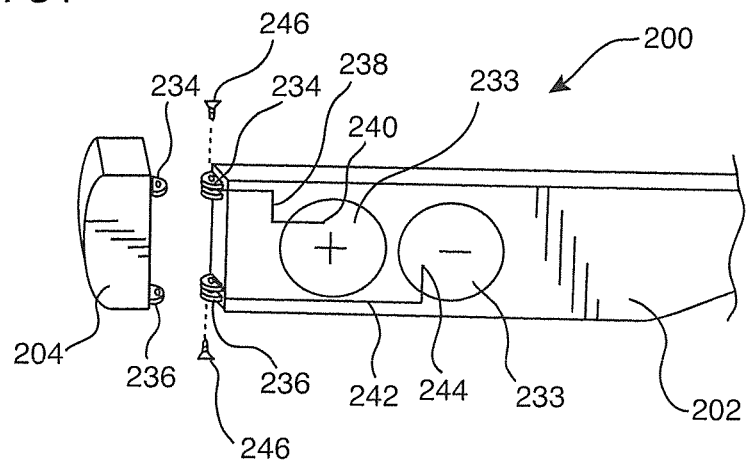
FIG. 31 is a fragmentary perspective view of illuminated eyewear showing electrical connections between a temple arm member and a cross-frame member.

Additionally, the temple arm member 102 and the door 168 may include a detent locking mechanism 172, such as a tongue-and-groove, snap-fit, or the like, in order to securely and releasably hold the door 168 in a closed position where the power source 162 is secured within the power source compartment 160. Then, when desired, the locking force provided by the locking mechanism 172 can be overcome to allow the door 168 to be guided longitudinally along the axis L3 of the temple arm member 102 to an open configuration where the power source 162 is accessible, as shown in FIG. 31. The temple arm 102 may include a stop feature 174, such as an end wall portion of the channels 170, or include an extending stop surface 174, or the like, to provide an abutment surface that prevents the door 168 from traveling too far longitudinally and separating from the temple arm member 102 by rearwardly sliding off of its guides 170 on the temple arm member 102. The door 168, however, can also be configured to be completely removable from the temple arm member 102, if desired, such as by forming the door from an at least partially flexible material so that the door 168 can be flexed or rotated out of the guides 170 or including an indent instead of the stop 174, such that the door 168 can be retained on or be manipulated past the indent and off of the guides 170.

Figure 27:
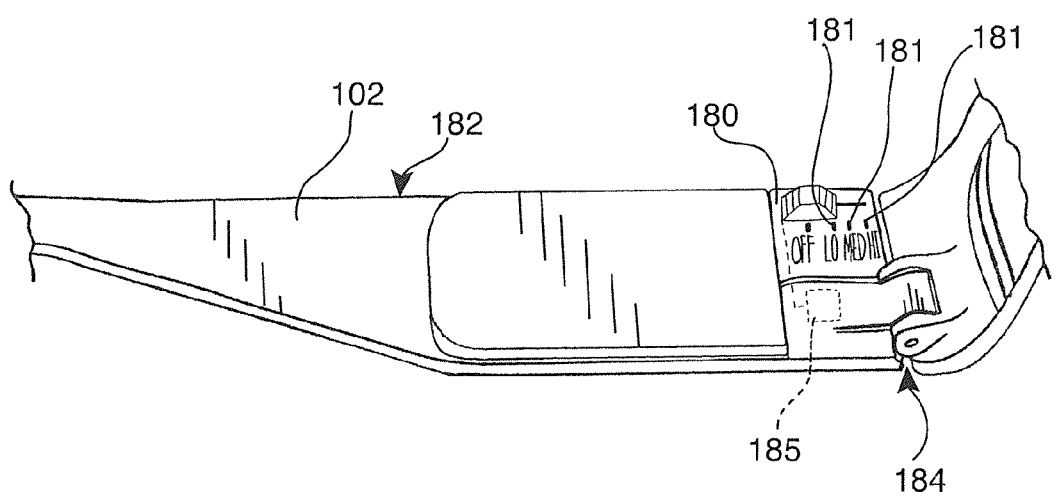
FIG. 27 is a fragmentary perspective view of illuminated eyewear showing a temple arm member including an alternative switch having multiple power level settings.

Another feature for the illuminated eyewear 100 is shown in FIG. 27. For some uses of the illuminated eyewear 100, a variety of light intensity may be desired. Accordingly, the illuminated eyewear 100 may also include a switch 180 such as a slide switch having multiple, different light intensity level or color settings 181. These settings 181 could also provide for power conservation, such as by having various blinking frequencies. As illustrated, the multiple level switch 180 includes high, medium, low, and off settings 181; however, additional levels can be provided if desired. Additionally, the switch 180 is shown in a position adjacent a top surface 182 and forward end surface 184 of the temple arm member 102, but, the switch 180 can be located anywhere on the temple arm member 12 as desired. Other configurations, as discussed throughout the specification can also be utilized. Additionally, the switch 180 may be a pushbutton switch. A circuit board 185 may be electrically connected to the switch 180 and configured to include circuitry that varies light intensity depending on the switch position.

Figure 28:
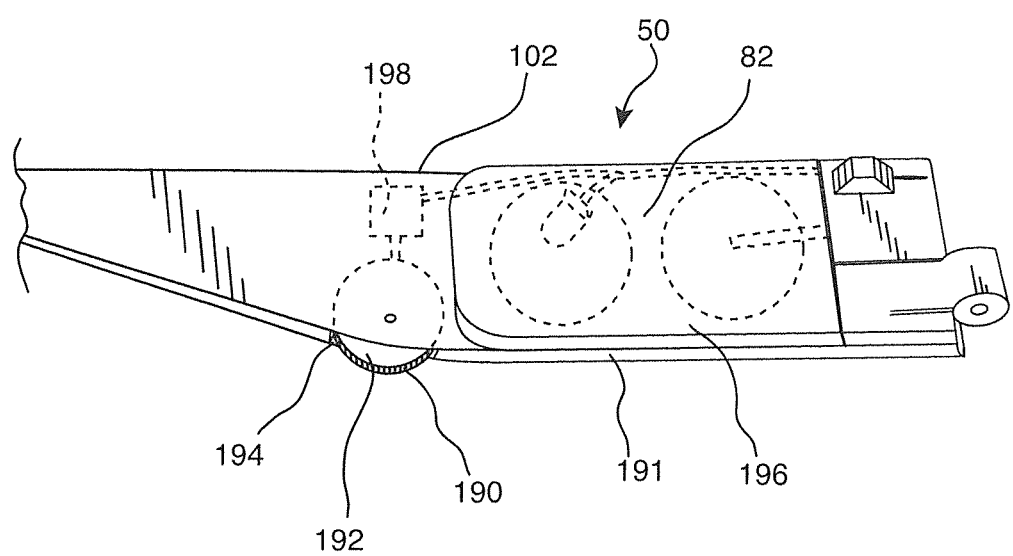
FIG. 28 is a fragmentary perspective view of illuminated eyewear showing a temple arm member having a rotary dimmer switch mounted thereon to control power levels provided to the light source for the eyewear.

An alternative mechanism for varying the intensity of the light from the illuminated eyewear 100 is shown in FIG. 28. In this form, a dimmer switch 190 is mounted on the temple arm member 102 adjacent a bottom surface 191 thereof to control the amount of power provided to the light sources 106. As illustrated, the dimmer switch 190 includes a rotary mechanism 192 including a wheel mounted to the temple arm 102 in a manner so that a portion thereof is exposed to be rotated by a user's thumb or finger to vary the power provided to the light sources 106. For example, turning or rotating the wheel as manipulated by a wearer of the illuminated eyewear 100 controls the brightness of the light sources 106. Alternatively, the rotary mechanism 192 could be utilized to control a frequency at which the light sources 106 blink, which can provide power conservation or freeze frame/strobe light capabilities. In the illustrated form, the rotary mechanism 192 partially extends through an opening 194, such as a slot opening, formed in the bottom surface 191 of the temple arm member 102. Preferably, the rotary mechanism 192 projects a suitable distance, such as in a range of 1/16 inch to 1/2 inch beyond the bottom surface 191. So configured, the rotary mechanism 192 is conveniently located for easy access for manipulation by a wearer of the illuminated eyeglasses 100, such as using a thumb or finger. Additionally, the rotary mechanism 192 can be situated adjacent to a power source compartment 196, such as the power source compartments 54 or 160 discussed above, and be electrically coupled thereto. The dimmer switch 190 may also be electrically connected to a circuit board 198 configured to vary light intensity depending on dimmer switch position. Other suitable methods to provide dimming capabilities could also be utilized.

The illuminated eyewear 200 depicted in FIGS. 29-32 includes one or more light sources 206 received in a cross-frame portion 204 and otherwise includes frame structure similar to that as described above with respect to the illuminated eyewear 100. For example, the illuminated eyewear 200 includes temple arm members 202 pivotably connected to the cross-frame portion 204, as detailed above. Accordingly, the differences will be emphasized hereinafter.

Figure 29:
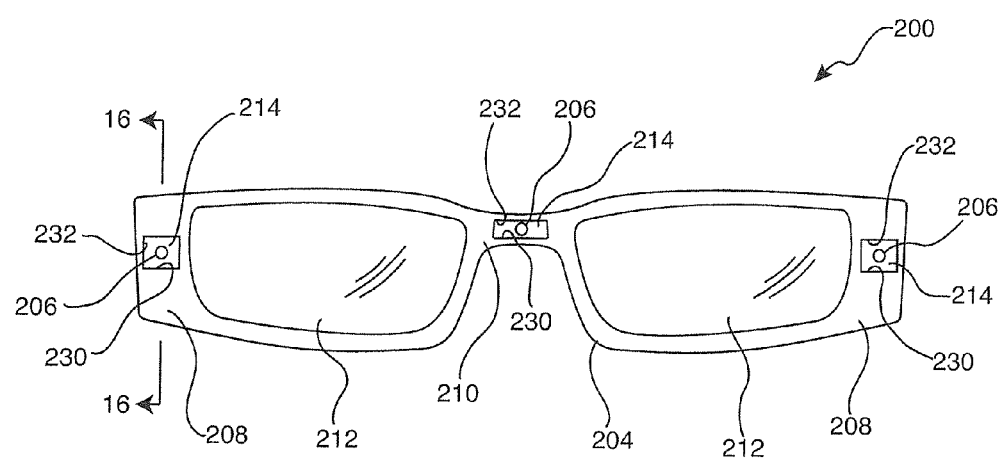
FIG. 29 is a front elevational view of illuminated eyewear showing lights embedded within a cross-frame member.

As shown in FIG. 29, the light sources 206 are mounted to and received within the cross-frame portion 204. FIG. 29 illustrates possible locations for the light sources 206, which can include being mounted to end portions 208 of the cross-frame 204 and/or on a bridge portion 210 of the cross-frame 204, however, one light source 206 can provide satisfactory performance to project light forwardly of a wearer of the illuminated eyewear 200, and as such, any or all of the locations discussed above could be utilized. Additionally, these locations are exemplary only, as any other location on the cross-frame portion 204 could also be utilized, such as above or below lens areas 212.

Figure 30:
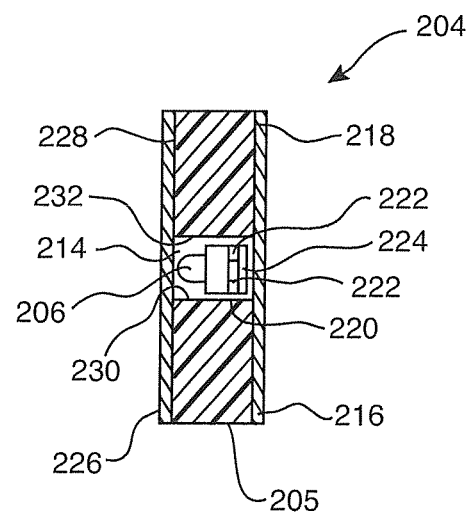
FIG. 30 is an enlarged cross-sectional view of illuminated eyewear showing a cross-frame member having multiple structural layers and a cavity therein within which a light source is received.

FIG. 30 shows a cross-sectional view of the cross-frame member 204 having a laminate construction with one of the light sources 206 enclosed therein. Preferably, the cross-frame member 204 is a plastic laminate of at least three layers; however, other suitable laminate constructions could be utilized, such as metal or combinations thereof. The cross-frame member 204 includes a cavity, cut-out, or opening 214 sized to completely enclose the light source 206 therein. In one example, the light source 206 is a surface mount type LED; however, other light sources could be utilized.

In one form, the cross-frame member 204 is a three layer laminate of a base or internal frame member 205 sandwiched between an outer back layer 216 and an outer front layer 226. By one approach, the cavity 214 is formed in the internal base layer 205. The outer back layer 216 can include a thin laminate, coating, layer, paint, lacquer, or the like, that can be applied on a back surface 218 of the base cross-frame member 205. The back layer 216 generally forms a rear surface of the cavity 214 to which the light source 206 can be mounted. This structure allows the light source 206 and electrical connections 220 to be positioned within the cavity 214 and then be at least rearwardly secured to the back layer 216, such as by adhesive. Additionally, the back layer 216 can be opaque, which can then block incident light from the light source 206 from shining backwards into the eyes of a wearer or to areas that are within the wearer's peripheral vision, or illuminating the back layer 216 which can be distracting and annoying for a wearer. The electrical connections 220 can include electrical contacts 222 electrically connected to a flexible printed circuit board 224, a pair of wires, leads, or the like. To this end, the eyewear 200 may optionally embed all electrical components to power the light source 206 in the front frame 204, such as batteries, switches, and other components all electrically connected by wires or the like. Alternatively, some of the electrical components can be provided in the temple arm members 202 and the electrical connections 220 can span the connection between the temple arm members 202 and the cross frame member 204.

The illuminated eyewear 100 may further include the front layer 226 to cover the forward opening of the cavity 214 and act as the pass-through portion 122. Preferably, the front layer 226 is a transparent or translucent layer or includes a transparent or translucent portion forwardly of the light sources 206, which can include a laminate, coating, layer, or the like and can be applied, such as dipped, laminated, spray-painted, or the like, across a front surface 228 of the cross-frame member 204. Alternatively, the front layer 226 can be composed of a flowable and transparent or translucent material, such as a paint or lacquer. When deposited into the cavity 214 and, if desired, across at least a portion of the front surface 228, the flowable material can at least partially fill the cavity 214 and surround or enclose the light source 106. In this form, the flowable material can harden to secure the light source 106 within the cavity 214, and/or act as the pass-through portion 122. The front layer 226 can then protect and/or at least partially hide the one or more light sources 206 from view as they are completely received within the cavity 214 in the cross-frame member 204. To this end, the light source 206 is mounted in the cavity and oriented to project light through the front layer 226. The front layer 226 may also be formed such that the front surface 228 of the cross-frame member 204 is substantially unbroken, which preserves an aesthetic similar to traditional eyeglasses. Optionally, the front layer 226 may only partially cover the entire surface of the front frame, such as only covering the cavity 214.

The light sources 206 may also be canted with respect to the axis of the cross-frame member L2 and/or the temple arm member axes L1, as discussed above. Pursuant to this, the light sources 206 can be mounted to the rear layer 216 at the desired cant angle or angles or can include additional mounting structure that is configured to hold the light sources 206 at the desired angle. In the form with two or more light sources 206, each light source can be canted at a different vertical and/or horizontal angle with respect to the temple arm member axis L1. This configuration provides light forwardly of the lighted glasses 200 at a variety of angles, which allows wearers of the lighted glasses 200 to see a range of objects without having to move or tilt their head. One exemplary lighted glasses 200 includes the three light sources 206 as shown in FIG. 29, where the outer light sources 206 are canted inwardly and downwardly to illuminate a viewing area forwardly and downwardly of the cross-frame member 204 and the center light source 206 is substantially uncanted to project a light cone having a center being substantially parallel to the temple arm axis L1.

By another approach, a light modifying coating or material 230 can be applied on at least a portion of an inner surface 232 of the cavity 214. The light modifying material 230 may be reflective, such as a silver or nickel coating or a lithium silver plating or nickel lithium plating; however, other reflective coatings are also suitable. Alternatively, the light modifying material 230 may be light blocking, such as a black or other dark colored coating for blocking light projecting from the light source 206, such as into the cross-frame member 204 if composed of a light transmissive material, to prevent glare or illuminated material from distracting or annoying a wearer of the glasses.

As discussed above, when a light source is provided in the cross frame member 204, but some electric components such as a power source 233, which can be a pair of coin cell batteries, a rechargeable battery, one or more capacitors, or the like, are mounted to the temple arm member, the illuminated eyewear 200 must include a mechanism to connect the power source 233 to the one or more light sources 206 through the pivot connection between at least one of the temple arm members 202 and the cross-frame member 204.

As illustrated in FIG. 31, by one approach, separating the electrical components in the temple arm 202 from the light source 206 in the front frame 204 is achieved by providing an upper hinge 234 and a lower hinge 236 to connect the temple arm member 202 to the cross-frame member 204. The upper hinge 234 and the lower hinge 236 are utilized to provide positive and negative contacts to conduct power between the temple arm member 202 and the cross-frame member 204. In this example, a first wire 238 connects the upper hinge 234 to a positive contact 240 from the power source 232 and a second wire 242 connects the lower hinge 236 to a negative contact 244 from the power source 232. Screw fasteners 246 are utilized to pivotably secure the upper hinges 234 and the lower hinges 236 of the cross-frame 204 and the temple arm member 202. Wires in the cross-frame member 204 then electrically connect the hinges 234, 236 to the light source(s) 206 in the cross-frame member 204, such as within channels or grooves provided in or between the front and rear layers 216, 226. So configured, the power source 232 powers the light sources 206 through the pivot connections between the temple arm members 202 and the cross-frame member 204 without using exposed wires or other moving parts which can wear down with repeated usage and/or bending.

Figure 32:
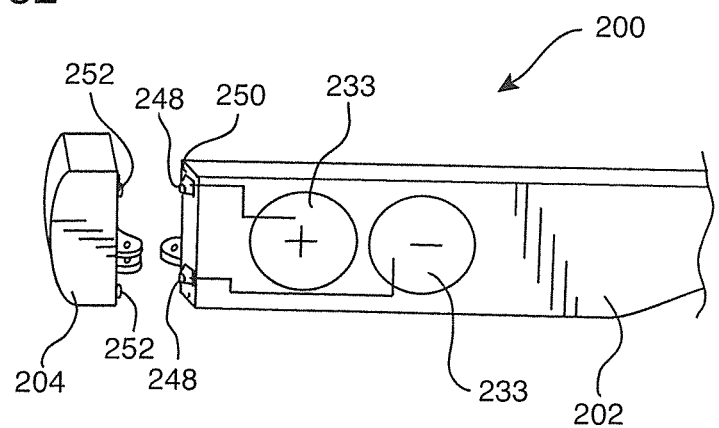
FIG. 32 is a fragmentary perspective view of illuminated eyewear showing electrical connections between a temple arm member and a cross-frame member.

By another approach as illustrated in FIG. 32, the temple arm member 202 can include an electrical contact 248 on a forward surface 250 thereof and the cross-frame member 204 can include a complementary electrical contact 252 positioned to engage the electrical contact 248 of the temple arm member 202 when the illuminated eyewear 200 is in the use or open configuration. By yet another approach, spring wire or the like can be utilized in place of the contacts 248, 252 to span electrical connections between the temple arm members 202 and the cross-frame portion 204. Similarly as described above with regard to the hinges 234, 236, wires electrically connect the contact 252 to the light source(s) 206 in the cross-frame member 204, such as within channels or grooves provided in or between the front and rear layers 216, 226.

Figure 33:
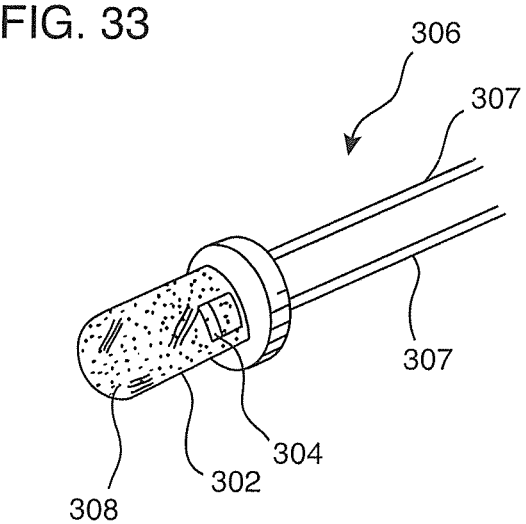
FIG. 33 is an enlarged perspective view of a LED for illuminated eyewear showing a frosted layer on the LED lens.

As illustrated in FIG. 33, an enlarged view of a modified LED 306 is shown that may be employed with the lighted eyeglasses 100 and/or 200. The modified LED 306 may be any common LED that includes a housing or lens 302 of a typical transparent material and configuration, a LED chip or diode 304 for illumination, and electrical leads 307, such as an anode and cathode lead, extending therefrom. In the illustrated form, the modified LED 306 includes a light modifying coating or surface 308 thereon. The coating may be configured to diffuse and soften the light projected from the LED 306 and can be any suitable diffusing coating, including, for example, a frosted layer, a sandblasted surface, an acid etched surface, a translucent coating, or the like. So configured, light emitted by the modified LED 306 is altered, softened, or otherwise modified by the layer 308. The light modifying coating 308 can also or alternatively be configured to mimic or resemble the color, texture, and/or general appearance of the material used to form the cross-frame member 104 and/or temple arm members 102. In another form, the coating 308 may be a refractive coating to focus or diverge the light projecting from the LED as desired. In yet another form, the coating 308 may be a wavelength or color filter or a colored coating to project a desired colored light from the LED 306.

As shown in FIGS. 38-42, an example temple arm configuration for a temple arm member 402 having features similar to those described with respect to FIG. 31 is illustrated. In this form, the temple arm member 402 extends generally along a longitudinal axis L, although while still generally extending along axis L, each temple arm member can have curvature to generally conform to a wearer's head. The temple arm members 402 include generally flat inner surfaces 405 and outer surfaces 406 that extend the length thereof with upper surfaces 408 and lower surfaces 410 spanning between the inner and outer surfaces 405, 406.

In order to conceal electronic components and compartments therefor from view, an electronic assembly 412 can be mounted to or disposed within the temple arm member 402. Preferably, the electronic assembly 412 is accessible through the inner surface 405 of each temple arm member 402 so as to effectively conceal the electronic assembly from view when the eyeglasses are worn on the head of a user, such as with a cover 413 thereby including a portion 405a of the inner surface 405 thereon. The cover 413 can be attached to the temple arm member 402 by any suitable means, including, for example, ultrasonic welding, adhesive, hardware, pivoting slot and tab, or the like.

The electronic assembly 412 includes at least a rechargeable power source 414, such as a rechargeable battery, one or more capacitors, or other electronic devices capable of storing energy, a circuit board 416, and a switch 418 with electrical connections, such as wires 420, traces, or the like, extending therebetween to electrically couple the components. Moreover, the electronic assembly 412 is configured to receive electrical energy from an external source, such as a power source charger device, to recharge the rechargeable power source 414 and also to provide electrical energy to one or more light sources 421 disposed within the cross-frame member 404, such as those having configurations described with respect to FIGS. 29 and 30. In order to securely retain the electrical connections to the rechargeable power source 414, a second circuit board 429 can be disposed at an open end to a protective covering 423 surrounding the rechargeable power source 414 and wired to the rechargeable power source 414 therethrough. With this configuration, the second circuit board 429 can be secured against removal from the rechargeable power source 414 by tape 427 or the like. Then, the circuit board 416 and the second circuit board 429 can be electrically coupled by wires, solder, and the like.

Advantageously, as a result of having a rechargeable power source, the cover 413 need not be easily openable or removable because the power source does not need to be replaced as frequently as traditional batteries. For example, opening the cover 413 can require a tool, such as a screwdriver or the like, rather than being able to be opened by hand manipulation alone. In a preferred form, the cover 413 can be substantially permanently closed, such as by welding and/or adhesive, which is made possible by the use of rechargeable power sources. A permanently closed cover can simplify the design and construction of the glasses 400, which can lower costs as well as better enable the temple arm members 402 to have the appearance of temple arm members for traditional non-lighted glasses.

As shown, the circuit board 416 can have a recharging interface 415 disposed thereon or mounted thereto. In one form, the recharging interface 415 includes contacts 422 disposed thereon for electrical engagement with a charging device, such as a plug, with corresponding contacts so that the charging device can provide electrical recharging power to the rechargeable power source 414 through the circuit board 416 and the electrical connections 420. As such, the contacts 422 on the circuit board 416 can be accessible through the temple arm inner surface 405, such as by at least one through opening 425 along the inner surface 405 to be exposed for being connected to the charging device. As illustrated, the through opening 425 extends through the cover inner surface portion 405a. Alternatively, the contacts 422, and therefore the opening 425, can be disposed and accessible on one of the upper and lower surfaces 408 and 410 or the outer surface 406 of the temple arm members 402. In a preferred form, the opening 425 is shaped to match the charging device, such as the generally B-shaped opening shown in FIG. 38. In an alternative form, the contacts 422 can be a USB, mini-USB, or other plug and socket structure. A charger device 435 can then be provided in combination with the illuminated eyewear described herein or sold separately. The charger device 435 in a preferred form includes a plug 431 having contacts thereon that are configured to electrically couple with the contacts 422 on the circuit board 416 and provide recharging power to the rechargeable power source 414. The plug 431 can have a B-shaped outer profile so it has a mating fit in the socket opening 425. The charger device 435 can be configured to receive electrical energy from a wall electrical outlet, a car outlet, or the like, as is known.

Figure 45A:
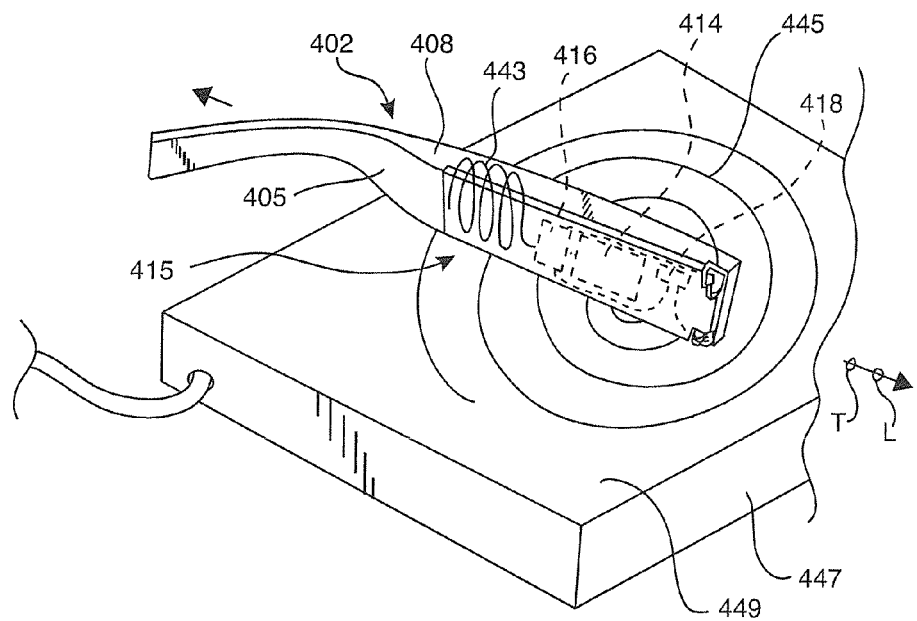
FIG. 45A is a perspective view of a temple arm member having a recharging interface comprising a secondary coil extending generally along the longitudinal axis of the temple arm member showing the secondary coil coupled to a rechargeable power source and being wirelessly coupled to a primary coil in a charging station.
Figure 45B:
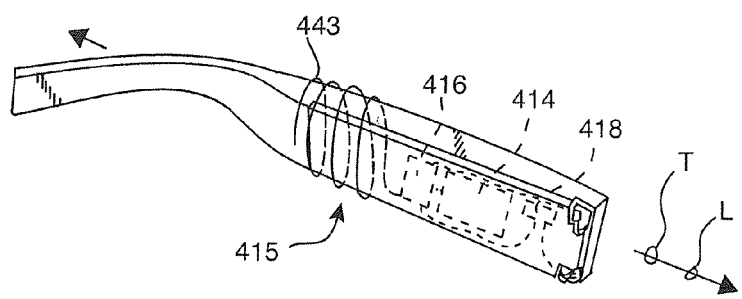
FIG. 45B is a perspective view of an alternative temple arm member having a recharging interface comprising a secondary coil extending around the temple arm member generally along the longitudinal axis thereof.
Figure 45C:
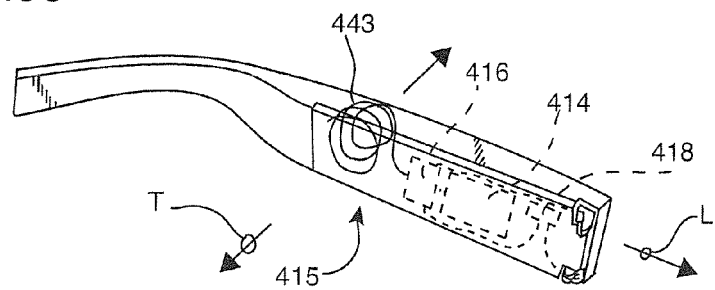
FIG. 45C is a perspective view of an alternative temple arm member having a recharging interface comprising a secondary coil extending generally perpendicular to the longitudinal axis of the temple arm member.

In an alternative form as shown in FIGS. 45A-C instead of the contacts 422 and opening 425 therefor, the recharging interface 415 includes a secondary coil 443 of suitable conductive material, such as a conductive metal as discussed above with respect to the hinge 440. As shown, the secondary coil 443 is disposed in or mounted to the temple arm member 402 and electrically coupled to the rechargeable power source 414 through the electrical connections 420. The secondary coil 443 can be embedded in the temple arm member 402 anywhere along the length thereof having a central axis T extending through the coils 443 extending along the respective temple axis L (internal to the temple arm members as shown in FIG. 45A or external about the temple arm members as shown in FIG. 45B), or generally perpendicular to the inner and outer surfaces 405 and 406 of the temple arm member 402 and the axis L thereof FIG. 45C. The secondary coil 443 is configured to interact with and receive power from a primary coil 445 (FIG. 45A) that is coupled to a power source, such as an electrical wall outlet, a car outlet, or the like, similar to traditional transformers. Specifically, this configuration can provide for wireless charging of the rechargeable power source 414 by placing the temple arm member 402 with the secondary coil 443 mounted thereto in close proximity to the primary coil 445 connected to the power source. The primary coil 447 can be disposed or embedded within a housing 447 having a substantially flat upper surface 449 so that the glasses 400 can easily rest thereon while the rechargeable power source 414 is charging.

The temple arm member 402 is preferably configured to carry each component of the electronic assembly 412 so that the electronic assembly 412 is disposed therein and/or mounted thereto. Pursuant to this, the temple arm member 402 includes an interior space or compartment 424 between the temple inner and outer surfaces 405 and 406 that includes a switch section 426, a power source section 428, and a circuit board section 430. The compartment sections 426, 428, and 430 are at least partially defined by walls 432 integral with the temple arm members 402. The walls 432 extend generally perpendicular to the temple axis between the temple inner and outer surfaces 404 and 406. Preferably, the sections 426, 428, and 430 are sized to closely conform to the outer periphery of the respective electronic assembly components so that the temple arm members can maintain a compact size for a streamlined appearance. Further, the sections 426, 428, and 430 can be sized so that the components can be snugly, or frictionally, received within their respective compartments.

As illustrated, the switch section 426 is preferably the forwardmost section of the compartment 424 along the temple arm member 402. The switch section 426 is preferably formed in the temple arm member 402 at a forward end portion 434 thereof. The switch 418 includes an actuator 436 that projects away from a switch housing 438 thereof. When the switch 418 is mounted to the temple arm member 402, the actuator 436 can project inwardly away from the temple arm inner surface. As such, the actuator 436 can irritate a wearer of the glasses 400 if the actuator 436 is positioned such that it may make contact with the wearer's head when the glasses are worn. Advantageously, however, there is a pocket of space between the forward end portion 434 of the temple arm member 402 and the wearer's head due to the curvature of the wearer's head and the generally linearly extension of the temple arm member 402 along its axis L. This pocket can be utilized so that the switch actuator 436 does not come into contact with the wearer's head when the switch 418 is mounted to the forward end portion 434 of the temple arm member 402.

The rechargeable power source 414 and the circuit board 416 can be positioned longitudinally adjacent each other along the length of the temple arm member 402 so that the vertical height of the temple arm member 402 can be kept to a minimum. In the illustrated form, the circuit board 416 is rearward of the rechargeable power source 414, but the circuit board 416 can also be disposed forwardly of the rechargeable power source 414 because the electrical connections 420 therebetween and between the other electrical components can easily be disposed to extend along length of the temple arm member 402. With either configuration, the recharging contacts 422 are accessible at an intermediate or distal portion of the temple arm member 402 to allow easy access to the opening 425 with the charger device 435 because there is no interfering structure, such as the cross-frame member 404.

As described with respect to FIG. 31, the hinges 440 of the eyeglasses 400 are also of conductive material such as metal so as to be capable of transferring electrical energy from the electronic assembly 412 in the temple arm member 402 to electronic components in the cross-frame member 404. The hinges 440 include upper and lower conductive temple hinge portions 442 and 444. The temple hinge portions 442 and 444 each have an elongated base section 446 and a protruding portion 448 having a vertical bore therethrough for reception of a screw or pin to pivotably connect the temple arm member 402 to the cross-frame member 404. The elongated base section 446 is secured to the temple arm member with a pair of rivets or screws 450. The screws 450 have an end visible and accessible on the temple outer surface 406. If desired, the screws 450 can also be metal so as to provide a connection point to electrically couple the hinge temple portions 442 and 444 to the electronic assembly 412.

The connections between the electronic assembly components will now be described with reference to FIG. 41. The switch 418 includes contacts 439 projecting from the switch housing 438 to electrically couple the switch 418 to the other components of the electronic assembly 412. One of the contacts 439 is electrically coupled to the circuit board 416 with a wire 420, and through the circuit board 416 to the rechargeable power source 414. The other of the contacts 439 is electrically coupled to the lower temple hinge portion 444 to provide power through the hinge 440 to the one or more light sources 421 mounted to the cross-frame member 404. The circuit board 416, in turn, is electrically coupled to the rechargeable power source 414 and to the upper temple hinge portion 442.

In the illustrated form, the wire 420 extending from the circuit board 416 is electrically connected to the upper hinge portion 442 using a strip 451 of metal at an end thereof. Another strip 450 of metal electrically couples the contact 439 of the switch 418 to the lower hinge portion 444. The electronic assembly 412 can then provide power to the light source 421 mounted to the cross-frame 404 as described with respect to FIG. 31.

With this configuration, the upper and lower temple hinge portions 442, 444 can act as anode and cathode electrical connections between the power source and the light sources 421. As such, the switch 418 can selectively electrically couple its contacts 422, so that in an "off" position, the contacts 422 are not electrically coupled; and in an "on" position, the contacts 422 are electrically coupled and the rechargeable power source 414 can provide power to the light sources 421 through the circuit board 416 and the hinges 440.

Figure 38:
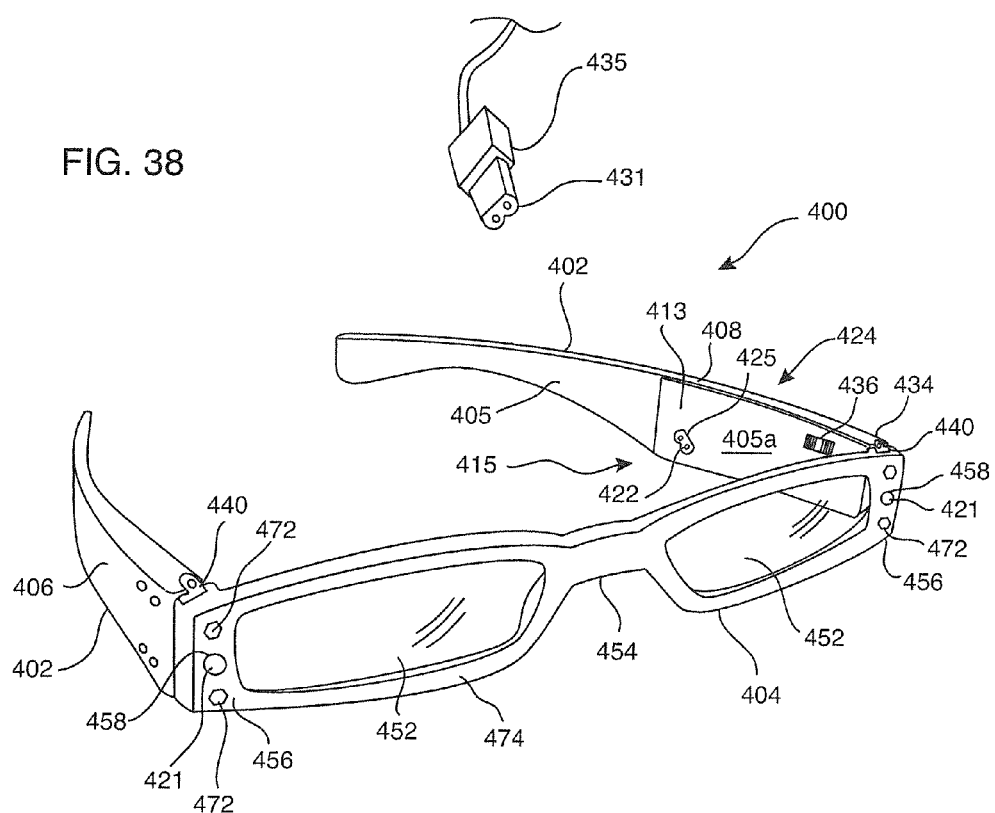
FIG. 38 is a perspective view of illuminated eyewear showing temple arm members in a pivoted open configuration relative to a cross-frame member having LED light sources at outer end portions thereof.
Figure 42:
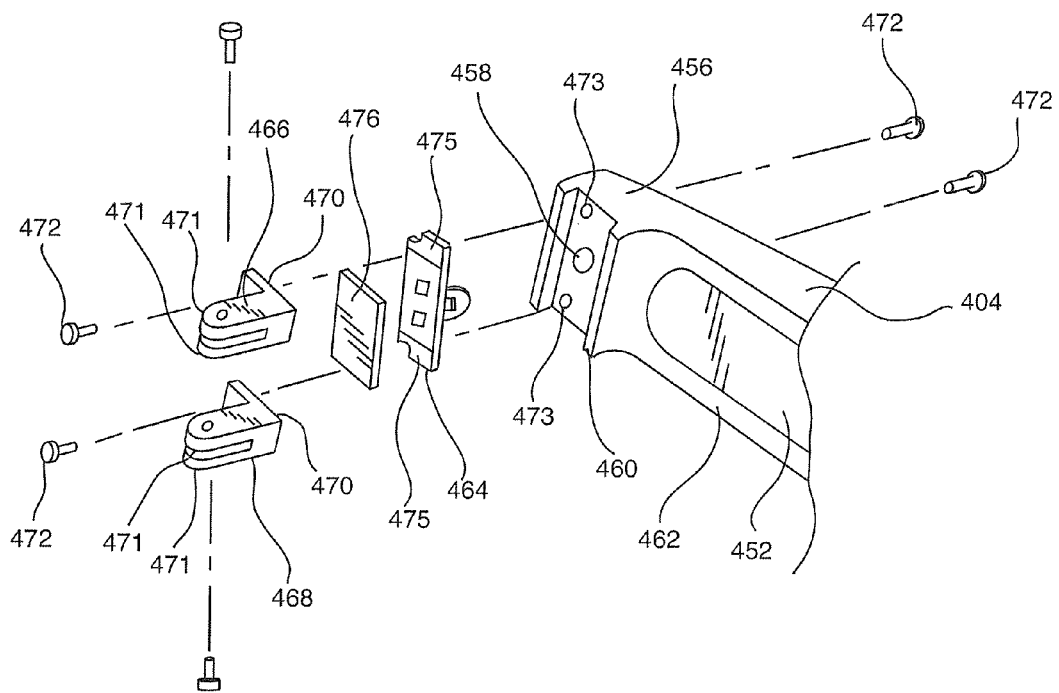
FIG. 42 is an exploded fragmentary view of a cross-frame member of the illuminated eyewear of FIG. 38 showing upper and lower hinge portions, a circuit board with an LED mounted thereto, and an end portion of the cross-frame member having a recess and an opening for receiving the circuit board and the LED, respectively, therein.

The cross-frame member 404 configured to pivotably couple with the temple arm member 402 is shown in FIG. 38. The cross-frame member 404 extends between the temple arm members 402 and can include lenses 452 and a bridge portion 454 for resting on a wearer's nose. The cross-frame member 404 includes laterally outward opposite end portions 456 each having one of the light sources 421 disposed therein. As shown in the exploded view of FIG. 42, the cross-frame end portions 456 have a central bore 458 therethrough for housing the light source 421, such as an LED. The end portions 456 also include a recess 460 on a rear surface 462 thereof with the bore 458 generally being vertically centered in the recess 460. The recess 460 is configured to receive a circuit board 464 therein with the light source 421 also being fixedly mounted on the circuit board 464 generally vertically centered so as to align with the generally vertically centered central bore 458. As such, the circuit board 464 can be disposed within the recess 460 so that the light source 421 extends into the central bore 458 for projecting light forwardly of the cross-frame member 404.

Each cross-frame end portion 456 includes upper and lower conductive cross-frame hinge portions 466 and 468 mounted thereto. The hinges 440, including the temple arm member and cross-frame portions 442, 444, 466, and 468 thereof, are preferably formed of a suitable conductive metal, such as silver, copper, aluminum, zinc, nickel, or the like. The cross-frame hinge portions 466 and 468 are configured to pivotably couple to the temple hinge portions 422 and 424 so that the temple arm members 402 are pivotable with respect to the cross-frame member 404. The cross-frame hinge portions 466 and 468 have a base portion 470 and a pair of protrusions 472 each having a bore therethrough. The protrusions 472 are configured to sandwich the temple hinge portion protrusion therebetween with a screw or pin securing the hinge portions together. The base portion 470 has a pair of bores on either side of the central bore 458 therethrough so that the upper and lower hinge portions 466 and 468 can be secured to the cross-frame member 404, such as with a screw and internally threaded coupling 472. With this configuration, the screw passes through the bore and threadedly engages the internally threaded member, which is visible on a front surface 474 of the cross-frame member 404.

In order to transfer electrical energy from the electronic assembly 412 in the temple arm member 402 to the light source 421 disposed in the cross-frame member 404, ends 475 of the circuit board 464 can be electrically conductive over a large area thereof, which are configured to be mounted forwardly of the upper and lower hinge portions 466 and 468. So configured, the base portions 470 of the conductive upper and lower hinge portion 466 and 468 can electrically engage the electrically conductive ends 475 of the circuit board 464 so that the electrical energy transferred from the electronic assembly 412 can pass through the hinges 440 and the circuit board 464 to the light source 421. If desired, to preserve the aesthetics of the glasses 400, a cover 476 can be secured rearwardly of the circuit board 464 in the recess 460 to conceal it from view and protect the electrical connections thereon.

Another example temple arm member 480 is shown in FIGS. 43 and 44. This temple arm member 480 includes a light source or LED 482 mounted in the forward end portion 434 thereof so that the temple arm member includes all components necessary for recharging the rechargeable power source and energizing the light source 482 to provide light forwardly thereof. In a preferred form, the light source 482 and the forward end portion 434 of the temple arm 480 is configured as shown in FIG. 35.

As with the earlier form, the compartment 424 includes the forwardmost switch section 426, the intermediate power source section 428, and the rearward circuit board section 430. The circuit board 416 and rechargeable power source 414 are similarly configured and will therefore not be described again. Additionally, the recharging interface In this form, hinges 484 of the temple arm members 480 configured to pivotably couple to a cross-frame member as described with respect to FIGS. 15-23 are not needed to transfer electricity and, as such, can be a single hinge portion rather than the upper and lower portions as described above. Additionally, the hinge 484 can be formed of a plastic material integrally with the plastic material of the temple arm member 480 rather than be a separate component that is of a metal construction to be separately secured to the temple arm member 480. As such, the switch section 426 is illustrated in a position adjacent to the temple arm upper surface 408, which is slightly higher along the temple arm member 480 than in the temple arm member 402. The hinge 484 can then be positioned on the lower end of the temple inner surface 405 adjacent to the temple arm lower surface 410. As described earlier, the wire 420 electrically couples the circuit board 416 to one of the contacts 439 of the switch 418. The other of the contacts 439 is electrically coupled to one of the leads 486 of the light source 482. The other of the leads 486 is electrically coupled to the circuit board by another wire 420. So configured, the switch 418 can control power flow to the light source 482 to allow the user to selectively energize the light source 482 to provide light forwardly of the temple arm member 480 and the cross-frame member pivotably attached thereto.

Figure 46:
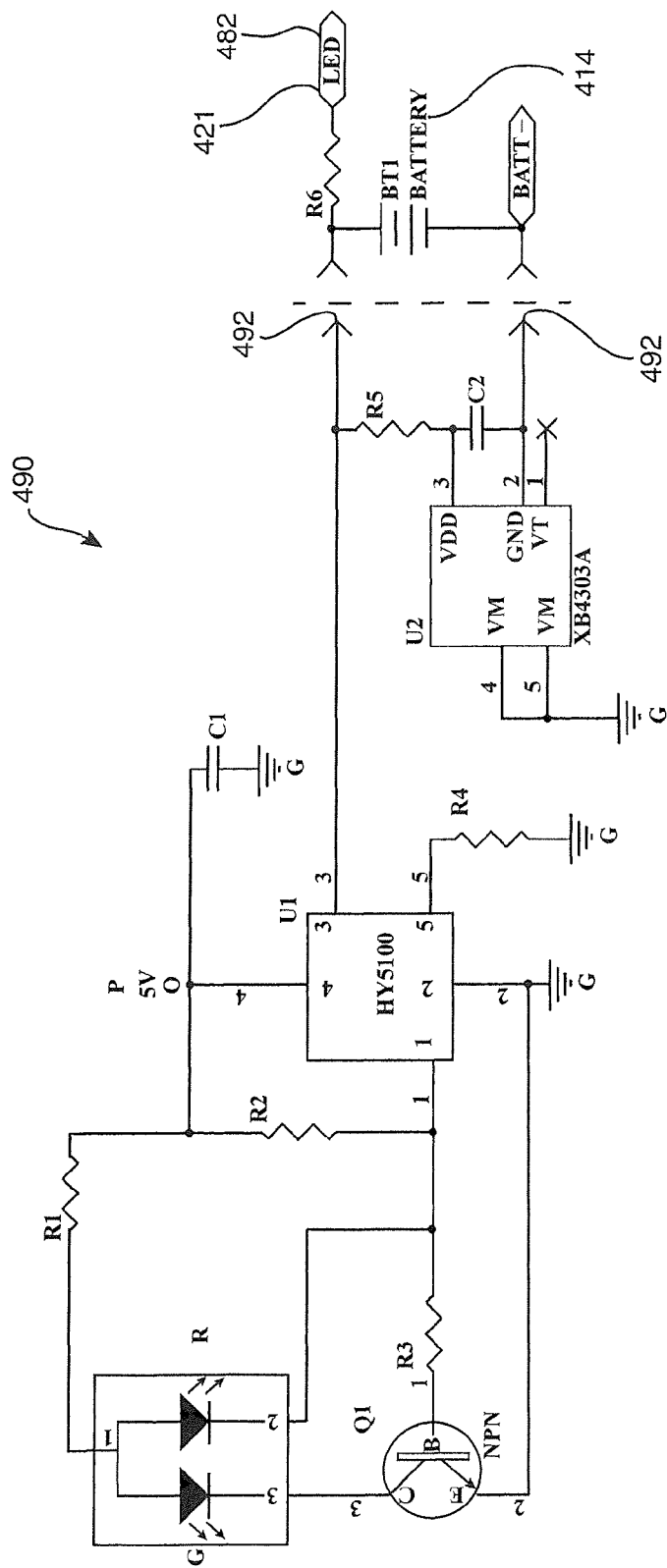
FIG. 46 is a schematic diagram of a recharging circuit for the circuit board of the electronic assemblies of the illuminated eyewear of FIGS. 38-44.

FIG. 46 is a schematic of a recharging circuit 490 for conditioning electrical energy provided by the charging device 435 and recharging the rechargeable power source 414. The recharging circuit 490 can be disposed on the circuit board 416 for placement within the electronic assembly 412 disposed in the temple arm 402. The circuit 490 includes a power source P, which can be provided by the recharging device 435 discussed above. In the illustrated form, the power source P is configured to provide about 5 V of power to the circuit 490. The circuit 490 further includes one or more grounds G, resistors, R1, R2, R3, R4, and R5, capacitors C1 and C2, and a power source charging device or component U1. By one approach, the power source charging component U1 is a standalone linear power source charger, such as for a lithium-ion battery or the like, and produces a power source charging voltage that can then be electrically coupled to the rechargeable power source 414. For example, the recharging circuit 490 can connect to the other components of the electronic assembly 412 through contacts 492.

The power source charging component U1 can also operate an indicator G and R, such as including one or more LEDs, to indicate when the power source 414 is being charged. The power source charging component U1 operates the indicator G and R using circuitry including a transistor Q1 and the resistors R1, R2, and R3.

Furthermore, the recharging circuit 490 may also include a power source protection component U2 configured to monitor the charging and discharging of the rechargeable power source 414. For example, the power source protection component U2 can monitor for overcharge current and voltage, over-discharge current and voltage, electrical shorts, and over-temperature conditions. The power source protection component U2 can also provide for protective measurements by electrically removing voltage from across the power source, such as by disconnecting the ground G from a negative side of the power source 414, so as not to damage or decrease the life of the rechargeable power source 414.

The contacts 492 can be electrically coupled to the light sources 421 or 482 and to the power source 414 using the wires 420 or other electrical connections discussed above. Additionally, another resistor R6 can be mounted inline to the light sources 421 or 482. In one example form, the resistors have values of: R1 being about 1.5K, R2 being about 10K, R3 being about 68K, R4 being about 22K, R5 being about 100 R, and R6 being about 10 R; the capacitors have values of: C1 being about 1 UF and C2 being about 0.1 UF.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

The invention claimed is:

1. Rechargeable lighted glasses comprising:
a pair of temple portions, each temple portion including a forward portion;
a cross-frame member extending between the pair of temple portions;
a pivotable connection between each of the forward portions of the temple portions and the cross-frame member;
a light source mounted to the forward portion of at least one of the temple portions for directing light forwardly of the one temple portion;
a rechargeable power source mounted to the one temple portion and coupled to the light source for providing power thereto; and
a recharging interface disposed along the one temple portion and electrically coupled to the rechargeable power source for providing power thereto.

2. The rechargeable lighted glasses of claim 1 wherein the one temple portion includes an opening in a forward end thereof, and the light source is mounted within the opening.

3. The rechargeable lighted glasses of claim 1 wherein the one temple portion includes an interior space in which the rechargeable power source is contained for energizing the light source.

4. The rechargeable lighted glasses of claim 1 wherein the rechargeable power source is closely positioned to the recharging interface to minimize length of electrical connections extending therebetween.

5. The rechargeable lighted glasses of claim 1 wherein the forward portion of the one temple portion has a power source compartment formed therein, and the rechargeable power source is disposed within the forward portion power source compartment of the one temple portion.

6. The rechargeable lighted glasses of claim 5 wherein the forward portion of the one temple portion has a generally rectangular configuration.

7. The rechargeable lighted glasses of claim 5 wherein the forward portion of the one temple portion has an enlarged thickness relative to a rear portion of the one temple portion for containing the rechargeable power source in the power source compartment.

8. The rechargeable lighted glasses of claim 1 wherein the recharging interface includes electrical contacts along the one temple portion for being connected to corresponding contacts of a charger device.

9. The rechargeable lighted glasses of claim 1 further comprising:
- another light source mounted to the other one of the temple portions to the forward portion thereof for directing light forwardly the respective temple portion;
- another rechargeable power source mounted to the other one of the temple portions and coupled to the other light source for providing power thereto; and
- another recharging interface disposed along the other one of the temple portions and electrically coupled to the other rechargeable power source for providing power thereto.

10. Rechargeable illuminated eyewear comprising:
- a pair of elongate temple arms each having forward and rearward end portions and inner and outer surface portions;
- a cross-frame including a bridge portion and extending laterally between the forward end portions of the temple arms with the temple arms and bridge portion adapted to be supported on a user's ears and nose, respectively;
- a pivot connection between each of the forward end portions of the temple arms and the cross-frame for pivoting of the temple arms open and closed relative thereto so that when closed, the temple arms generally extend laterally along the cross-frame, and when open, the temple arms generally extend in a fore-and-aft longitudinal direction so that the rearward end portions are distal from the cross-frame;
- a plurality of light sources each having a lens thereof with each temple arm having at least one of the light sources mounted thereto at the forward end portion thereof to generally face forwardly in the fore-and-aft longitudinal direction to project light forwardly from the forward end portion with the light sources pivoting with the temple arms so that when the temple arms are pivoted closed, the light sources generally face laterally in a lateral direction;
- a plurality of rechargeable power sources for providing power to each of the light sources;
- a narrow power source compartment of each of the temple arms between the respective inner and outer surface portions thereof, the narrow power source compartment having a thin lateral width between the temple arm inner and outer surface portions sized to receive the rechargeable power source therein;
- and a recharging interface disposed in the each of the temple arms and electrically coupled to the rechargeable power source for providing power thereto, and exposed along each of the temple arms for being connected to corresponding contacts of a charger device for recharging the rechargeable power source.

11. The rechargeable illuminated eyewear of claim 10 wherein the recharging interface includes electrical contacts electrically coupled to the rechargeable power source, and the temple arms each include at least one opening aligned with one or more of the recharging interface electrical contacts for being connected to corresponding contacts of a charger device.

12. The rechargeable illuminated eyewear of claim 10 wherein the rechargeable power source is closely positioned to the recharging interface along each temple arm.

13. The rechargeable illuminated eyewear of claim 10 wherein the temple arms have upper and lower surfaces that extend between the inner and outer surface portions and which define a temple arm height therebetween that is larger along the power source compartment than the thin lateral width thereof.

14. The rechargeable illuminated eyewear of claim 13 wherein the temple arm height is substantially constant along the power source compartment.

15. The rechargeable illuminated eyewear of claim 10 wherein the rechargeable power source comprises a rechargeable battery having substantially flat, opposite main surfaces thereof and is received within the power source compartment so that each of the main surfaces of the rechargeable battery directly faces one or the other of the inner and outer surface portions of each of the temple arms.

16. The rechargeable illuminated eyewear of claim 15 wherein the rechargeable battery main surfaces each have a rectangular configuration.

17. The rechargeable illuminated eyewear of claim 10 wherein the temple arms have upper and lower surfaces that taper toward each other rearwardly of the forward end portion of the temple arms.

18. The rechargeable illuminated eyewear of claim 10 wherein the forward end portion of each of the temple arms includes a forwardmost end with an opening therein, and the light sources comprise an LED mounted in the opening of each temple arm.

19. The rechargeable illuminated eyewear of claim 18 wherein the forward end portion of each of the temple arms includes a curved support surface that extends about the opening to fixedly capture the LED therebetween.

20. The rechargeable illuminated eyewear of claim 10 wherein the inner and outer surface portions of the temple arms have a substantially flat configuration.

21. The rechargeable illuminated eyewear of claim 10 wherein the forward end portion of each temple arm at the power source compartment thereof is laterally thicker between the inner and outer surface portions than along the respective rearward portions of the temple arms.

22. Rechargeable illuminated eyewear:
- a pair of elongate temple arm members each having forward and rearward ends;
- a cross-frame member of a unitary one-piece construction having opposite ends at which the forward ends of the temple arm members are pivotally connected;
- an opening in the forward end of each of the temple arm members;
- a pair of LEDs, each including a lens received in a respective one of the forward end openings of the temple arm members;
- a thin rear portion of each of the temple arm members;
- opposite inner and outer surface portions of each of the temple arm members laterally spaced from each other and extending lengthwise along the respective temple arm members adjacent the forward ends thereof;
- an enlarged forward portion of each of the temple arm members that is laterally thicker between the opposite inner and outer surface portions and vertically larger in a vertical direction along the opposite inner and outer surface portions than the temple arm member thin rear portion;
- a tapered portion of each of the temple arm members that tapers from the vertically larger forward portion to the thin rear portion to transition therebetween;
- a battery compartment between the opposite inner and outer surface portions of each of the temple arm members at the enlarged forward portions thereof;
- a rechargeable battery for providing power to the corresponding LED and being disposed within the corresponding battery compartment;
- a recharging interface disposed in the temple arm members adjacent to the power source compartment with the rechargeable battery therein and electrically coupled to the rechargeable battery for providing recharging power thereto; and electrical contacts of the recharging interface exposed along the temple arm members.

23. The rechargeable illuminated eyewear of claim 22 wherein the rechargeable battery has substantially flat, opposite main surfaces thereof and is received within the battery compartment so that each of the main surfaces of the rechargeable battery directly faces one or the other of the inner and outer surface portions of the temple arm members.

24. The rechargeable illuminated eyewear of claim 22 in combination with a battery charger device operable to connect to an outlet of a power source and having contacts configured to cooperate with the contacts of the recharging interface so that with the battery charger device electrically coupled to the recharging interface, the rechargeable battery is in electrical communication with the power source for charging the rechargeable battery.

* * * * *